(12) United States Patent
Paquet et al.

(10) Patent No.: US 9,753,055 B2
(45) Date of Patent: Sep. 5, 2017

(54) ALL-OPTICAL SYSTEM RESPONSIVE TO MOTION AND OPTICAL MODULE FOR USE IN THE SAME

(71) Applicant: INSTITUT NATIONAL D'OPTIQUE, Québec (CA)

(72) Inventors: Alex Paquet, Québec (CA); Claude Paré, Saint-Augustin de Desmaures (CA); Marco Michele Sisto, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 91 days.

(21) Appl. No.: 14/912,836

(22) PCT Filed: Sep. 25, 2013

(86) PCT No.: PCT/CA2013/050732
§ 371 (c)(1),
(2) Date: Feb. 18, 2016

(87) PCT Pub. No.: WO2015/042686
PCT Pub. Date: Apr. 2, 2015

(65) Prior Publication Data
US 2016/0202284 A1  Jul. 14, 2016

(51) Int. Cl.
*G01P 15/093* (2006.01)
*G01P 13/00* (2006.01)
*G01P 15/18* (2013.01)

(52) U.S. Cl.
CPC ........... *G01P 15/093* (2013.01); *G01P 13/00* (2013.01); *G01P 15/18* (2013.01)

(58) Field of Classification Search
CPC ......... G01P 13/00; G01P 15/093; G01P 15/18
See application file for complete search history.

(56) References Cited

U.S. PATENT DOCUMENTS 3,212,340 A * 10/1965 Benckert ............... G01C 19/00
 384/99
3,517,560 A * 6/1970 Jacobs .................. G01P 15/08
 73/514.27

(Continued)

FOREIGN PATENT DOCUMENTS

EP  0246005 A2  11/1987

OTHER PUBLICATIONS

Chih-Liang Chu, Cha-Hao Lin and Kuang-Chao Fan, Two-Dimensional Optical Accelerometer Based on Commercial DVD Pick-up Head, Institute of Physics Publishing, Meas. Sci. Technol. 18 (2007) p. 265-274.

(Continued)

*Primary Examiner* — David Bolduc
(74) *Attorney, Agent, or Firm* — Merchant & Gould P.C.

(57) ABSTRACT

An optical module for use in a motion responsive system includes a support and a proof mass mechanically coupled and displaceable relative to the support along at least one sensing axis in response to a motion experienced by the support. The module also includes an optical monitoring assembly for monitoring the proof mass with an optical beam impinging on the proof mass, the beam including a plurality of dedicated spectral components. The module further includes an optical spectral filter including a plurality of filtering regions, each being associated with a corresponding dedicated spectral component and having a spectral profile including a distinct dedicated filtering band encompassing the spectral component, such that a displacement of the proof mass along the at least one sensing axis produces, after filtering of the beam, a change in optical power of the spectral components indicative of the motion experienced by the support.

20 Claims, 34 Drawing Sheets

(56) References Cited

U.S. PATENT DOCUMENTS

| | | | |
|---|---|---|---|
| 3,706,217 A | 12/1972 | Slater et al. | |
| 3,731,542 A * | 5/1973 | Forsberg | G01P 15/093 250/227.11 |
| 3,789,674 A * | 2/1974 | Anderson | G01P 15/093 250/231.1 |
| 3,918,814 A | 11/1975 | Weiser | |
| 4,092,531 A | 5/1978 | Moss | |
| 4,239,963 A | 12/1980 | August et al. | |
| 4,567,771 A | 2/1986 | Nelson et al. | |
| 4,648,274 A * | 3/1987 | Trainer | G01H 9/00 356/33 |
| 4,822,999 A * | 4/1989 | Parr | G01P 15/093 250/206.1 |
| 5,050,435 A * | 9/1991 | Pinson | G01P 15/131 73/514.18 |
| 5,291,013 A * | 3/1994 | Nafarrate | A61B 5/113 128/925 |
| 5,359,445 A * | 10/1994 | Robertson | G01D 5/268 250/227.14 |
| 5,404,228 A | 4/1995 | McGowan | |
| 5,437,186 A * | 8/1995 | Tschulena | G01P 15/18 250/227.21 |
| 5,587,786 A * | 12/1996 | Champagne | G01J 1/4257 356/121 |
| 5,793,357 A * | 8/1998 | Ivey | G01P 3/36 250/221 |
| 5,902,999 A * | 5/1999 | Yanagi | G01P 15/093 250/231.1 |
| 6,484,577 B1 * | 11/2002 | Bennett | G01P 15/0888 73/510 |
| 6,568,268 B1 | 5/2003 | Bennett | |
| 6,649,905 B2 | 11/2003 | Grenlund | |
| 6,664,534 B2 * | 12/2003 | Hjertman | G01C 9/10 250/216 |
| 7,653,214 B2 * | 1/2010 | Schroeder | G01P 15/003 382/103 |
| 2002/0134153 A1 * | 9/2002 | Grenlund | A63B 71/0619 73/493 |
| 2002/0134925 A1 | 9/2002 | Grenlund | |
| 2007/0080285 A1 | 4/2007 | Lavi | |
| 2007/0214885 A1 * | 9/2007 | Chernyak | G01P 15/132 73/509 |
| 2008/0034866 A1 * | 2/2008 | Kilic | G01P 15/093 73/514.26 |
| 2008/0163686 A1 * | 7/2008 | Carr | G01L 9/0079 73/514.26 |
| 2009/0183570 A1 | 7/2009 | Acar et al. | |
| 2010/0046002 A1 * | 2/2010 | Perez | G01H 9/004 356/478 |
| 2011/0041224 A1 | 2/2011 | Raman et al. | |
| 2012/0116709 A1 * | 5/2012 | Martin | G01P 15/093 702/141 |
| 2012/0325001 A1 * | 12/2012 | Carralero | G01D 5/268 73/514.26 |
| 2015/0204899 A1 * | 7/2015 | Salit | G01P 15/093 73/514.26 |

OTHER PUBLICATIONS

International Search Report for corresponding International Patent Application No. PCT/CA2013/050732 dated Nov. 8, 2013.

* cited by examiner

ALL-OPTICAL SYSTEM RESPONSIVE TO MOTION AND OPTICAL MODULE FOR USE IN THE SAME

This application is a National Stage Application of PCT/CA2013/050732, filed 25 Sep. 2013 and which application is incorporated herein by reference. To the extent appropriate, a claim of priority is made to the above disclosed application.

FIELD OF THE INVENTION

The present invention relates to the field of motion sensors and systems, and more particularly concerns an optical motion responsive system and an optical module for use in the same.

BACKGROUND

Motion sensors for sensing changes in the state of motion of an object, including changes in position, velocity, acceleration or orientation, are well known in the art and encompass devices such as accelerometers, vibrometers, inclinometers and gyroscopes. Modern motion sensors are generally fabricated using micro electro-mechanical system (MEMS) technology and are used in a variety of motion sensing applications in fields such as inertial navigation, consumer electronics, vibration, structural, seismic and submarine monitoring, as well as automotive, healthcare, aerospace and military applications.

Among the different types of motion sensors, accelerometers are devices for measuring acceleration, typically by transducing the acceleration to be measured into a displacement of a proof mass connected to the casing or frame of the accelerometers. The behavior of the proof mass may be conceptually modeled as that of a damped mass attached to a spring. The displacement of the movable mass relative to the casing may be recorded by a displacement sensor, from which the acceleration acting on the casing may be derived. Measurements of the amplitude and frequency of the displacement of the proof mass can be performed using one of a number of transduction methods including capacitive, piezoresistive, piezoelectric, electromagnetic, thermal tunneling, and optical detection technologies.

Optical displacement sensors are particularly attractive as they offer potential for high-resolution and low-noise measurements exhibiting robustness to electromagnetic interference. Moreover, in some implementations, these sensors can operate without any electronic or electrical input/outputs, which may allow for remote operation in environments where electronic components cannot operate. Optical displacement sensors generally operate by modulating one or more characteristics of an optical beam, including power, phase, wavelength and polarization, in response to the displacement being measured. A variety of optical displacement sensors have been designed over the years, mostly involving optical fiber technology, and they include fiber Bragg gratings and Fabry-Perot interferometers. A drawback of most of these technologies is that a separate optical fiber is needed to sense along each sensing axis.

Another type of optical displacement sensor that is known in the prior art is a two-dimensional optical accelerometer based on a commercially available DVD optical pick-up head that measures the relative angle between a proof mass and a base, as described, for example, in Chu et al. "Two-dimensional optical accelerometer based on commercial DVD pick-up head", *Meas. Sci. Technol.* vol. 18 (2007) p. 265-274. In this paper, a plane mirror is mounted on the proof mass and the proof mass tilts when it is accelerated. A laser beam is projected onto the plane mirror, reflected thereby, and focused on a four-quadrant photodiode. As known in the art, a quadrant photodiode is a type of optical quadrant sensors that can yield absolute position measurements along two orthogonal axes that intersect at the reference position of a light beam impinging onto the quadrant sensor. As the angle of the plane mirror changes in response to a displacement of the proof mass, the position of the beam moves across the surface of the photodiode. The four-quadrant photodiode converts the optical power of the incident focused laser beam into electrical signals. Deviations of the focused laser beam from the center of the four-quadrant photodiode produce corresponding changes in the magnitudes of the electrical signals outputted by the four quadrants of the photodiodes. The magnitudes of the electrical signals can then be used to determine the incident position of the focused laser beam on the four-quadrant photodiode and, in turn, the displacement of the proof mass and the acceleration of the base. However, such an accelerometer requires electrical access at the measurement point, which may be a drawback in some applications. For example, in oil and gas applications such as seismology and well-deviation monitoring, the increased weight and system complexity arising from the provision of electrical connections and wiring may be problematic and costly.

In light of the above, there remains a need in the art for an optically-based motion responsive sensor capable of providing all-optical sensing capabilities at the point of measurement, while also alleviating at least some of the drawbacks and limitations found in known motion sensors.

SUMMARY

According to an aspect of the invention, there is provided an optical module for use in a motion responsive system. The optical module includes:
- a support;
- a proof mass mechanically coupled and displaceable relative to the support along at least one sensing axis in response to a motion experienced by the support;
- an optical monitoring assembly fixed relative to the support for monitoring the proof mass with an optical beam impinging on the proof mass, the optical beam including a plurality of dedicated spectral components; and
- an optical spectral filter positioned in a path of the optical beam, the optical spectral filter including a plurality of filtering regions, each filtering region being associated with a corresponding one of the plurality of dedicated spectral components of the optical beam and having a spectral profile including a distinct dedicated filtering band encompassing the corresponding dedicated spectral component, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

In some embodiments, the proof mass may be displaceable relative to the support along one transverse sensing axis lying in a plane perpendicular to the path of the optical beam incident on the proof mass. In such embodiments, the plurality of dedicated spectral components may consist of two dedicated spectral components and the plurality of filtering regions may consist of two corresponding filtering regions.

In other embodiments, the proof mass may be displaceable relative to the support along a pair of mutually orthogonal transverse sensing axes lying in a plane perpendicular to the path of the optical beam incident on the proof mass. In such embodiments, the plurality of dedicated spectral components may consist of four dedicated spectral components and the plurality of filtering regions may consist of four corresponding filtering regions.

In some embodiments, the optical spectral filter of the optical module consists of a reflection filter mounted on the proof mass. In such embodiments, the plurality of filtering regions defines a plurality of reflecting regions arranged on the proof mass, while the dedicated filtering band of each filtering region defines a dedicated reflection band. As a result, each dedicated spectral component of the optical beam is associated with a corresponding one of the plurality of reflecting regions of the reflection filter and lies within the corresponding dedicated reflection band. In these embodiments, the optical monitoring assembly includes a light entry interface for directing the optical beam toward the optical spectral filter for reflection thereon, and a light exit interface for collecting the optical beam reflected from the optical spectral filter.

In other embodiments, the optical spectral filter of the optical module consists of a transmission filter. In such embodiments, the plurality of filtering regions defines a plurality of transmitting regions, while the dedicated filtering band of each filtering region defines a dedicated transmission band. As a result, each dedicated spectral component of the optical beam is associated with a corresponding one of the plurality of transmitting regions of the transmission filter and lies within the corresponding dedicated transmission band. In these embodiments, the optical monitoring assembly includes a light entry interface for directing the optical beam toward the proof mass, and a light exit interface for collecting the optical beam after impinging on the proof mass.

In embodiments where the optical spectral filter consists of a transmission filter, the plurality of transmitting regions may be arranged on the proof mass. Alternatively, in other such embodiments, the optical module may further include a curved reflective surface mounted on the proof mass. The curved reflective surface may be convex or concave. In such embodiments, the optical monitoring assembly includes an inner portion that defines the light entry interface and an outer portion that defines the light exit interface. The outer portion surrounds the inner portion and the plurality of transmitting regions of the transmission filter is arranged on the outer portion.

In some embodiments, the optical beam may also include an additional spectral component distinct from the plurality of dedicated spectral components, and the at least one sensing axis may also include a longitudinal sensing axis parallel to the path of the optical beam incident on the proof mass. In such embodiments, the optical module may further include a pair of substantially parallel surfaces facing each other and reflecting at least partially the additional spectral component of the optical beam to form a Fabry-Perot resonant cavity having a cavity length. One of the surfaces is a surface of the proof mass, such that a displacement of the proof mass along the longitudinal sensing axis modifies the cavity length and produces a corresponding change in the optical power of the additional spectral component, the change being indicative of a longitudinal motion experienced by the support.

According to another aspect of the invention, there is provided an optical module for use in a motion responsive system. The optical module includes:

a support;

a proof mass mechanically coupled and displaceable relative to the support along at least one sensing axis in response to a motion experienced by the support;

an optical monitoring assembly including a light entry interface mounted on the proof mass and a light exit interface, the optical monitoring assembly monitoring the proof mass with an optical beam projected from the light entry interface and including a plurality of dedicated spectral components, and an optical spectral filter fixed with respect to the support and positioned in a path of the optical beam, the optical spectral filter including a plurality of filtering regions, each filtering region being associated with a corresponding one of the plurality of dedicated spectral components of the optical beam and having a spectral profile including a distinct dedicated filtering band encompassing the corresponding dedicated spectral component, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

According to another aspect of the invention, there is provided an optical module for use in a motion responsive system. The optical module includes:

a support;

a first proof mass mechanically coupled and displaceable relative to the support along two mutually orthogonal first and second sensing axes in response to a motion experienced by the support;

a second proof mass mechanically coupled and displaceable relative to the support along a third sensing axis in response to the motion experienced by the support, the third sensing axis being orthogonal to both the first and second sensing axes;

an optical monitoring assembly fixed relative to the support for monitoring the first and the second proof masses with corresponding first and second optical beams impinging respectively on the first and the second proof masses, the first and second optical beams including respectively four and two dedicated spectral components;

a first optical spectral filter positioned in a path of the first optical beam, the first optical spectral filter including four filtering regions, each filtering region being associated with a corresponding one of the four dedicated spectral components of the first optical beam and having a spectral profile including a distinct dedicated filtering band encompassing the corresponding dedicated spectral component, such that a displacement of the first proof mass along the first and second sensing axes produces, after filtering of the first optical beam by the first optical spectral filter, a change in the optical power of at least one of the four dedicated spectral components of the first optical beam, the change being indicative of the motion experienced by the support along at least one of the first and second sensing axes; and a second optical spectral filter positioned in a path of the second optical beam, the second optical spectral filter including two filtering regions, each filtering region being associated with a corresponding one of the two dedicated spectral components of the second optical beam and having a spectral profile including a distinct dedicated filtering band encompassing the corresponding dedicated spectral component, such that a displacement of the second proof mass along the third sensing axis produces, after filtering of the second optical beam by the second optical spectral filter, a change in the optical power of at least one of the two dedicated spectral components of the second optical beam, the change being indicative of the motion experienced by the support along the third sensing axis.

According to another aspect of the invention, there is provided an optical motion responsive system including:
a support;
a proof mass mechanically coupled and displaceable relative to the support along at least one sensing axis in response to a motion experienced by the support;
an optical monitoring assembly including a light entry interface and a light exit interface, the optical monitoring assembly being fixed relative to the support for monitoring the proof mass with an optical beam impinging on the proof mass, the optical beam including a plurality of dedicated spectral components;
a light source assembly optically coupled to the optical monitoring assembly, the light source assembly generating the optical beam and projecting the same onto the proof mass via the light entry interface;
an optical spectral filter positioned in a path of the optical beam, the optical spectral filter including a plurality of filtering regions, each filtering region being associated with a corresponding one of the plurality of dedicated spectral components of the optical beam and having a spectral profile including a distinct dedicated filtering band encompassing the corresponding dedicated spectral component; and
an optical detector assembly for measuring an optical power of each dedicated spectral component of the optical beam after incidence of the optical beam onto the proof mass and collection of the same via the light exit interface, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

According to another aspect of the invention, there is provided a method for monitoring a displacement of a proof mass along a sensing axis. The method includes the steps of:
illuminating the proof mass with an optical beam, the optical beam including a plurality of dedicated spectral components;
spectrally filtering the optical beam with an optical spectral filter positioned in a path of the optical beam and including a plurality of filtering regions, each filtering region being associated with a corresponding one of the plurality of dedicated spectral components of the optical beam and having a spectral profile including a distinct dedicated filtering band encompassing the corresponding dedicated spectral component; and
measuring an optical power of each dedicated spectral component of the optical beam after spectral filtering thereof by the optical spectral filter, such that a change in the measured optical power of at least one of the plurality of dedicated spectral components is indicative of the displacement of the proof mass along the sensing axis.

Other features and advantages of the present invention will be better understood upon reading of preferred embodiments thereof with reference to the appended drawings.

DESCRIPTION OF PREFERRED EMBODIMENTS

Figure 1:
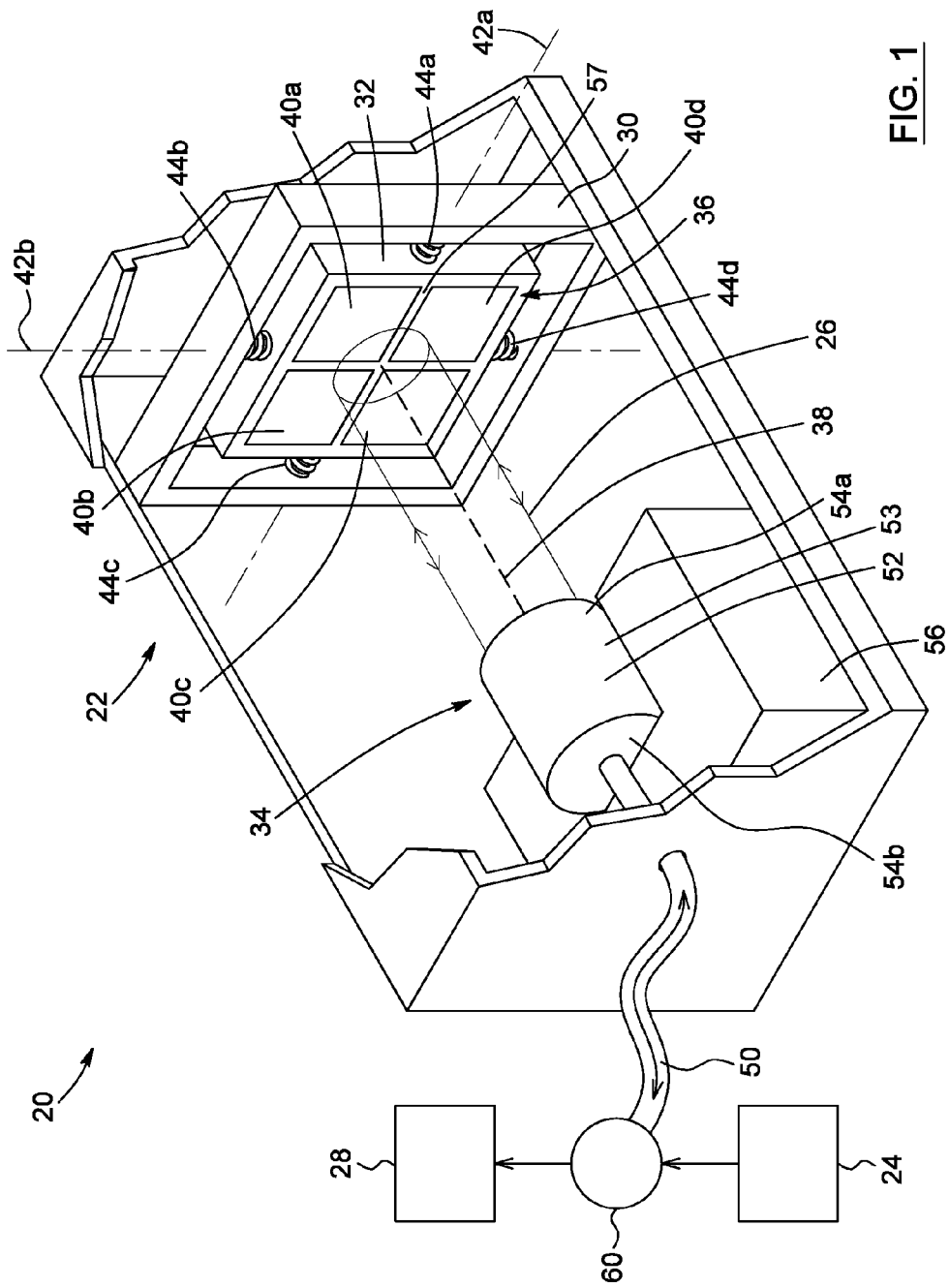
FIG. 1 is a schematic perspective and partially cutaway side view of an optical motion responsive system according to an embodiment of the invention.

In the following description, similar features in the drawings have been given similar reference numerals, and in order to weigh down the figures, some elements may not be referred to on some figures if they were already identified in preceding figures. It should also be understood herein that the elements of the drawings are not necessarily drawn to scale and that the emphasis is instead being placed upon clearly illustrating the elements and structures of the present embodiments.

The present invention generally relates to an all-optical system responsive to motion, a module for use in such a system, and a method for monitoring a displacement of a proof mass along a sensing axis. Throughout the present description, the term "motion responsive" refers to a system, a device, or to a module for such a system or device, capable of sensing any of a number of parameters indicative of a state of motion of an object, such as position, velocity, acceleration or orientation.

Embodiments of the present invention may be particularly useful in any application where it is desired to provide multi-axis and all-optical sensing of the motion of an object. For example, embodiments of the present invention could be used in or as accelerometers in various contexts including monitoring of vibrating structures, such as marine structures, buildings and bridges, aerospace and military applications, and oil and gas applications such as seismology and leakage monitoring of oil wells. It will be understood that while embodiments of the present invention may be particularly well adapted for use in or as accelerometers, other motion sensors including displacement sensors, velocity sensors, vibrometers, inclinometers and gyroscopes are understood to be within the scope of the present invention. Furthermore, embodiments of the present invention may, but need not, be fabricated using MEMS technology.

Optical Motion Responsive System

Referring to FIGS. 1 to 8, 13 to 15, 17 to 22 and 26 to 31, embodiments of an optical motion responsive system 20 are shown. Broadly described, and as will be discussed in greater detail hereinbelow, embodiments of the optical motion responsive system 20 generally include an optical module 22, a light source assembly 24 for generating an optical beam 26 including a plurality of dedicated spectral components, and an optical detector assembly 28. The optical module 22 generally includes a support 30, a proof mass 32 mechanically coupled and displaceable relative to the support 30, and an optical monitoring assembly 34 for monitoring the proof mass 32 with the optical beam 26 impinging on the proof mass 32. The optical module 22 also includes an optical spectral filter 36 positioned in a path 38 of the optical beam 26 and including a plurality of filtering regions 40a to 40d.

It will be understood that in the context of the present description, the terms "light" and "optical" are understood to refer to electromagnetic radiation in any appropriate region of the electromagnetic spectrum. In particular, the terms "light" and "optical" are not limited to visible light, but can include, for example, the infrared and ultraviolet wavelength ranges. For example, in some embodiments, the dedicated spectral components of the optical beam generated by the light source assembly may each have a wavelength lying within a range from about 1200 to 1600 nanometers (nm), which encompasses the near-infrared transmission window for optical telecommunication applications. Of course, other wavelength ranges may be considered in other embodiments without departing from the scope of the invention.

Embodiments of the optical motion responsive system will be now described by considering different exemplary embodiments of the optical module for use in the motion responsive system. In this regard, it will be understood that while in the exemplary embodiments presented below, the optical module is shown and described as forming part of the optical motion responsive system, in other embodiments, the optical module may be fabricated and sold as a separate integrated unit for use with existing optical components including, but not limited, to light source assemblies and optical detector assemblies.

First Exemplary Embodiment of the Optical Module

Figure 2:
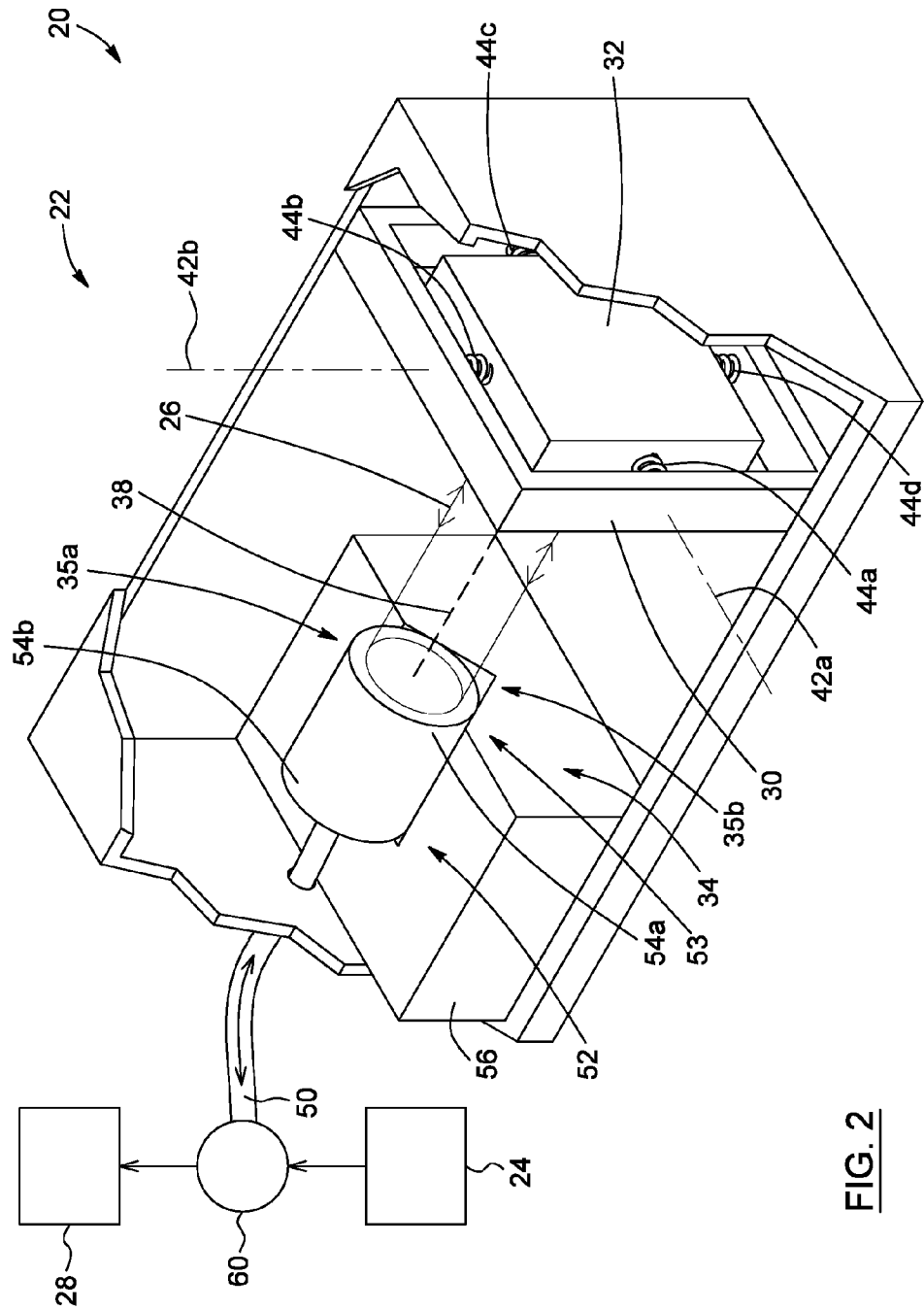
FIG. 2 is another schematic perspective and partially cutaway side view of the optical motion responsive system of FIG. 1.
Figure 3:
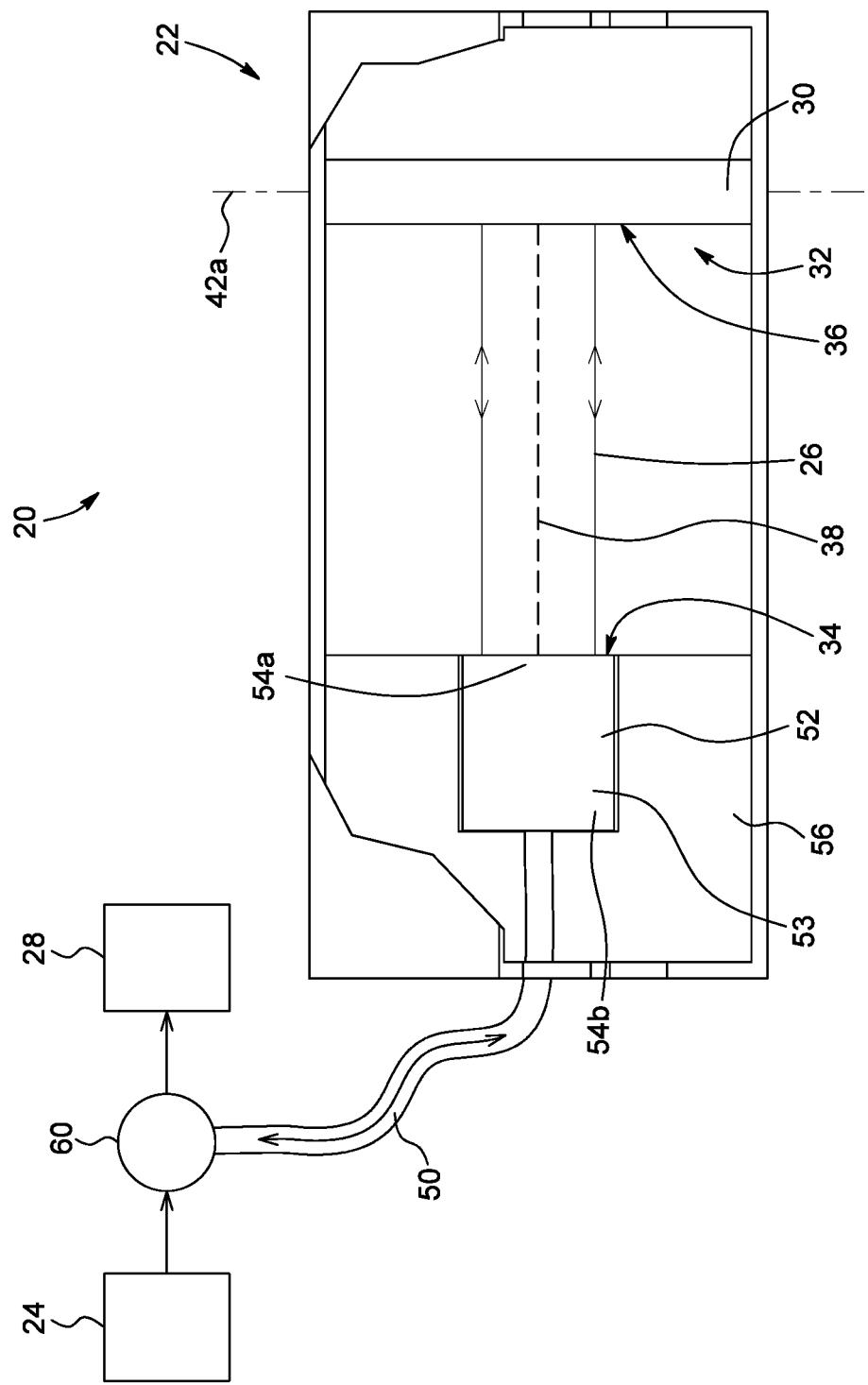
FIG. 3 is a top view of the optical motion responsive system of FIG. 1.

Referring to FIGS. 1 to 3, there is shown a first exemplary embodiment of an optical module 22 for use in a motion responsive system 20. The optical module 22 first includes a support 30 and a proof mass 32 mechanically coupled and displaceable relative to the support 30 along at least one sensing axis 42a and 42b in response to a motion experienced by the support 30. In the illustrated embodiment, the proof mass 32 has two degrees of freedom, that is, it is displaceable along two mutually orthogonal transverse sensing axes 42a and 42b lying in a plane perpendicular to the path 38 of the optical beam 26 before incidence onto the proof mass 32, as will be discussed below. It is to be emphasized that, in the drawings, the ray-trace representation of the optical beam 26 as it travels through the optical motion responsive system 20 is merely schematic and is not to be understood quantitatively. In particular, it is meant to provide an approximate depiction of the transverse extent of the optical beam 26 and the location of its path 38.

As used herein, the term "support" refers broadly to any structure that holds and mechanically supports the proof mass such that the proof mass can move relative to the support along the at least one sensing axis. In FIGS. 1 to 3, the optical module 22 includes a housing structure that encloses the proof mass 32 and defines the support 30. It will be understood that in FIGS. 1 to 3, the term "support" is not restricted to the squared-shaped frame in which the proof mass 32 is mounted, but can encompass the casing of the optical module 22. In this regard, it will also be understood that FIGS. 1 to 3 represent partially cutaway views of the optical module 22, in which part of the exterior surface of the support 30 is removed, thus making the internal elements thereof visible.

As also used herein, the term "proof mass" refers broadly to any predetermined inertial mass used in a motion responsive system or module, such as an accelerometer, whose displacement serves as a reference for the motion to be measured.

In operation of the optical motion responsive system 20, the support 30 is typically rigidly connected to the object or structure (not shown) whose motion is to be measured or monitored. The relative displacement of the proof mass 32 with respect to the support 30 may be sensed by an appropriate transducer, as described below. The motion of the support 30, and thus of the object or structure on which it is mounted, can then be derived based on the measured relative displacement of the proof mass 32.

The optical module 22 generally includes at least one resilient element such as springs 44a to 44d that join the proof mass 32 to the support 30 for providing a restoring force to the proof mass 32. Each resilient element thus provides an elastic link between the proof mass 32 and the support 30. For example, in the illustrated embodiment, one end of each of the four springs 44a to 44d is attached to the proof mass 32, while the other end attaches to an anchor point on the support 30. The four springs 44a to 44d are arranged in two pairs, a first pair 44a and 44c being connected to opposite sides of the proof mass 32 and extending along the first sensing axis 42a, and a second pair 44b and 44d being connected to opposite sides of the proof mass 32 and extending along the second sensing axis 42b. Of course, the number, position and arrangement of the at least one spring connecting the proof mass to the support can be varied in other embodiments. The springs could be of any appropriate type and are not limited to conventional machined coil springs. Moreover, in other embodiments, the at least one resilient element need not be embodied by springs, but could be embodied by other appropriate mechanical components such as, for example, cantilever structures or buffers made up of an elastic material.

It will be understood that in embodiments such as that illustrated in FIGS. 1 to 3, the displacement of the proof mass 32 along each of the sensing axes 42a and 42b as a response to a motion of the support 30 can be described as that of a damped mass-spring oscillator acted upon by an external driving force. Furthermore, in order to fulfill the requirements of a given application, the design parameters of the damped mass-spring oscillator such as, for example, its resonant frequency and its bandwidth, can be varied by appropriately selecting the mass of the proof mass 32, the stiffness constant of the springs 44a to 44d, and the damping coefficient of the oscillator.

It will also be understood that the support 30, the proof mass 32 and the one or more springs 44a to 44d may be fabricated at macroscopic sizes by using standard machining and assembly or at microscopic sizes by using conventional surface micromachining and photolithographic techniques such as those used in MEMS technology. In particular, the proof mass 32 and springs 44a to 44d may be patterned and defined on the support 30 using common thin-layer deposition techniques paired with selective photoresist and sacrificial layer etching processes. However, it will be understood that other manufacturing techniques could be used without departing from the scope of the invention.

Still referring to FIGS. 1 to 3, the optical module 22 also includes an optical monitoring assembly 34. As used herein, the term "optical monitoring assembly" should be understood as encompassing any optical element or combination of optical elements positioned in a path of the optical beam and configured for directing the optical beam toward the proof mass for incidence thereonto, and for collecting the optical beam after incidence onto the proof mass. In the illustrated embodiment, the optical monitoring assembly 34 is fixed relative to the support 30, such that the proof mass 32 is also displaceable relative to the optical monitoring assembly 34. However, this may not be the case in other embodiments, as discussed in greater detail below with reference to FIGS. 29 to 31. The optical monitoring assembly 34 allows for the monitoring of the proof mass 32 with an optical beam 26 impinging on the proof mass 32 as the proof mass 32 is displaced along one or both sensing axes 42a and 42b.

In some embodiments, the optical monitoring assembly 34 may include a light entry interface 35a for directing the optical beam 26 toward the proof mass 32, and a light exit interface 35b for collecting the optical beam 26 after incidence on the proof mass 32. For example, the light entry interface 35a and the light exit interface may each be the endface of an optical element adapted for directing the optical beam 26 onto a surface area of the proof mass 32 or for subsequently collecting the optical beam 26. In this regard, it will be understood that depending on the application, the light entry interface 35a and the light exit interface 35b may coincide with each other or may be distinct optical interfaces, as discussed below with reference to FIGS. 20 to 22. In other words, the light entry interface 35a and the light exit interface 35b may be part of the same optical element or may be part of distinct and separate optical elements.

In the embodiment of FIGS. 1 to 3, the optical module 22 includes a light focusing element 52 for receiving the optical beam 26 from the light source assembly 24 and for focusing the same onto the proof mass 32. The light focusing element 52 may have a proximal end 54a and a distal end 54b, the proximal end 54a having an endface defining the light entry interface 35a. In the illustrated embodiment, the light exit interface 35b coincides with the light entry interface 35a, such that the light focusing element 52 also defines a light collecting element 53.

In some embodiments, at least one optical fiber 50 can be used to guide the optical beam 26 from the light source assembly 24 to the light focusing element 52, via the distal end 54b thereof. The optical fiber 50 may include various types of optical fibers including, without being limited to single-mode fibers, multimode fibers, single-cladding fibers, multi-cladding fibers, and the like. Alternatively, free-space optics could be used. Furthermore, in some embodiments, in order to ensure that the optical monitoring assembly 34 remains fixed relative to the support 30, the light focusing element 52 is preferably fixedly mounted to the support 30. For example, as shown in FIG. 2, the support 30 may include a holder 56 for holding the light focusing element 52 and positioning the same with respect to the proof mass 32. In the illustrated embodiment, a V-shaped channel is machined in the top surface of the holder 56 and receives the light focusing element 52 thereinside. Preferably, the center of the proximal end 54*a* of the light focusing element 52 is aligned with the center of the proof mass 32 when the proof mass 32 is at rest.

The light focusing element 52 can be embodied by any appropriate device or combination of devices able to direct, shape and focus the optical beam 26 onto a given surface area of the proof mass 32 with a given spot size. As in the illustrated embodiment, the light focusing element 52 may be embodied by a graded-index (GRIN) lens, but other types of light focusing elements could be used without departing from the scope of the present invention including, without being limited to, thin lenses, conical lenses or axicons, ball lenses, diffractive elements, flat-top beam shapers, and the like.

It will be understood that the length of the light focusing element 52 and the spacing between the light focusing element 52 and the proof mass 32 may be varied according to the requirements and particularities of the intended application. For example, the distance between the light focusing element 52 and the proof mass 32 may, but need not, be selected so that the proof mass 32 is positioned at the beam waist location of the optical beam 26 emerging from the light entry interface 35*a* defined by the endface of the proximal end 54*a* of the light focusing element 52. As known in the art, the mode field diameter of an optical beam reaches a minimum value at an axial position denoted as the beam waist location, the beam waist referring to the minimum diameter of the optical beam. Moreover, in embodiments where the light focusing element 52 is a GRIN lens, a segment of a no-core optical fiber, for example made of silica glass or another appropriate glass material, may be coupled to the light focusing element 52 at the distal end 54*b* thereof, so as to allow the use of commercial off-the-shelf GRIN lenses rather than GRIN lenses with customized or non-standard lengths.

Figure 20:
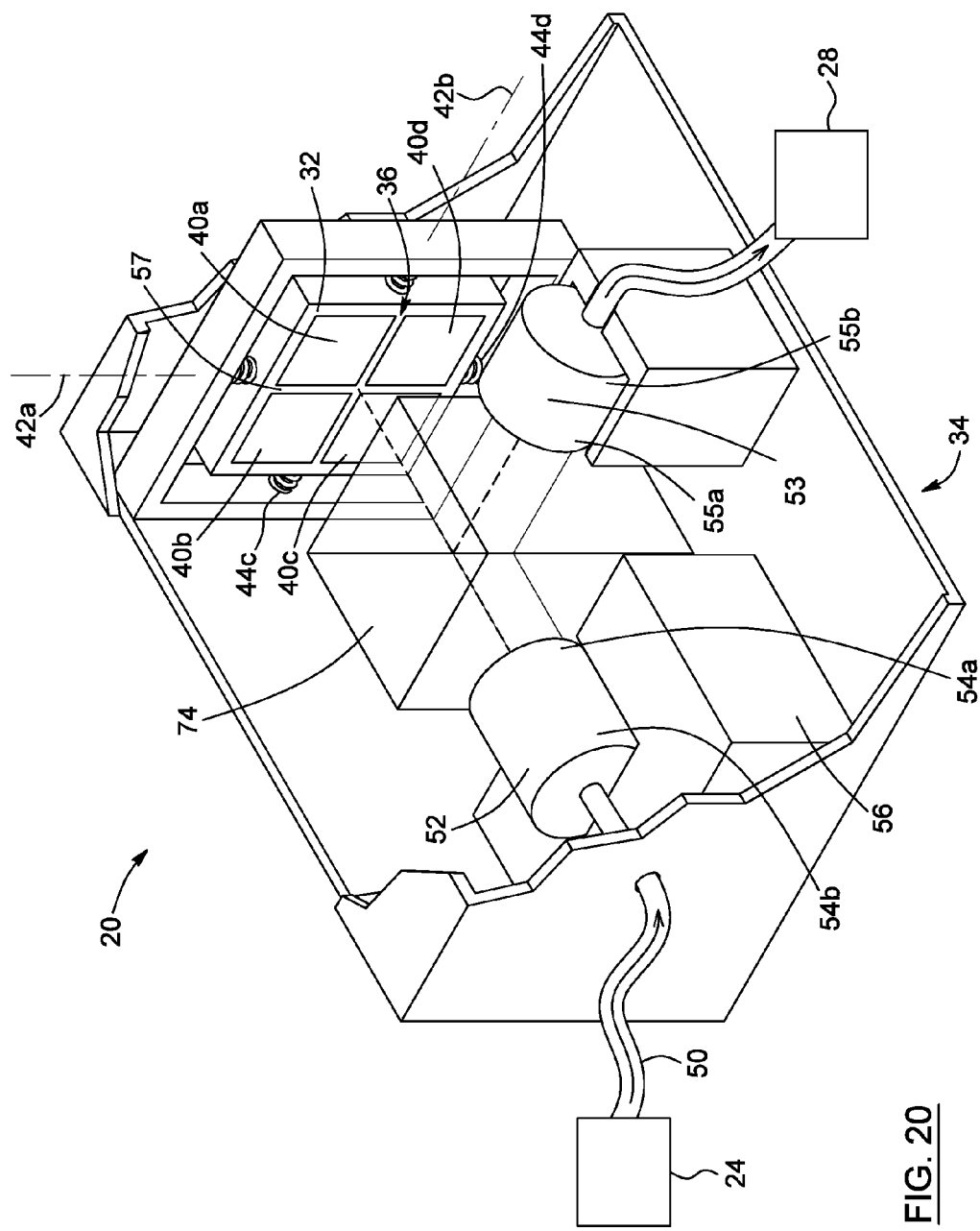
FIG. 20 is a schematic perspective and partially cutaway side view of an optical motion responsive system according to another embodiment of the invention.
Figure 21:
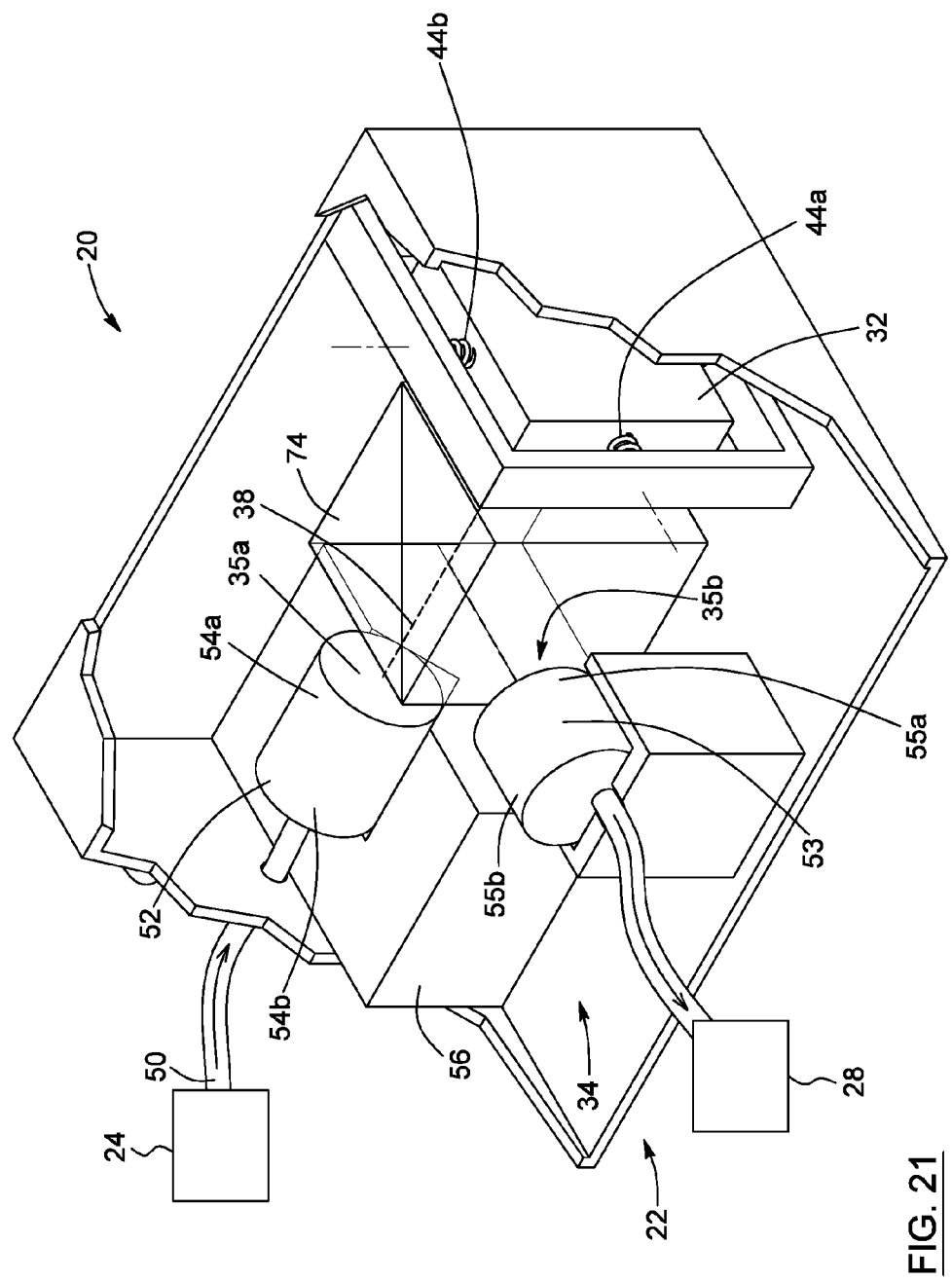
FIG. 21 is another schematic perspective and partially cutaway side view of the optical motion responsive system of FIG. 20.
Figure 22:
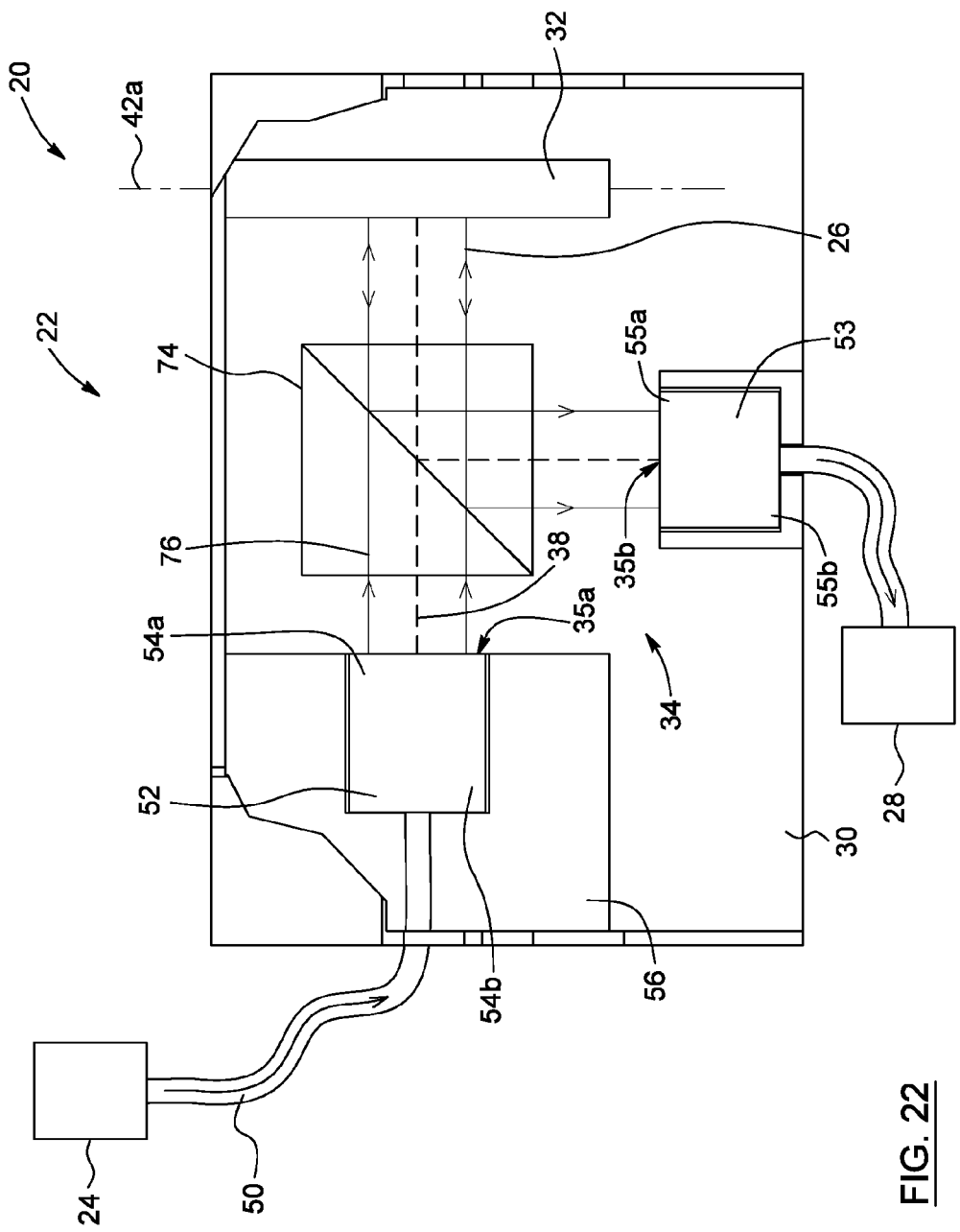
FIG. 22 is a top view of the optical motion responsive system of FIG. 20.

Referring to FIGS. 20 to 22, there is shown an embodiment similar to that of FIGS. 1 to 3, but that differs in that the light entry interface 35*a* and the light exit interface 35*b* are distinct optical interfaces. It is to be noted that for the sake of clarity, the ray-trace representation of the path of the optical beam impinging on and reflected from the proof mass is not shown in FIGS. 20 and 21. In FIGS. 20 to 22, the light collecting element 53 is configured for collecting the optical beam after reflection on the proof mass 32 and for directing the same toward the optical detector assembly 28. The light collecting element 53 has a proximal end 55*a* and a distal end 55*b*, the proximal end 55*a* having an endface defining the light exit interface 35*b*. In the illustrated embodiment, the light collecting element 53 is embodied by a GRIN lens, but other optical elements could be used as the light collecting element 53.

Still referring to FIGS. 20 to 22, the optical module 22 may further include a beam splitter 74 positioned in the path 38 of the optical beam 26. The beam splitter 74 is configured for directing the optical beam 26 from the light entry interface 35*a* defined at the proximal end 54*a* of the light focusing element 52 toward the proof mass 32. The beam splitter 74 is also configured for directing the optical beam 26 after reflection on the proof mass 26 toward the light exit interface 35*b* defined at the proximal end 55*a* of the light collecting element 53.

Referring back to FIGS. 1 to 3, the optical module 22 of the optical motion responsive system 20 further includes an optical spectral filter 36 positioned in the path 38 of the optical beam 26.

As used herein, the term "optical spectral filter" refers in a broad sense to any optical element that selectively removes or filters out, either by reflection or transmission, light with specific wavelengths, totally or partially, from an optical beam incident thereonto. In other words, in embodiments of the invention, the optical spectral filter 36 may alternatively be a reflection filter, as in FIGS. 1 to 3, 13 to 15 and 20 to 22, or a transmission filter, as in the embodiments shown in FIGS. 6 to 8, 17 to 19 and 23 to 31 and discussed in greater detail hereinbelow.

Referring more specifically to the embodiment of FIG. 1, the optical spectral filter 36 is a reflection filter mounted on the proof mass 32. The optical spectral filter 36 includes a plurality of filtering regions 40*a* to 40*d*, which therefore corresponds to a plurality of reflecting regions. In the illustrated embodiment, the optical spectral filter 36 includes four square-shaped filtering regions 40*a* to 40*d* arranged to form a larger square whose sides are in alignment with the mutually orthogonal transverse sensing axes 42*a* and 42*b*. It will be understood, however, that in other embodiments, the filtering regions 40*a* to 40*d* may assume a variety of shapes other than square without departing from the scope of the invention. For example, in some embodiments, the four filtering regions 40*a* to 40*d* may be shaped as four quadrants arranged to form a circle and be in alignment with the transverse sensing axes 42*a* and 42*b*. In particular, the shape of the filtering regions 40*a* to 40*d* could be varied in order to adjust their sensitivity and the linearity of their response to the displacement of the proof mass 32 with respect to the support 30, as will be discussed below.

In some embodiments, a spacing 57 exists between the filtering regions 40*a* to 40*d* and has the shape of a cross in the embodiment of FIGS. 1 to 3. The spacing 57 is preferably kept as small as possible in order to increase sensitivity. It will be understood that the minimum achievable spacing is generally limited by the tolerances of the fabrication process. For example, in the embodiment shown in FIG. 1, the spacing 57 between adjacent filtering regions 40*a* to 40*d* is of the order of 4 micrometers (μm), but different spacing values could be used in other embodiments. The spacing 57 is also preferably less than the mode field diameter of the optical beam 26 that is focused onto the proof mass 32 by the light focusing element 52. This helps to ensure that the spot size of the optical beam 26 impinging on the proof mass 32 is sufficiently large to extend across at least part of at least one of the four filtering regions 40*a* to 40*d* of the optical spectral filter 36 as the proof mass 32 is displaced over its range of displacement during operation of the optical motion responsive system 20.

It will also be understood that although the size of the filtering regions 40*a* to 40*d* could be varied depending on the requirements of the intended applications, it is preferably kept large enough to reduce or mitigate diffraction of the optical beam 26 as it is filtered by the optical spectral filter 36. For example, in the embodiment shown in FIG. 1, each filtering region 40*a* to 40*d* is a square having a side length of the order of 100 μm, but here again other dimensions could be used in other embodiments.

Each filtering region 40a to 40d is associated with a corresponding one of the plurality of dedicated spectral components of the optical beam 26. Therefore, in the embodiment shown in FIGS. 1 to 3 where the optical spectral filter 36 includes four filtering regions 40a to 40d, the optical beam 26 includes four corresponding dedicated spectral components, which will be denoted herein by their main wavelengths $\lambda_1$, $\lambda_2$, $\lambda_3$ and $\lambda_4$. It will be understood that in such embodiments, the light source assembly 24 may be provided with four light sources, each generating a corresponding one of the four dedicated spectral components $\lambda_1$, $\lambda_2$, $\lambda_3$ and $\lambda_4$, as described in greater detail below.

As used herein, the term "dedicated spectral component" refers to a portion of the spectral content of the optical beam generated by the light source assembly which is particularly associated with a corresponding filtering region of the optical spectral filter, as described in greater detail below. Each dedicated spectral component may encompass a main wavelength or a narrow band about a main wavelength.

Figure 9:
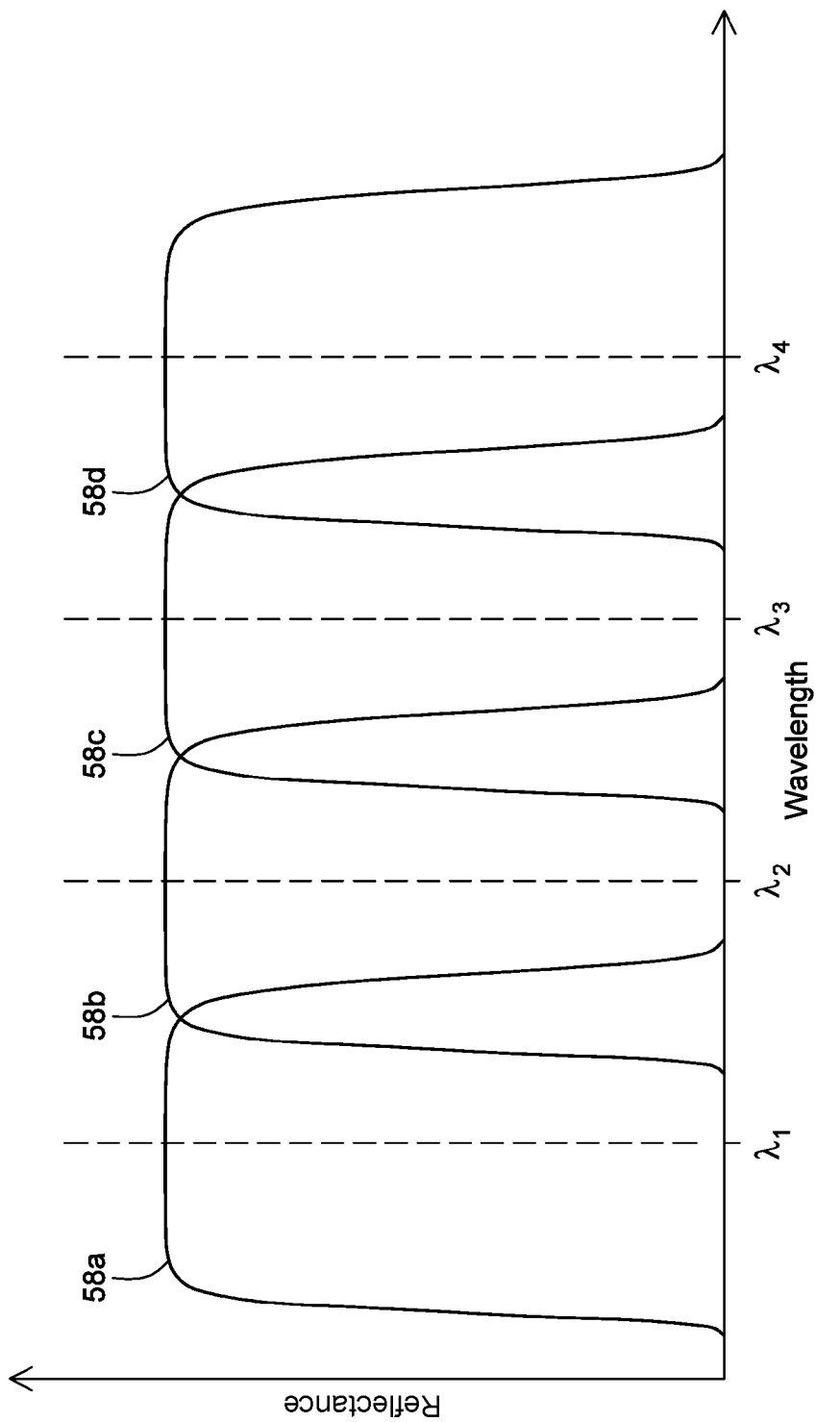
FIG. 9 shows the spectral profiles plotted as a function of wavelength of the filtering regions of the optical spectral filter shown in FIG. 1, wherein the spectral profile of each filtering region defines a bandpass reflection filter.

Referring now to FIG. 9, each filtering region 40a to 40d of the optical spectral filter 36 shown in FIG. 1 has a spectral profile 58a to 58d that includes a distinct dedicated filtering band encompassing the corresponding dedicated spectral component $\lambda_1$, $\lambda_2$, $\lambda_3$ or $\lambda_4$. In one embodiment, the main wavelengths $\lambda_1$, $\lambda_2$, $\lambda_3$ and $\lambda_4$ may be respectively equal to 1551, 1571, 1591 and 1611 nm. Of course, these values are provided for illustrative purposes only and could be varied in other embodiments without departing from the scope of the invention. Because the optical spectral filter 36 in FIG. 1 is a reflection filter, the spectral profile 58a to 58d of each filtering region 40a to 40d corresponds to a reflection filter whose dedicated filtering band defines a dedicated reflection band. Therefore, each dedicated spectral component of the optical beam 26 shown in FIGS. 1 to 3 is associated with a corresponding one of the plurality of reflecting regions of the reflection filter and lies within the corresponding dedicated reflection band.

It will be understood that in embodiments where the optical spectral filter is a reflection filter, the spectral profiles of the plurality of filtering regions may assume any appropriate shape, peak reflectance, width, and spectral separation as long as each dedicated spectral component of the optical beam is encompassed within the dedicated filtering band of only one of the filtering regions of the reflection filter, the filtering region being different for each dedicated spectral component. In other words, each filtering region of the reflection filter must be configured to selectively reflect only one of the dedicated spectral components, the dedicated spectral component being different for each filtering region. Therefore, some overlap may exist between the respective filtering bands of adjacent spectral profiles 58a to 58d, as shown in FIG. 9, if the width of the dedicated spectral components $\lambda_1$, $\lambda_2$, $\lambda_3$ and $\lambda_4$ are sufficiently narrow. It will also be understood that while the spectral profiles of the plurality of filtering regions depicted in FIG. 9 have identical shape and peak reflectance, this need not be the case in other embodiments. For the sake of clarity, the shapes of the dedicated spectral components have not been depicted in the figure.

In FIG. 9, the four spectral profiles 58a to 58d define bandpass reflection filters (i.e., the reflectance is substantial only over a limited bandwidth). However, in other embodiments, the spectral profiles 58a and 58d associated with the dedicated spectral components $\lambda_1$, $\lambda_2$, $\lambda_3$ and $\lambda_4$ may exhibit low-pass or high-pass reflection characteristics without departing from the scope of the present invention. For example, the filtering region 40a associated with the dedicated spectral component having the shortest wavelength $\lambda_1$ may reflect short wavelength electromagnetic radiation up to a cut-off wavelength located between $\lambda_1$ and $\lambda_2$, while the filtering region 40d associated with the dedicated spectral component having the longest wavelength $\lambda_4$ may reflect long wavelength electromagnetic radiation down to a cut-off wavelength located between $\lambda_3$ and $\lambda_4$.

The filtering regions 40a to 40d shown in FIG. 1 could be made of any appropriate material or structure able to provide each of the filtering regions 40a to 40d with the desired spectral profile 58a to 58d, such as shown in FIG. 9. For example, in some embodiments, the filtering regions 40a to 40d may be made up of multilayer thin film structures patterned and defined on the proof mass 32 using conventional or customized photolithographic processes including etching and lift-off processes.

It will also be understood that it may be desirable that the spacing 57 between the filtering regions 40a to 40d is made of a material that is non-reflective to the wavelength of each of the dedicated spectral components $\lambda_1$, $\lambda_2$, $\lambda_3$ and $\lambda_4$. This may be achieved, for example, by depositing a broadband anti-reflection coating or a highly absorptive layer on the proof mass 32 prior to depositing the optical spectral filter 36.

The reflection of the optical beam 26 with dedicated spectral components $\lambda_1$, $\lambda_2$, $\lambda_3$ and $\lambda_4$ on the proof mass 32 as a function of the displacement of the proof mass 32 relative to the support 30, and thus relative to the path 38 of the optical beam 26, will now be considered in greater detail, with reference to FIGS. 11A to 11H. It will be seen that a displacement of the proof mass 32 along the sensing axes 42a and 42b produces, after filtering of the optical beam 26 by the optical spectral filter 36, a change in the optical power of at least one of the plurality of dedicated spectral components 40a to 40d, the change being indicative of the displacement of the proof mass and, thus, of the motion experienced by the support 30.

Figure 11E:
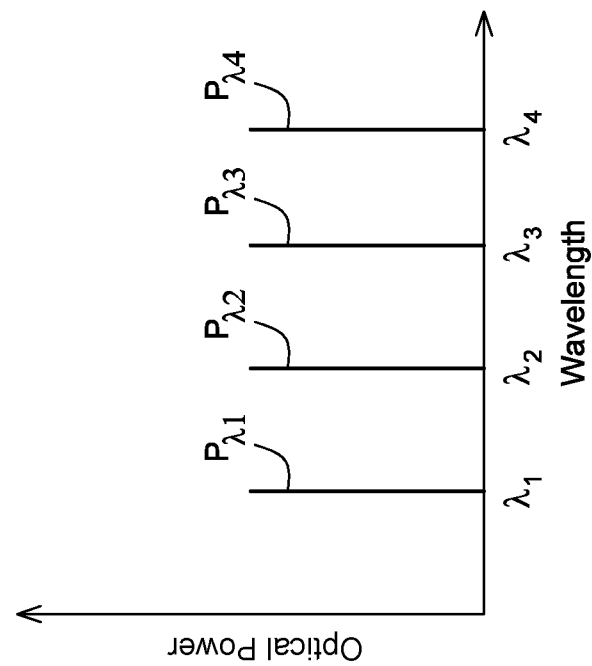
FIGS. 11E to 11H are schematic representations of the optical power plotted as a function of wavelength of the dedicated spectral components of the optical beam after reflection from the optical spectral filter, for the displacements of the proof mass shown in FIGS. 11A to 11D, respectively.
Figure 11A:
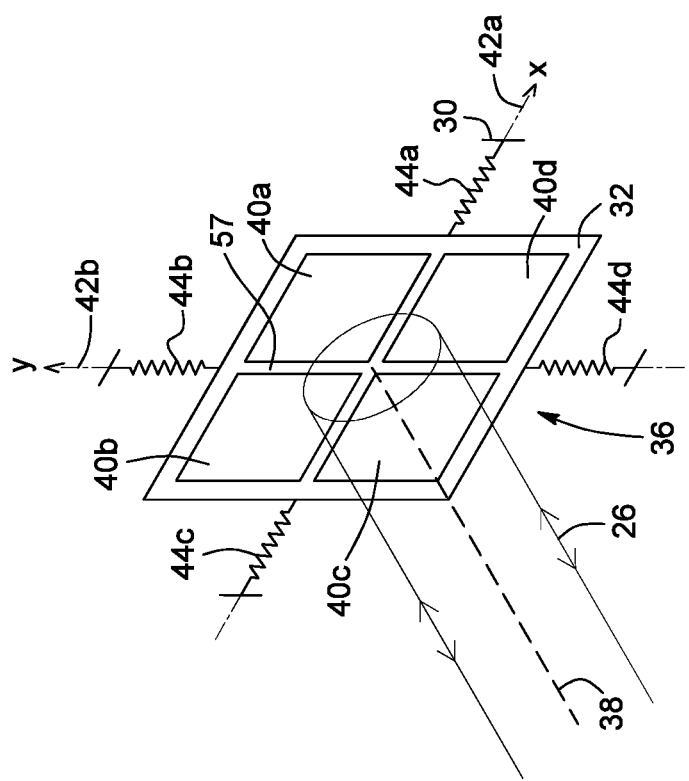
FIGS. 11A to 11D are schematic representations of the reflection of the optical beam from the optical spectral filter mounted on the proof mass of the optical motion responsive system of FIG. 1, for different displacements of the proof mass along the pair of transverse sensing axes.

First, in FIG. 11A, the proof mass 32 is assumed to be a rest. The optical beam 26 is incident on the center of the optical spectral filter 36 and the surface area illuminated by the optical beam 26 is assumed to be the same for each of the four filtering regions 40a to 40d. As discussed above with reference to FIG. 9, each of the filtering regions 40a to 40d has a spectral profile 58a to 58d with a dedicated filtering band configured to reflect a corresponding one of the dedicated spectral components $\lambda_1$, $\lambda_2$, $\lambda_3$ and $\lambda_4$ forming the optical beam 26. Therefore, the optical power $P_{\lambda 1}$, $P_{\lambda 2}$, $P_{\lambda 3}$ and $P_{\lambda 4}$ of each of the dedicated spectral components $\lambda_1$, $\lambda_2$, $\lambda_3$ and $\lambda_4$ of the optical beam 26 after reflection from the optical spectral filter 36 mounted on the proof mass 32 will change in accordance with variations in the surface area of the filtering regions 40a to 40d illuminated by the incident optical beam 26. Such variations result from the proof mass 32 being displaced along one of the sensing axes 42a and 42b which, for convenience, are labeled as the x and y axes, respectively, in FIGS. 11A to 11D. By way of example only, it is assumed that when the proof mass is at rest, as in FIG. 11A, the optical powers $P_{\lambda 1}$, $P_{\lambda 2}$, $P_{\lambda 3}$ and $P_{\lambda 4}$ of the dedicated spectral components $\lambda_1$, $\lambda_2$, $\lambda_3$ and $\lambda_4$ of the optical beam 26 are equal after reflection from the optical spectral filter 36, as shown in FIG. 11E.

Figure 11F:
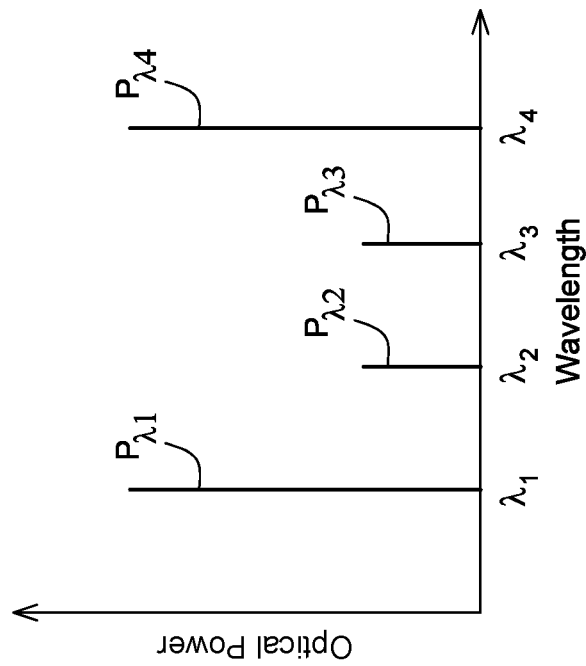
Figure 11B:
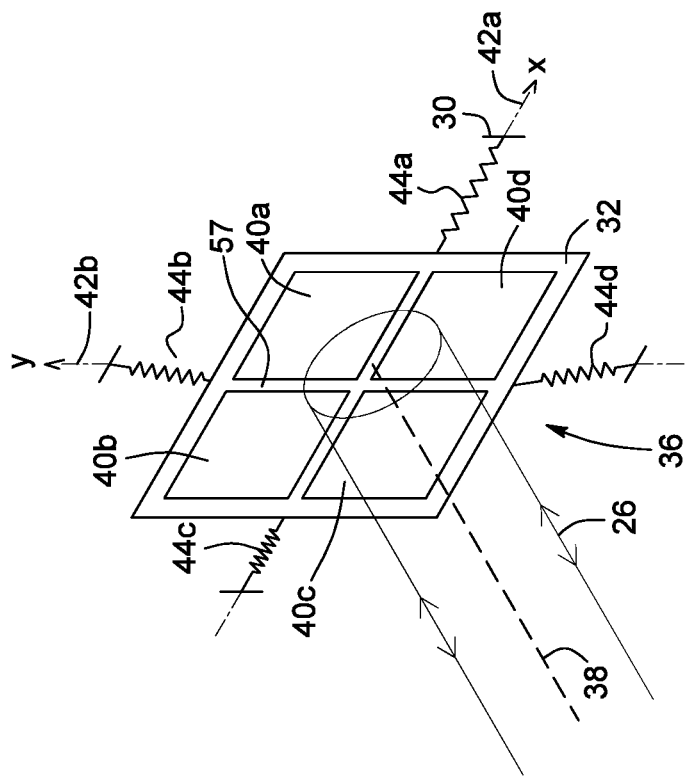

Referring now to FIG. 11B, the proof mass 32 is displaced along the positive x axis such that the respective surface areas of the filtering regions 40a and 40d illuminated by the optical beam 26 become larger than the respective surface areas of the filtering regions 40b and 40c. As a result, in comparison to the configuration of FIGS. 11A and 11E, the optical powers $P_{\lambda 1}$ and $P_{\lambda 4}$ of the dedicated spectral components $\lambda_1$ and $\lambda_4$ of the optical beam 26 after reflection from the optical spectral filter 36 increase while the optical powers $P_{\lambda 2}$ and $P_{\lambda 3}$ of the dedicated spectral components $\lambda_2$ and $\lambda_3$ decrease, as shown in FIG. 11F.

Figure 11G:
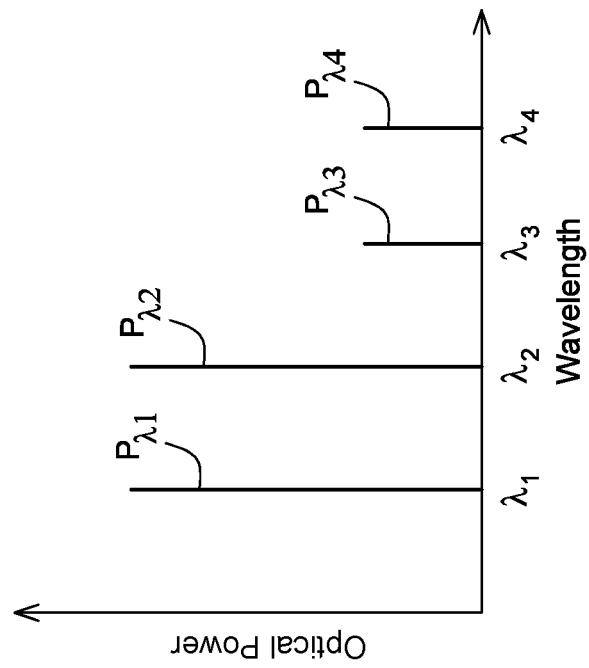
Figure 11C:
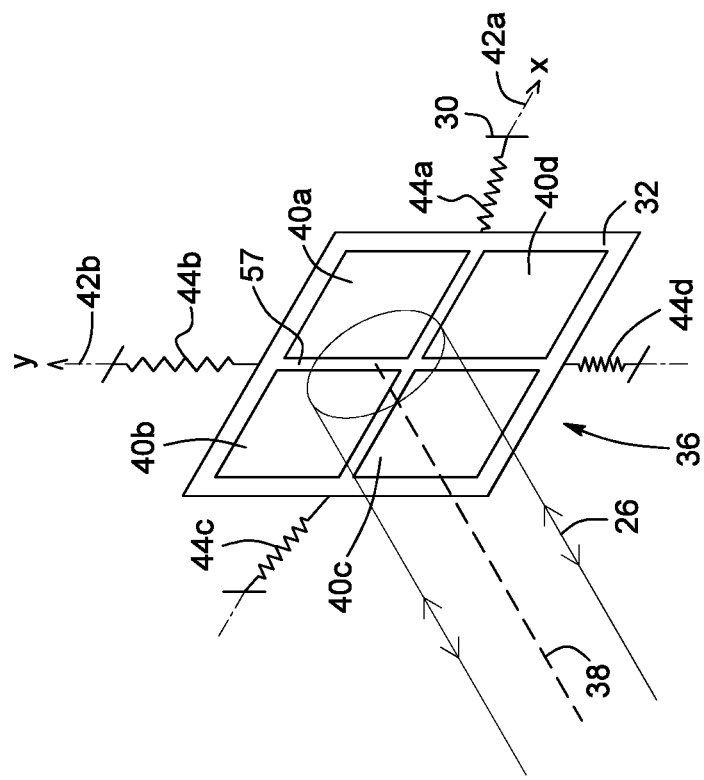

Referring now to FIG. 11C, the proof mass 32 is displaced along the positive y axis such that the respective surface areas of the filtering regions 40a and 40b illuminated by the optical beam 26 become larger than the respective surface areas of the filtering regions 40c and 40d. As a result, in comparison to the configuration of FIGS. 11A and 11E, the optical powers $P_{\lambda 1}$ and $P_{\lambda 2}$ of the dedicated spectral components $\lambda_1$ and $\lambda_2$ of the optical beam 26 after reflection from the optical spectral filter 36 increase while the optical powers $P_{\lambda 3}$ and $P_{\lambda 4}$ of the dedicated spectral components $\lambda_3$ and $\lambda_4$ decrease, as shown in FIG. 11G.

Figure 11H:
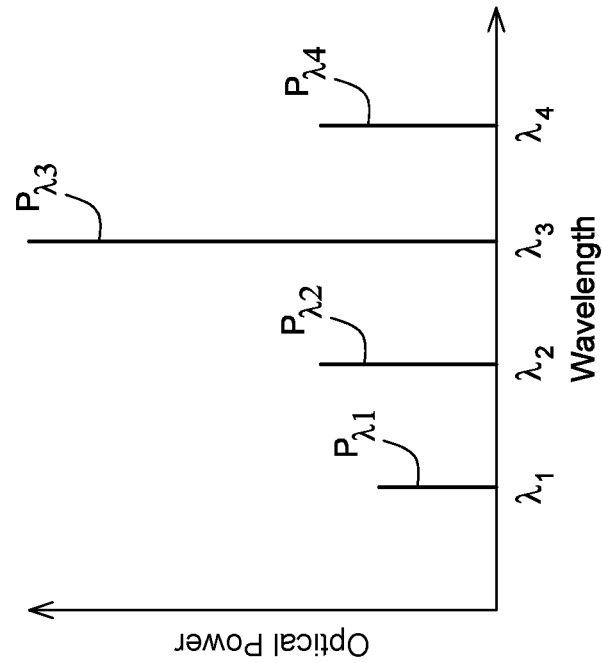
Figure 11D:
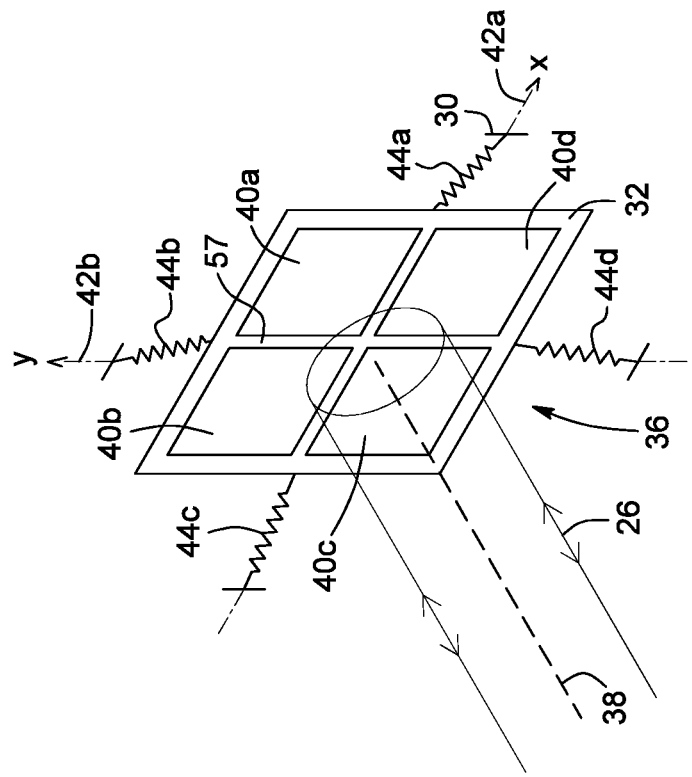

Finally, referring to FIG. 11D, the proof mass 32 is displaced along both the negative x axis and the negative y axis such that the surface area of the filtering region 40c illuminated by the optical beam 26 become larger than the respective surface areas of the filtering regions 40b and 40d, which are themselves larger than the surface area of the filtering region 40a. As a result, after reflection of the optical beam 26 from the optical spectral filter 36, the dedicated spectral components $\lambda_3$ and $\lambda_1$ will have the highest and lowest optical powers $P_{\lambda 3}$ and $P_{\lambda 1}$, respectively, while the optical powers $P_{\lambda 2}$ and $P_{\lambda 4}$ of the dedicated spectral components $\lambda_2$ and $\lambda_4$ will be intermediate between these values, as shown in FIG. 11H.

From the above paragraphs, it will be recognized that a relationship can be established between the displacement of the proof mass along the sensing axes and the optical powers of the dedicated spectral components of the optical beam after reflection from the optical spectral filter mounted on the proof mass. More specifically, it is possible to define the normalized parameters $D_x$ and $D_y$, whose values are proportional to the displacements $\delta_x$ and $\delta_y$ of the proof mass with respect to its rest position:

$$D_x = \frac{(P_{\lambda 1} + P_{\lambda 4}) - (P_{\lambda 2} + P_{\lambda 3})}{(P_{\lambda 1} + P_{\lambda 2} + P_{\lambda 3} + P_{\lambda 4})} = K_x \delta_x, \quad (1)$$

$$D_y = \frac{(P_{\lambda 1} + P_{\lambda 2}) - (P_{\lambda 3} + P_{\lambda 4})}{(P_{\lambda 1} + P_{\lambda 2} + P_{\lambda 3} + P_{\lambda 4})} = K_y \delta_y, \quad (2)$$

where $K_x$ and $K_y$ are proportionality factors. It will be recognized that Eqs. (1) and (2) have the same forms as the well-known expressions developed for quadrant photodiodes [see, e.g., Chu et al. "Two-dimensional optical accelerometer based on commercial DVD pick-up head", *Meas. Sci. Technol.* vol. 18 (2007) p. 265-274].

The factors $K_x$ and $K_y$ can be determined experimentally by carrying out a calibration procedure or theoretically using analytical models or numerical calculations. It will be understood that $K_x$ and $K_y$ need not be constant over the entire range of displacement of the proof mass such that their values may vary as functions of the displacements $\delta_x$ and $\delta_y$ of the proof mass along the x and y coordinates. Once $K_x$ and $K_y$ have been determined, for example via calibration, the displacement of the proof mass along the sensing axes x and y can be obtained by measuring $P_{\lambda 1}$ to $P_{\lambda 4}$ to obtain $D_x$ and $D_y$, as can be seen from Eqs. (1) and (2).

Figure 12A:
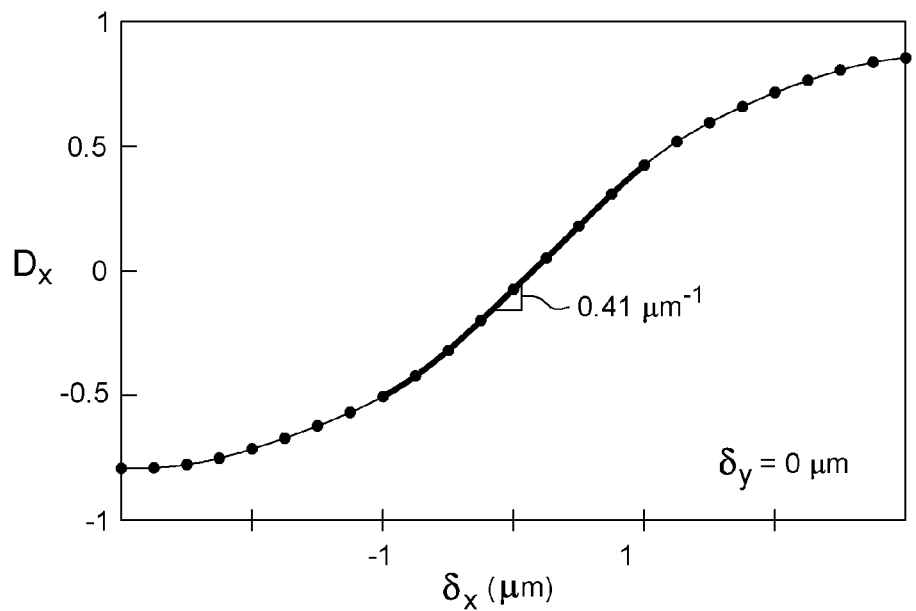
FIG. 12A shows the variation of the normalized parameter $D_x$ of the optical beam reflected from the proof mass plotted as a function of the displacement $\delta_x$ of the proof mass relative to its rest position along the sensing axis x according to an embodiment, wherein the displacement $\delta_y$ along the sensing axis y is equal to 0 µm.

Referring now to FIG. 12A, and by way of example only, there is shown a graph, obtained from numerical simulations, of the variation of the normalized parameter $D_x$ plotted as a function of the displacement $\delta_x$ of the proof mass relative to its rest position along the sensing axis x for $\delta_y=0$ μm. A similar graph could be obtained for the variation of the normalized parameter $D_y$ plotted as a function of the displacement $\delta_y$ of the proof mass relative to its rest position along the sensing axis y. In this exemplary embodiment, the diameter of the optical beam as it impinges on the optical spectral filter is 20 μm and the spacing between adjacent filtering regions of the optical spectral filter is 4 μm. The transverse irradiance profile of the optical beam is assumed to be Gaussian. It can be seen that the curve of $D_x$ as a function of $\delta_x$ has a linear range extending between $\pm 1$ μm, where $K_x$ is approximately constant and equal to 0.41 $\mu m^{-1}$. It will be understood that this linear range can represent an appropriate range of operation for this embodiment of the optical motion responsive system, where the value of $K_x$ can be interpreted as the responsivity of the system to detect a displacement of the proof mass along the sensing axis x.

Figure 12B:
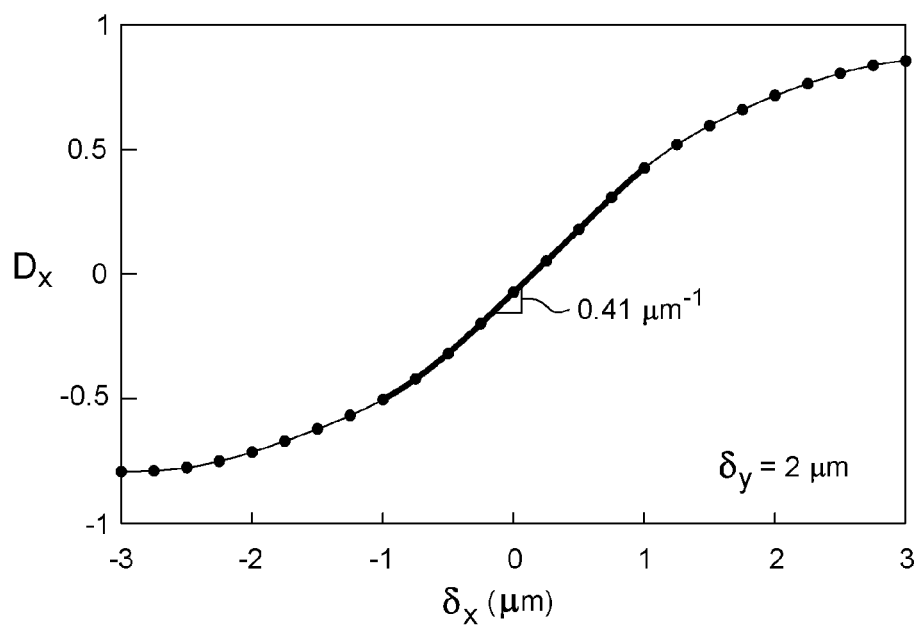
FIG. 12B is the same as in FIG. 12A, except that the displacement $\delta_y$ is equal to 2 µm.

It will be also understood that the extent of the linear range where $K_x$ is constant and the value of $K_x$ in this linear range can be controlled by adjusting the spot size of the optical beam impinging on the optical spectral filter. In particular, decreasing the spot size of the optical beam can lead to an increase in sensitivity but also to a corresponding reduction of the linear range where $K_x$ is approximately constant. Furthermore, referring to FIG. 12B, which is the same as FIG. 12A except that $\delta_y=2$ μm, it can be seen that the variation of $D_x$ as a function of $\delta_x$ remains, in this embodiment, essentially independent of the displacement along the sensing axis y. In other words, embodiments of the invention can allow the displacements of the proof mass along the sensing axes x and y to be decoupled from each other.

Second Exemplary Embodiment of the Optical Module

In the first embodiment described above, the optical module was used for simultaneously and independently monitoring the displacement of a proof mass along two mutually orthogonal sensing axes. However, as will now be described, other embodiments of the optical module can be used to monitor the displacement of a proof mass along a single sensing axis.

Figure 5:
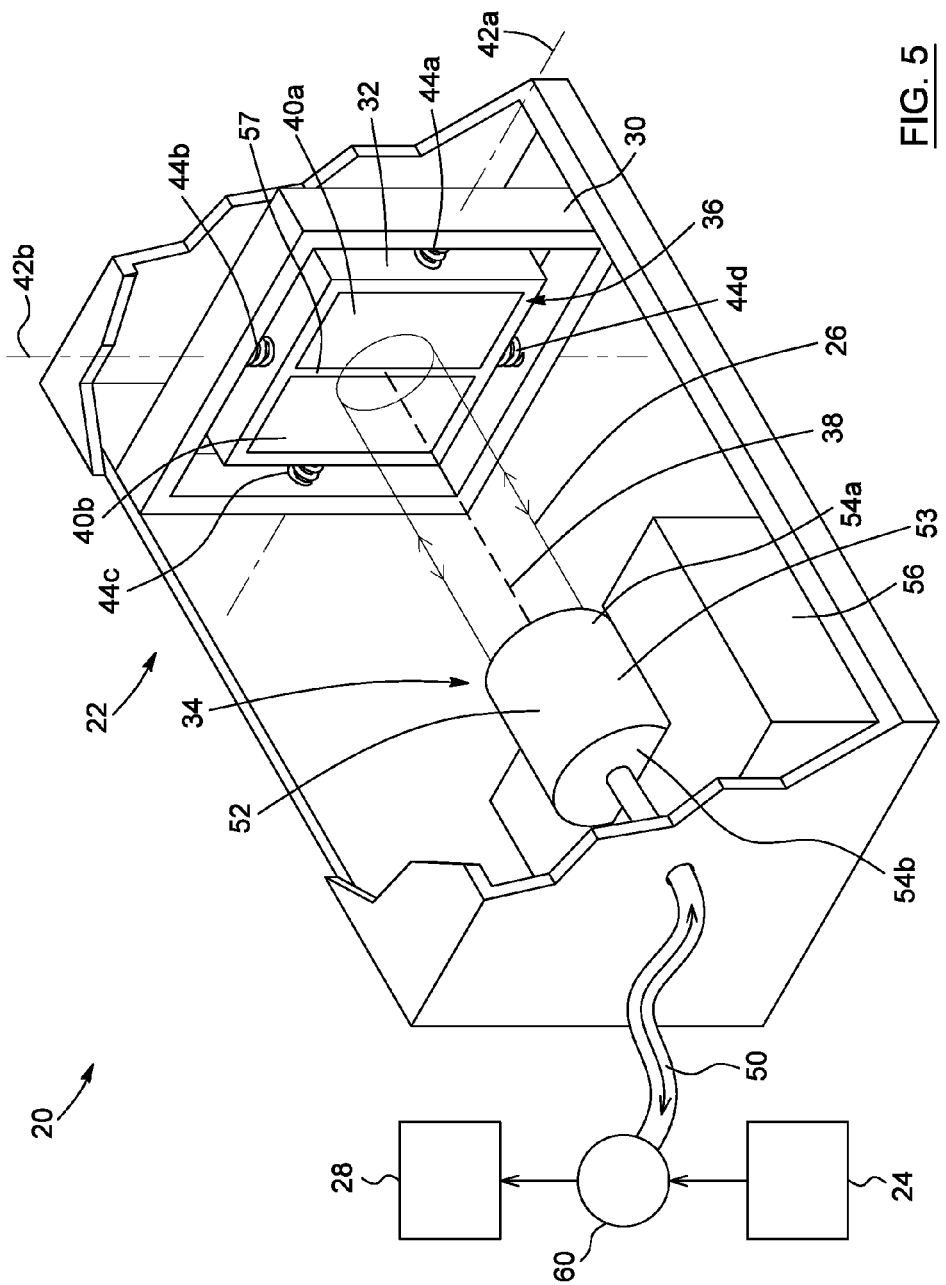
FIG. 5 is a schematic perspective and partially cutaway side view of an optical motion responsive system according to another embodiment of the invention.

Referring now to FIG. 5, another embodiment of an optical module 22 is shown. This embodiment shares many features with the embodiment described above and illustrated in FIGS. 1 to 3 in that it generally includes a support 30 and a proof mass 32 mechanically coupled and displaceable relative to the support 30. The optical module 22 also includes an optical monitoring assembly 34 fixed relative to the support 30 for monitoring the proof mass 32 with the optical beam 26 incident thereon, and an optical spectral filter 36 positioned in a path 38 of the optical beam 26. However, in contrast to the embodiment of FIGS. 1 to 3, the displacement of the proof mass 32 shown in FIG. 5 is monitored along a single transverse sensing axis 42a lying in a plane perpendicular to the path 38 of the optical beam 26 incident on the proof mass 32. Hence, in the embodiment of FIG. 5, the optical beam 26 generated by the light source assembly 24 and projected onto the proof mass 32 via the optical monitoring assembly 34 includes two dedicated spectral components of wavelengths $\lambda_1$ and $\lambda_2$. In such a case, the light source assembly 24 may be provided with only two light sources, each generating a corresponding one of the two dedicated spectral components $\lambda_1$ and $\lambda_2$.

Still referring to FIG. 5, the optical spectral filter 36 of the optical module 22 of the optical motion responsive system 20 is a reflection filter positioned in the path 38 of the optical beam 26. The optical spectral filter 36 includes two filtering regions 40a and 40b, which therefore correspond to two reflecting regions. In the illustrated embodiment, the two filtering regions 40a to 40d are shaped as two rectangles whose respective adjacent sides are perpendicular to the transverse sensing axis 42a. However, it will be understood that in other embodiments, the filtering regions 40a and 40b may assume a variety of shapes other than rectangle without departing from the scope of the invention. For example, in some embodiments, the two filtering regions may be shaped as two half-circles having their bases that face each other and oriented perpendicularly to the transverse sensing axis. Of course, the shape of the filtering regions 40a and 40b could be varied in order to adjust the sensitivity and linearity of the optical module 22 as functions of the displacement of the proof mass 32 with respect to the support 30.

Each filtering region 40a and 40b is associated with a corresponding one of the two dedicated spectral components $\lambda_1$ and $\lambda_2$ of the optical beam 26. Moreover, in a manner similar to the spectra shown in FIG. 9 in connection with the embodiment of FIGS. 1 to 3, each filtering region 40a and 40b of the optical spectral filter in FIG. 5 has a spectral profile that includes a distinct dedicated filtering band encompassing the corresponding dedicated spectral component $\lambda_1$ or $\lambda_2$. Again, it will be understood that the spectral profiles of the two filtering regions 40a and 40b may assume any appropriate shape, width, and spectral separation as long as each dedicated spectral component $\lambda_1$ or $\lambda_2$ of the optical beam 26 is encompassed within the dedicated filtering band of only one filtering region 40a and 40b, the filtering region 40a and 40b being different for each dedicated spectral component $\lambda_1$ or $\lambda_2$.

In the optical module 22 illustrated in FIG. 5, the displacement of the proof mass 32 along the sensing axis 42a produces, after filtering of the optical beam 26 by the optical spectral filter 36, changes in the optical powers of the two dedicated spectral components $\lambda_1$ and $\lambda_2$. Those changes are indicative of the displacement of the proof mass and, thus, of the motion experienced by the support 30, as can be understood by referring to FIGS. 11A, 11B, 11E and 11F. Furthermore, as discussed above, a relationship can be established between the displacement of the proof mass along the single sensing axis and the optical powers carried by the two dedicated spectral components of the optical beam after reflection from the optical spectral filter mounted on the proof mass. More specifically, for the embodiment of FIG. 5, the expression for $D_x$ reduces to $(P_{\lambda 1}-P_{\lambda 2})/(P_{\lambda 1}+P_{\lambda 2})$ and is proportional to the displacement $\delta_x$ of the proof mass with respect to its rest position along the single sensing axis x.

Third Exemplary Embodiment of the Optical Module

Figure 17:
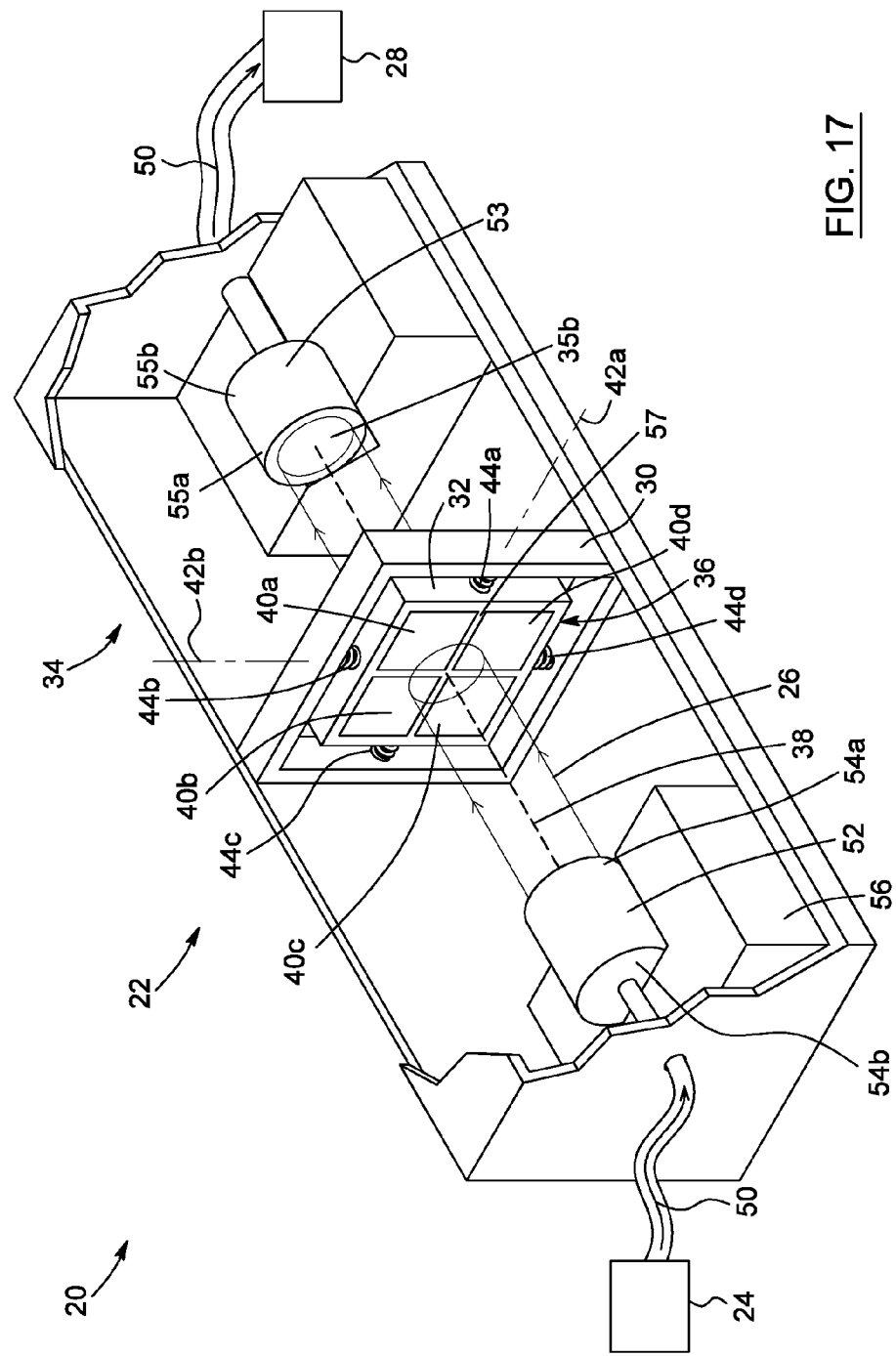
FIG. 17 is a schematic perspective and partially cutaway side view of an optical motion responsive system according to another embodiment of the invention.
Figure 18:
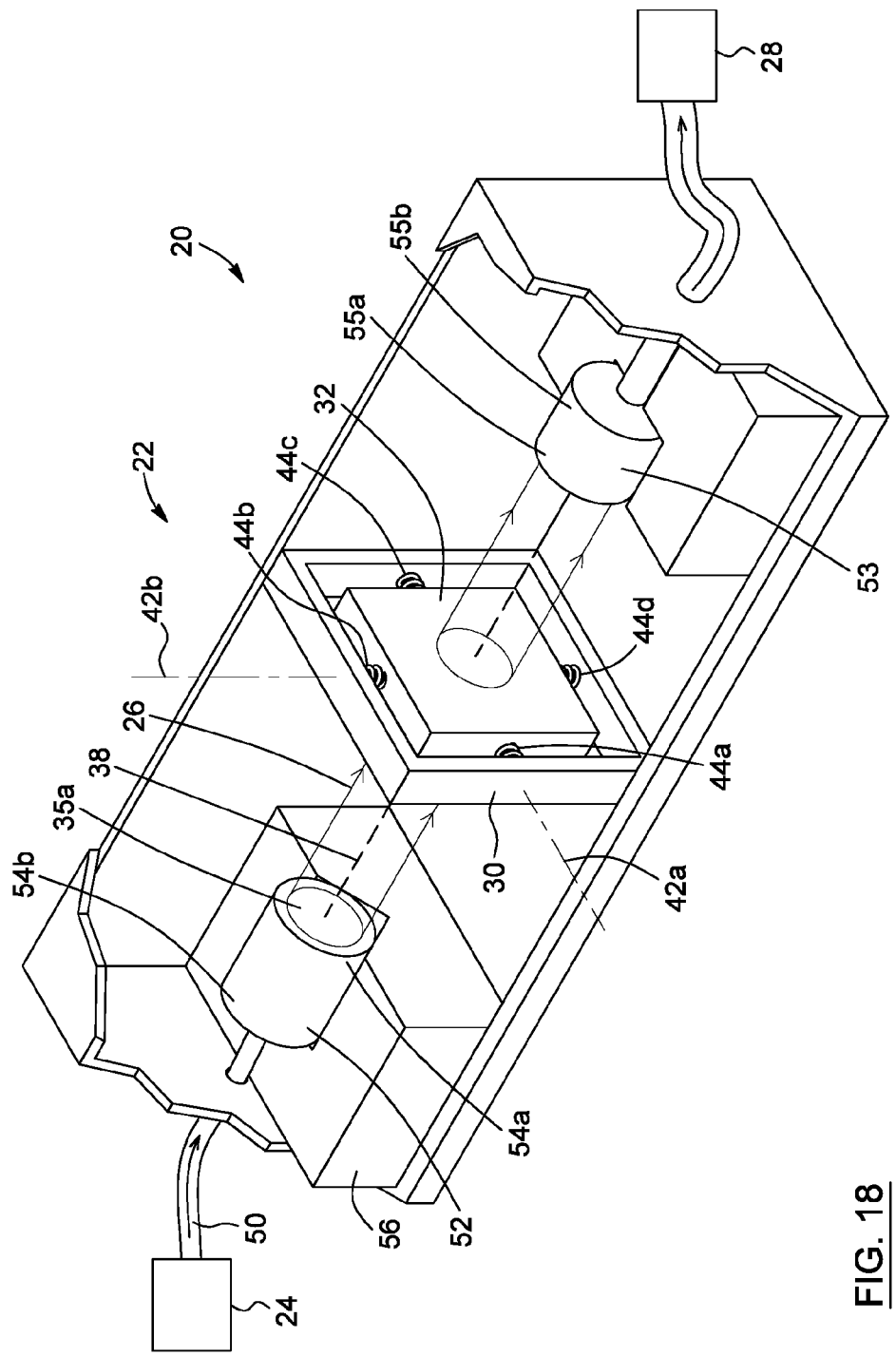
FIG. 18 is another schematic perspective and partially cutaway side view of the optical motion responsive system of FIG. 17.
Figure 19:
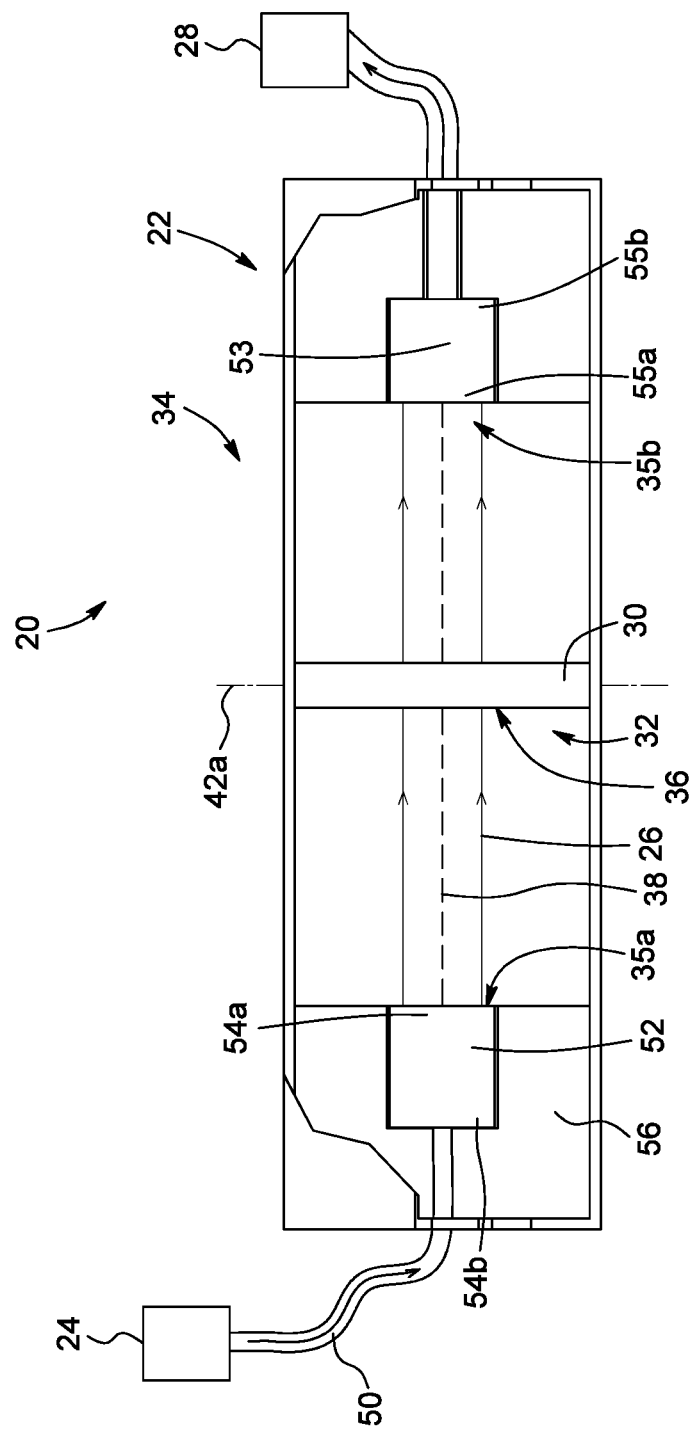
FIG. 19 is a top view of the optical motion responsive system of FIG. 17.

Referring now to FIGS. 17 to 19, a third embodiment of an optical module 22 is shown. Again, this embodiment shares many features with the embodiment described above and illustrated in FIGS. 1 to 3, in that it generally includes a support 30 and a proof mass 32 mechanically coupled and displaceable relative to the support 30 along two mutually perpendicular sensing axes 42a and 42b. The optical module 22 also includes an optical monitoring assembly 34 fixed relative to the support 30 for monitoring the proof mass 32 with an optical beam 26 incident thereon and an optical spectral filter 36 positioned in a path 38 of the optical beam 26.

The embodiments shown in FIGS. 1 to 3 and in FIGS. 17 to 19 differ mainly in the principles of operation of the optical spectral filter 36. Specifically, although in the embodiment of FIGS. 1 to 3, the optical spectral filter 36 is a reflection filter mounted on the proof mass 32, in the embodiment of FIGS. 17 to 19, the optical spectral filter 36 is a transmission filter mounted on the proof mass. In this regard, it is to be recalled that the term "optical spectral filter" as used throughout the present description is meant to encompass both a reflection and a transmission filter. The operation of the optical spectral filter 36 of the embodiment of FIGS. 17 to 19 will now be described in greater detail.

The optical spectral filter 36 includes a plurality of filtering regions 40a to 40d, which therefore corresponds to a plurality of transmitting regions. In the illustrated embodiment, the optical spectral filter 36 includes four filtering regions 40a to 40d arranged on the proof mass 32 and shaped as four squares arranged to form a larger square whose sides are in alignment with the pair of mutually orthogonal transverse sensing axes 42a and 42b. However, only two filtering regions could be provided in embodiments intended for motion sensing along a single axis, as discussed above in connection with the embodiment of FIG. 5.

It will be understood, however, that in other embodiments, the filtering regions 40a to 40d may assume a variety of shapes other than square without departing from the scope of the invention. For example, in some embodiments, the four filtering regions 40a to 40d may be shaped as four quadrants arranged to form a circle and be in alignment with the pair of mutually orthogonal transverse sensing axes 42a and 42b. In particular, the shape of the filtering regions 40a to 40d could be varied in order to adjust the sensitivity and the linearity of the response of the optical module 22 as functions of the displacement of the proof mass 32 with respect to the support 30, as discussed above.

Referring more specifically to FIG. 17, the optical monitoring assembly 34 of this exemplary embodiment includes a light entry interface 35a for directing the optical beam 26 toward the proof mass 32 for incidence thereonto, and a light exit interface 35b for collecting the optical beam 26 after transmission through the proof mass 32 and the optical spectral filter 36 mounted thereonto. In FIG. 17, the light entry interface 35a and the light exit interface 35b are distinct optical interfaces, as discussed in greater detail below.

The light source assembly 24 optically coupled to the optical monitoring assembly 34 is configured for generating the optical beam 26 made up of a plurality of dedicated spectral components and for projecting the same onto the proof mass via the light entry interface 35a of the optical monitoring assembly 34. In the illustrated embodiment, the optical beam 26 includes four dedicated spectral components $\lambda_1$, $\lambda_2$, $\lambda_3$ and $\lambda_4$. The light source assembly 24 may thus include a plurality of light sources, each being configured to generate a corresponding one of the plurality of the dedicated spectral components $\lambda_1$, $\lambda_2$, $\lambda_3$ and $\lambda_4$. The light sources preferably have a linewidth sufficiently narrow so that each of the dedicated spectral components $\lambda_1$, $\lambda_2$, $\lambda_3$ and $\lambda_4$ is filtered (e.g. reflected or transmitted) only by the corresponding filtering regions 40a to 40d of the optical spectral filter 36.

Still referring to FIG. 17, the optical motion responsive system 20 may further include a light focusing element 52 for focusing the optical beam 26 onto the proof mass 32 via the light entry interface 35a of the optical monitoring assembly 34. At least one optical fiber 50 coupled to the optical module 22 can be used to guide the optical beam 26 to the light focusing element 52, but free-space optics could alternatively be used. As shown in FIG. 18, the light focusing element 52 has a proximal end 54a having an endface defining the light entry interface 34 and a distal end 54b optically connectable to the optical fiber 50. The light focusing element 52 is preferably embodied by a GRIN lens, but, as described above, other types of light focusing elements could be used without departing from the scope of the present invention. As also mentioned above, the length of the light focusing element 52 and the spacing between the light focusing element 52 and the proof mass 32 can be varied according to the requirements and particularities of the intended application.

Still referring to FIGS. 17 to 19, the optical beam 26 projected by the light focusing element 52 onto the proof mass 32 impinges on the filtering regions 40a to 40d of the optical spectral filter 36 mounted on the proof mass 32. As mentioned above, the optical spectral filter 36 in FIGS. 17 to 19 is a transmission filter such that the plurality of filtering regions 40a to 40d defines a plurality of transmitting regions arranged on the proof mass 32.

Figure 10:
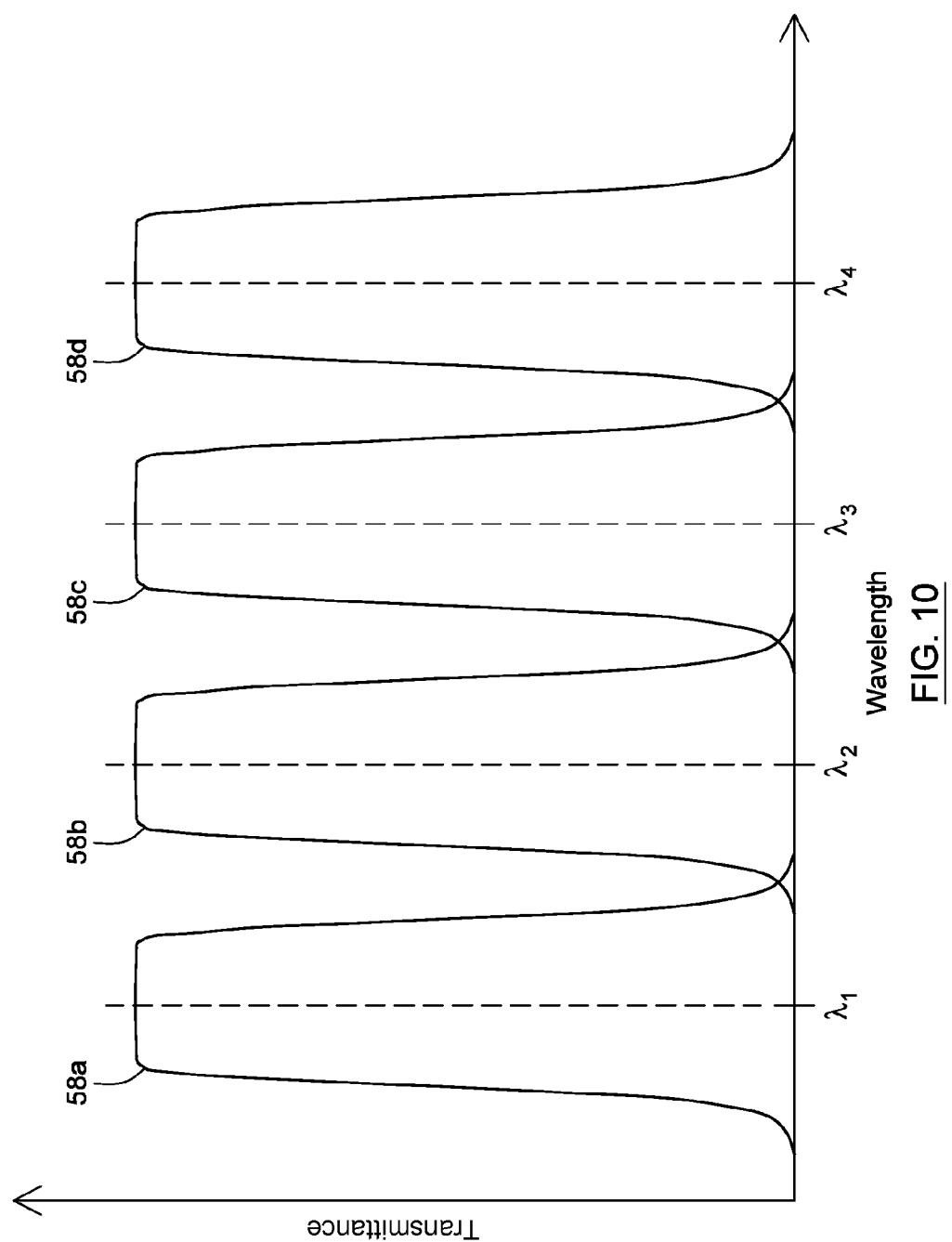
FIG. 10 shows the spectral profiles plotted as a function of wavelength of the filtering regions of the optical spectral filter shown in FIG. 6, wherein the spectral profile of each filtering region defines a bandpass transmission filter.

Each filtering region 40a to 40d is associated with a corresponding one of the plurality of dedicated spectral components $\lambda_1$, $\lambda_2$, $\lambda_3$ and $\lambda_4$ of the optical beam 26. As shown in FIG. 10, each filtering region 40a to 40d has a spectral profile 58a to 58d that includes a distinct dedicated filtering band encompassing the corresponding dedicated spectral component $\lambda_1$, $\lambda_2$, $\lambda_3$ or $\lambda_4$. In one embodiment, the main wavelengths $\lambda_1$, $\lambda_2$, $\lambda_3$ and $\lambda_4$ may be respectively equal to 1551, 1571, 1591 and 1611 nm. Because the filtering regions 40a to 40d correspond to transmitting regions, the spectral profile 58a to 58d of each filtering region 40a to 40d defines a bandpass transmission filter whose dedicated filtering band defines a dedicated transmission band. Therefore, each dedicated spectral component of the optical beam is associated with a corresponding one of the plurality of transmitting regions of the transmission filter and lies within the corresponding dedicated transmission band.

It will be understood that in embodiments where the optical spectral filter is a transmission filter, the spectral profiles of the plurality of filtering regions may assume any appropriate shape, width, and spectral separation as long as each dedicated spectral component of the optical beam is encompassed within the dedicated filtering band of only one of the filtering regions of the transmission filter, the filtering region being different for each dedicated spectral component. In other words, each filtering region of the transmission filter must be configured to selectively transmit only one of the dedicated spectral components, the dedicated spectral component being different for each filtering region. Therefore, some overlap may exist between the respective filtering bands of adjacent spectral profiles 58a to 58d shown in FIG. 10, provided that the width of the dedicated spectral components $\lambda_1$, $\lambda_2$, $\lambda_3$ and $\lambda_4$ are sufficiently narrow.

In addition, although in FIG. 10 the four spectral profiles 58a to 58d are bandpass transmission filters, in other embodiments, the spectral profiles 58a and 58d associated with the dedicated spectral components may exhibit low-pass or high-pass reflection characteristics without departing from the scope of the present invention. For example, the filtering region 40a associated with the dedicated spectral component having the shortest wavelength $\lambda_1$ may transmit short wavelength electromagnetic radiation up to a cut-off wavelength located between $\lambda_1$ and $\lambda_2$, while the filtering region 40d associated with the dedicated spectral component having the longest wavelength $\lambda_4$ may transmit long wavelength electromagnetic radiation down to a cut-off wavelength located between $\lambda_3$ and $\lambda_4$.

As mentioned above, the filtering regions 40a to 40d shown in FIG. 17 could be made of any appropriate material or structure able to provide each of the filtering regions 40a to 40d with the desired spectral profile 58a to 58d, such as shown in FIG. 10. For example, in some embodiments, the filtering regions 40a to 40d may consist of multilayer thin-film structures patterned and defined on the proof mass 32 using conventional or customized photolithographic processes. Likewise, the spacing 57 between the filtering regions may exhibit reflective or absorptive characteristics and be embodied by patterning the proof mass 32 with reflective metals (e.g. aluminum) into a cross-shaped pattern using conventional or customized photolithographic processes.

The displacement of the proof mass 32 along the sensing axes 42a and 42b produces, after selective transmission of the optical beam 26 through the optical spectral filter 36 and the proof mass 32, a change in the optical power of at least one of the plurality of dedicated spectral components $\lambda_1$, $\lambda_2$, $\lambda_3$ and $\lambda_4$ that is indicative of the displacement of the proof mass 32 and, thus, of the motion experienced by the support 30. In this regard, it will be understood that in embodiments where the optical beam is transmitted through the proof mass 32, it is desirable that the proof mass 32 be made of a transparent or low absorption material at the wavelengths $\lambda_1$, $\lambda_2$, $\lambda_3$ and $\lambda_4$ of the dedicated spectral components.

In this regard, the concepts introduced above in connection with FIGS. 11A to 11H can be applied to embodiments such as that shown in FIGS. 17 to 19, where the optical spectral filter 36 is a transmission filter rather than a reflection filter. In particular, the optical power $P_{\lambda 1}$, $P_{\lambda 2}$, $P_{\lambda 3}$ and $P_{\lambda 4}$ of each dedicated spectral components $\lambda_1$, $\lambda_2$, $\lambda_3$ and $\lambda_4$ of the optical beam 26 after transmission through the optical spectral filter 36 will change in accordance with variations in the surface area of the filtering regions 40a to 40d illuminated by the optical beam 26. It will thus be recognized that the expressions relating the normalized parameters $D_x$ and $D_y$ to the displacements $\delta_x$ and $\delta_y$ of the proof mass 32 set out in Eqs. (1) and (2) and illustrated in FIGS. 12A and 12B may also be applied to embodiments where the optical spectral filter 36 is a transmission filter mounted on the proof mass 32.

Referring back to FIG. 17, the optical motion responsive system 20 may further include a light collecting element 53 for collecting the optical beam 26 after filtering by the optical spectral filter 36 and transmission through the proof mass 32 and for directing the filtered optical beam 26 toward the optical detector assembly 28. The light collecting element 53 may have a proximal end 55a and a distal end 55b, the proximal end having an endface defining the light exit interface 35b. In the illustrated embodiment, the light collecting element 53 is embodied is embodied by a GRIN lens, but other types of light focusing elements could be used without departing from the scope of the present invention.

Fourth Exemplary Embodiment of the Optical Module

Figure 6:
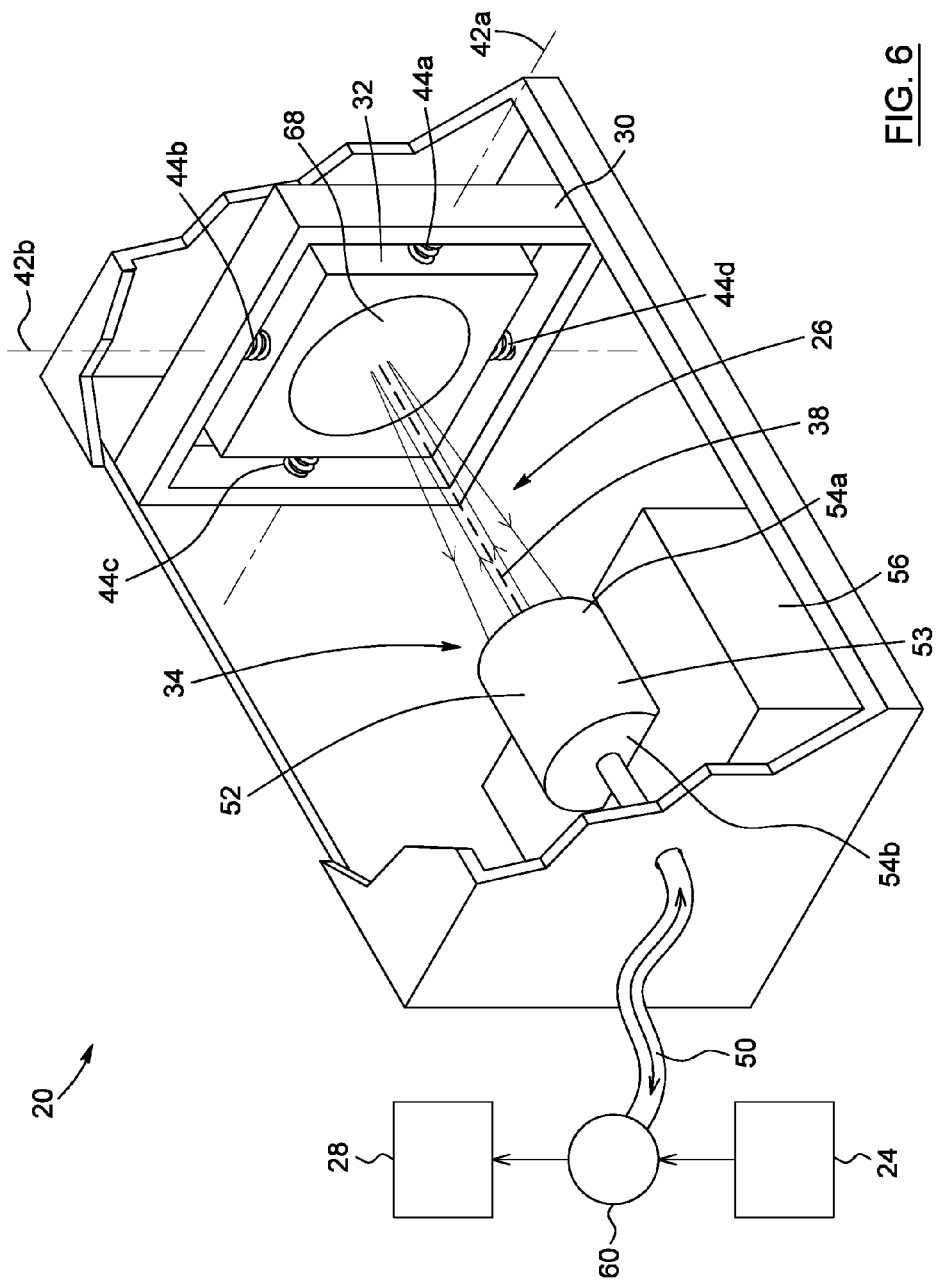
FIG. 6 is a schematic perspective and partially cutaway side view of an optical motion responsive system according to another embodiment of the invention.
Figure 7:
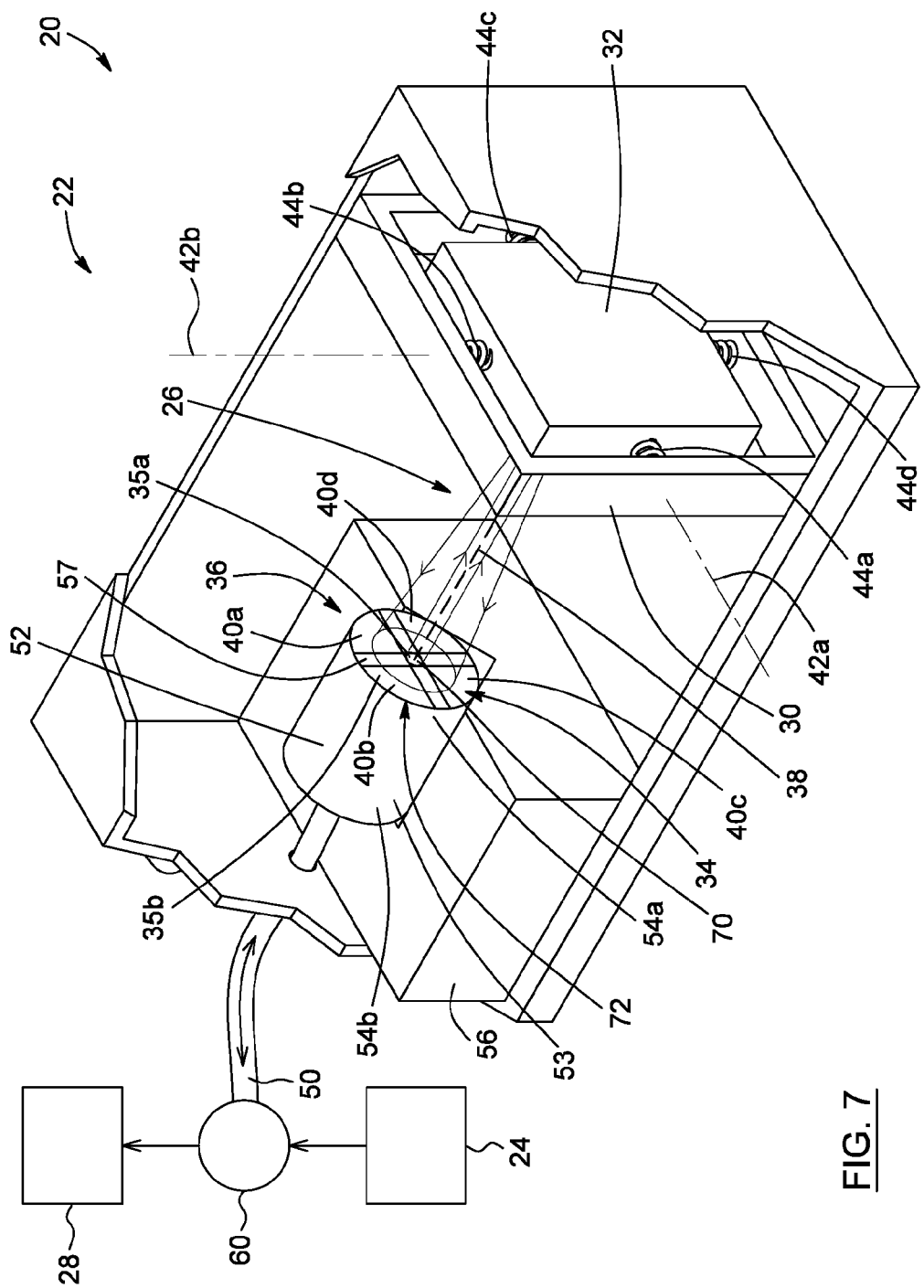
FIG. 7 is another schematic perspective and partially cutaway side view of the optical motion responsive system of FIG. 6.
Figure 8:
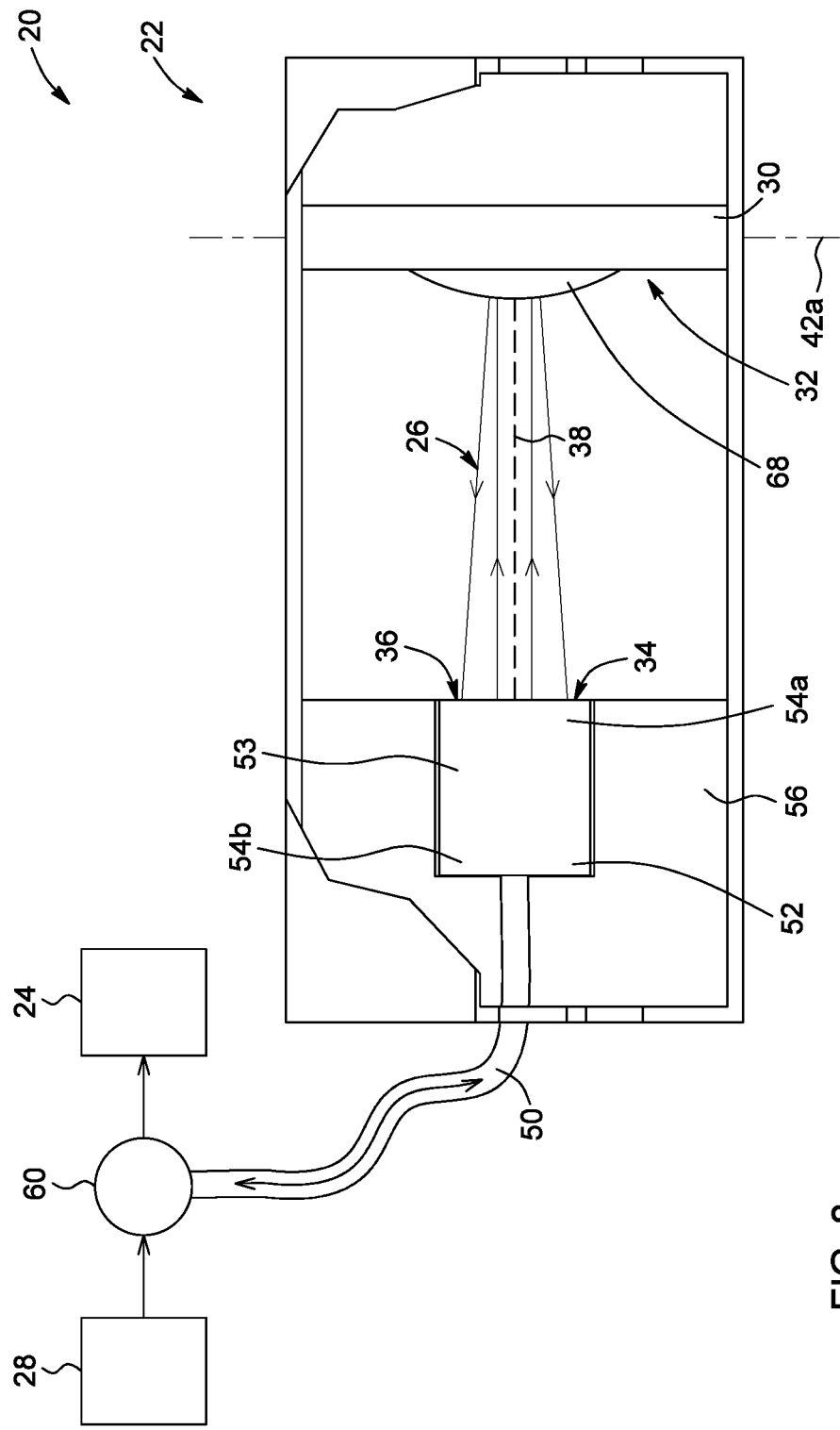
FIG. 8 is a top view of the optical motion responsive system of FIG. 6.

Referring now to FIGS. 6 to 8, a fourth embodiment of an optical module 22 is shown.

This embodiment is similar to the embodiments of FIGS. 1 to 3 and 17 to 19, in that it generally includes a support 30 and a proof mass 32 mechanically coupled and displaceable relative to the support 30 along two mutually perpendicular sensing axes 42a and 42b. The optical module 22 also includes an optical monitoring assembly 34 fixed relative to the support 30 for monitoring the proof mass 32 with an optical beam 26 incident thereon and an optical spectral filter 36 positioned in a path 38 of the optical beam 26.

In FIGS. 6 to 8, the optical beam 26 is reflected by the proof mass 32 as in FIGS. 1 to 3, and the optical spectral filter 36 is a transmission filter as in FIGS. 17 to 19. However, in contrast to the embodiments of FIGS. 1 to 3 and 17 to 19, the optical spectral filter 36 in FIGS. 6 to 8 is mounted on the optical monitoring assembly 34 rather than on the proof mass 32, as described below. Moreover, the optical module 22 also includes a curved reflective surface 68 mounted on the proof mass 32.

Referring to FIG. 7, in this exemplary embodiment, the optical monitoring assembly 34 also includes a light entry interface 35a for directing the optical beam 26 toward the optical spectral filter 36 mounted on the proof mass 32 for reflection thereon, and a light exit interface 35b for collecting the optical beam 26 reflected from the optical spectral filter 36. In FIG. 7, the light entry interface 35a and the light exit interface 35b are parts of a common optical interface of the optical monitoring assembly 34.

More specifically, the optical monitoring assembly 34 may include an inner portion 70 that defines the light entry interface 35a and an outer portion 72 that surrounds the inner portion 70 and defines the light exit interface 35b. The optical spectral filter 36 is mounted on the outer portion 72. In the illustrated embodiment, the optical spectral filter 36 includes four filtering regions 40a to 40d arranged on the outer portion 72, but only two filtering regions could be provided in embodiments intended for motion sensing along a single axis, as discussed above in connection with the embodiment of FIG. 5. In FIG. 7, the four filtering regions 40a to 40d are shaped as four quadrants arranged to form a circle, both straight sides of each quadrant being in alignment with the mutually orthogonal transverse sensing axes 42a and 42b. However, as mentioned above, other shapes could be envisioned for the filtering regions 40a to 40d in order to adjust the sensitivity and the linearity of the response of the optical module 22 to the displacement of the proof mass 32 with respect to the support 30.

Still referring to FIG. 7, the optical motion responsive system 20 may further include a light focusing element 52 for focusing the optical beam 26 onto the proof mass 32 via the inner portion 70 defining the light entry interface 35a of the optical monitoring assembly 34. At least one optical fiber 50 coupled to the optical module 22 can be used to guide the optical beam 26 to the light focusing element 52, but free-space optics could alternatively be used. As shown in FIG. 7, the light focusing element 52 has a proximal end 54a having an endface defining the optical monitoring assembly 34 and a distal end 54b optically connectable to the optical fiber 50. The light focusing element 52 is preferably embodied by a GRIN lens, but other types of light focusing elements could be used without departing from the scope of the present invention, as mentioned above.

The filtering regions 40a to 40d may be deposited onto the portion of the endface of the proximal end 54a of the light focusing element 52 that corresponds to the outer portion 72 defining the light exit interface 35b of the optical monitoring assembly 34 using any appropriate fabrication techniques. For example, in some embodiments, the filtering regions 40a to 40d may consist of multilayer thin-film structures patterned and defined using conventional or customized photolithographic processes. As mentioned above, the length of the light focusing element 52 and the separation between the light focusing element 52 and the proof mass 32 can be varied according to the requirements and particularities of the intended application.

In the embodiment of FIGS. 6 to 8, the curved reflective surface 68 mounted on the proof mass 32 is a convex reflective surface bulging toward the optical monitoring assembly 34. Such a convex reflective surface may be embodied, for example, by a spherical or parabolic convex mirror made of or coated with a metallic reflective material. However, any other optical element providing a convex reflective surface such that the optical beam 26 projected onto the proof mass 32 from the inner portion 70 of the optical monitoring assembly 34 diverges or spreads out after reflection could be used. Preferably, the reflectance is uniform over the curved reflective surface 68.

The provision of a diverging reflective surface on the proof mass offers the advantage that any displacement of the proof mass 32 relative to the support 30 and, thus, to the optical monitoring assembly 34, is magnified as the diverging optical beam 26 reflected by the curved reflective surface 68 reaches the optical spectral filter 36 mounted on the peripheral outer portion 72 of the optical monitoring assembly 34. This can lead to an increase in the responsivity provided by the optical motion responsive system 20. Moreover, as a result of the increased responsivity provided by the optical magnification of the optical beam 26 after reflection thereof from the proof mass 32, it may be possible to reduce the mechanical noise associated with the Brownian motion of the proof mass 32 by increasing the stiffness constant of the springs 44a to 44d without affecting deleteriously the overall sensitivity of the system 20. In addition, the embodiment of FIGS. 6 to 8 may also yield a better collection of the light reflected from the proof mass.

It will be understood that although the curved reflective surface 68 is convex in the embodiment of FIGS. 6 to 8, in other embodiments, a divergent reflected beam after reflection on the proof mass 32 could alternatively be obtained with a concave reflective surface. This could be achieved, for example, by properly selecting the distance between the concave reflective surface and the common optical interface that defines the light entry interface 35a and the light exit interface 35b.

Still referring to FIGS. 6 to 8, the diverging optical beam 26 reflected from the curved reflective surface 68 mounted on the proof mass impinges on the filtering regions 40a to 40d of the optical spectral filter 36 mounted on the outer portion 72 that defines the light exit interface 35b. As mentioned above, the optical spectral filter 36 in FIGS. 6 to 8 is a transmission filter such that the plurality of filtering regions 40a to 40d defines a plurality of transmitting regions arranged on the outer portion 72 that defines the light exit interface 35b.

As discussed above with reference to FIG. 10, each filtering region 40a to 40d is associated with a corresponding one of the plurality of dedicated spectral components $\lambda_1$, $\lambda_2$, $\lambda_3$ and $\lambda_4$ of the optical beam 26 and has a spectral profile 58a to 58d that includes a distinct dedicated filtering band encompassing the corresponding dedicated spectral component $\lambda_1$, $\lambda_2$, $\lambda_3$ or $\lambda_4$. Because the filtering regions 40a to 40d correspond to transmitting regions, the spectral profile 58a to 58d of each filtering region 40a to 40d defines a bandpass transmission filter whose dedicated filtering band defines a dedicated transmission band. Therefore, each dedicated spectral component of the optical beam 26 is associated with a corresponding one of the plurality of transmitting regions of the transmission filter and lies within the corresponding dedicated transmission band.

The displacement of the proof mass 32 along the sensing axes 42a and 42b produces, after the optical beam is reflected on the curved reflective surface 68 and filtered by the optical spectral filter 36, a change in the optical power of at least one of the plurality of dedicated spectral components $\lambda_1$, $\lambda_2$, $\lambda_3$ and $\lambda_4$ that is indicative of the displacement of the proof mass and, thus, of the motion experienced by the support 30. In this regard, it will be understood that the concepts introduced above in connection with FIGS. 11A to 11H and Eqs. (1) and (2) can also be applied to the embodiment of FIGS. 6 to 8.

In the embodiment of FIGS. 6 to 8, the optical fiber 50 connected to the light focusing element 52 may be a double-clad optical fiber. As known in the art, double-clad optical fibers generally include a core, an inner cladding surrounding the core, and an outer cladding surrounding the inner cladding. The core, inner cladding and outer cladding are made of materials with different refractive indices, such that the index of the core is higher than that of the inner cladding, which, in turn, is higher than the index of the outer cladding. In embodiments such as those shown in FIGS. 6 to 8, the core of the double-clad optical fiber 50 can be used for propagating the optical beam 26 generated by the light source assembly 24 toward the light focusing element 52. The optical beam 26 outputted by the core of the double-clad optical fiber 50 travels through the light focusing element 52, exits the same through the inner portion 70 that defines the light entry interface 35a of the optical monitoring assembly 34, and is focused onto the curved reflective surface 68 mounted on the proof mass 32. In turn, the inner cladding of the double-clad optical fiber 50 can be used for transmitting toward the optical detector assembly 28 the optical beam 26 reflected from the curved reflective surface 68 and then filtered by the optical spectral filter 36 mounted on the outer portion 72 that defines the light exit interface 35b.

It will be understood that, in this configuration, the inner cladding of the double-clad optical fibers has generally a much larger cross-sectional area compared with that of the core, thus resulting in a much higher light collecting efficiency. As a result, it can support a larger number of propagation modes and therefore enhance the collection efficiency of the optical beam 26 reflected from the curved reflective surface 68 and filtered by the optical spectral filter 36.

Fifth Exemplary Embodiment of the Optical Module

The optical monitoring assembly monitoring the proof mass is fixed relative to the support in the embodiments of the optical module described thus far. An exemplary embodiment of the invention where at least part of the optical monitoring assembly is mounted on the proof mass and thus displaceable relative to the support will now be described.

Figure 29:
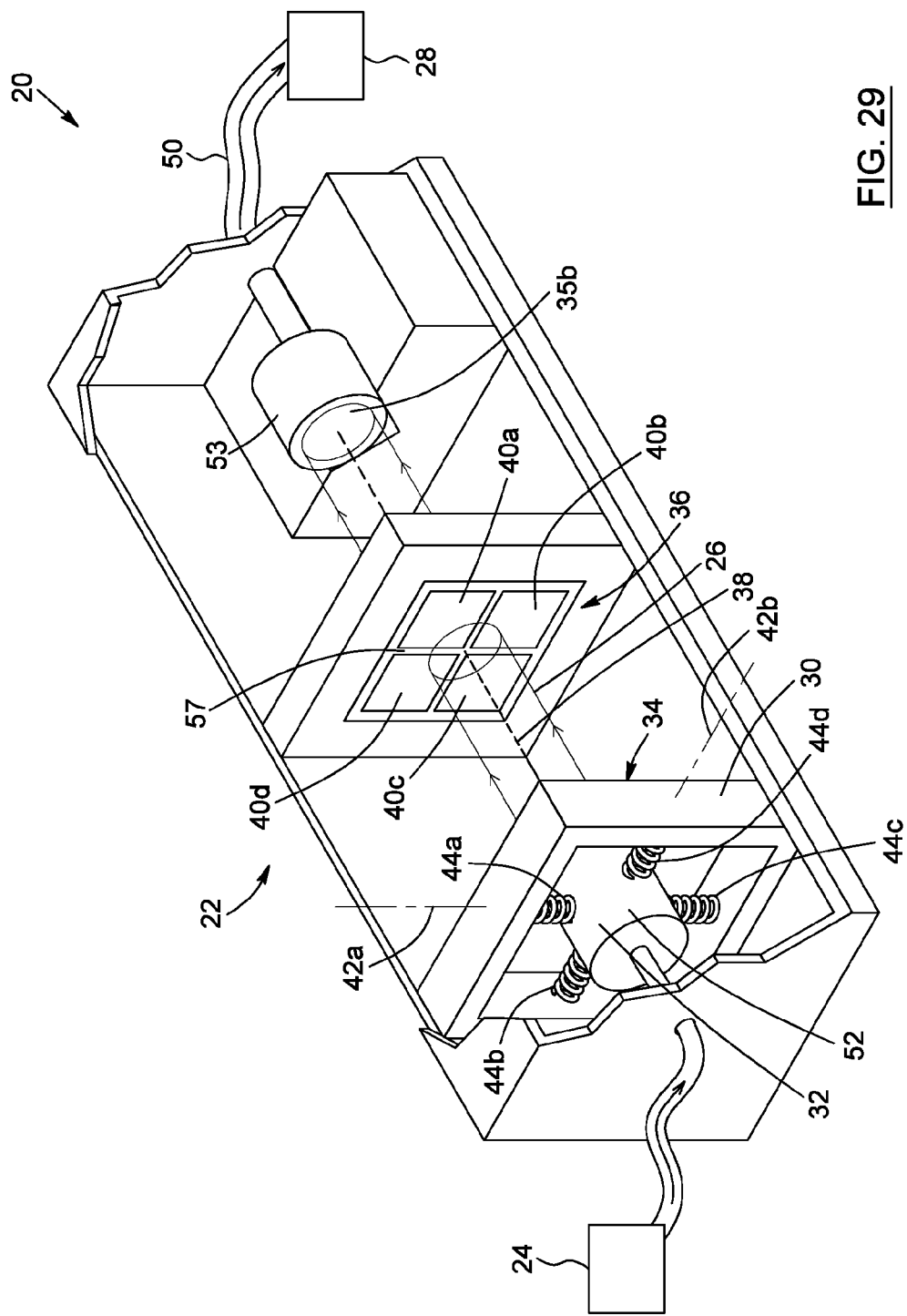
FIG. 29 is a schematic perspective and partially cutaway side view of an optical motion responsive system according to another embodiment of the invention.
Figure 30:
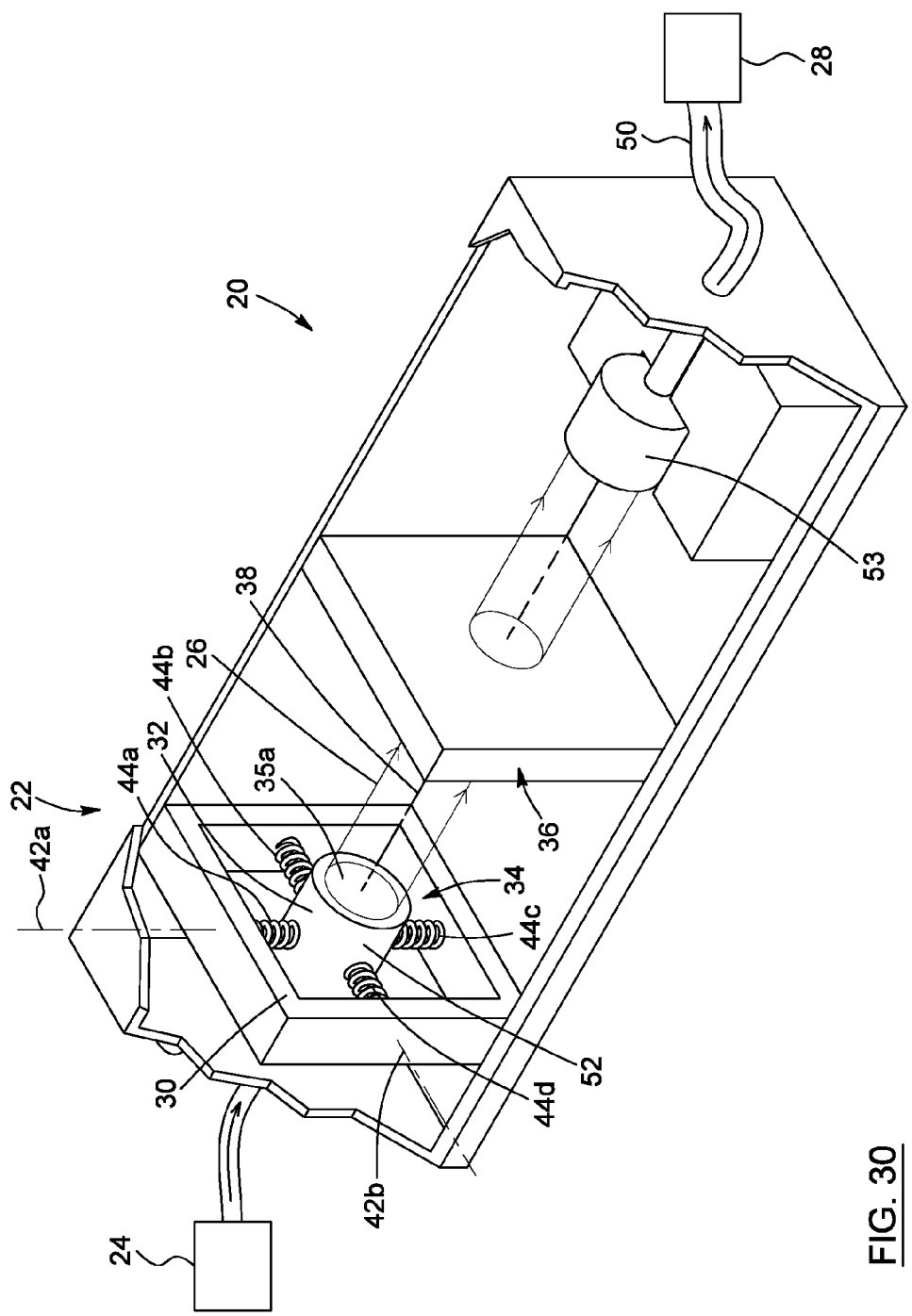
FIG. 30 is another schematic perspective and partially cutaway side view of the optical motion responsive system of FIG. 29.
Figure 31:
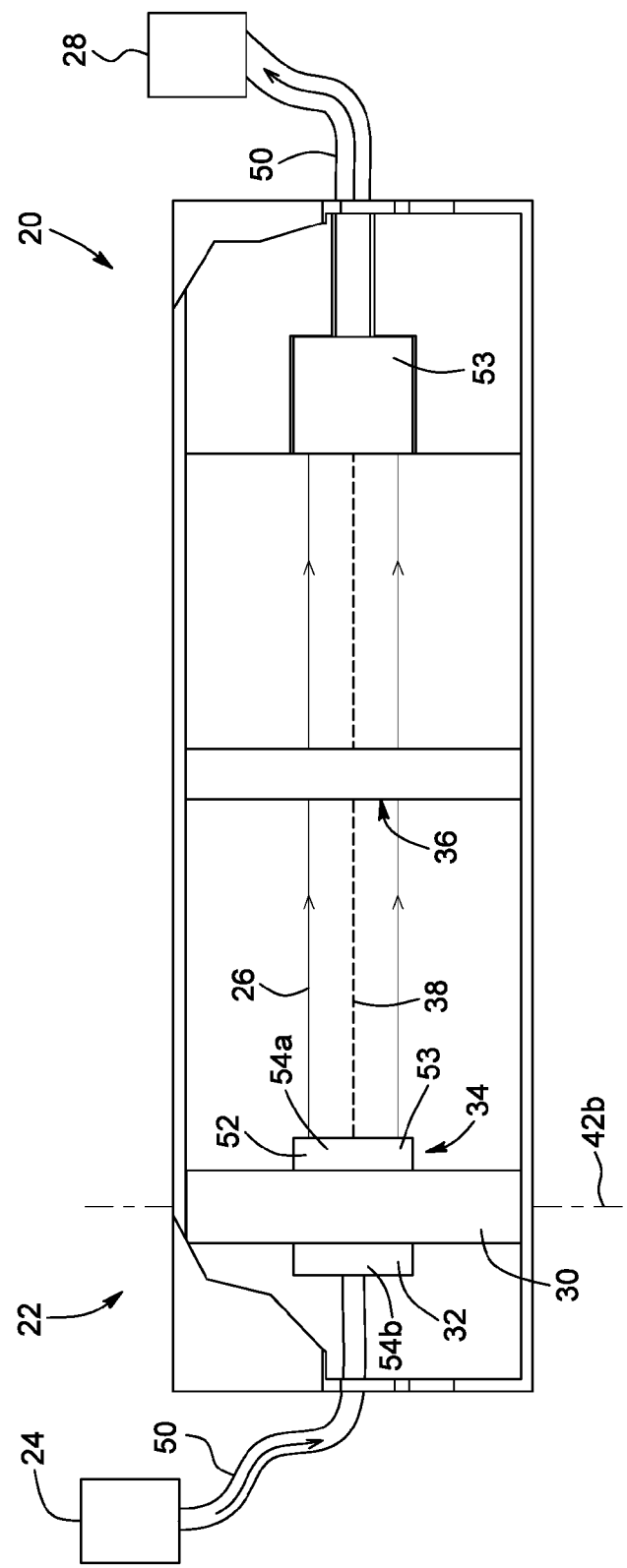
FIG. 31 is a top view of the optical motion responsive system of FIG. 29.

Referring to FIGS. 29 to 31, another embodiment of the optical module 22 is shown.

The optical module 22 includes a support 30 and a proof mass 32 mechanically coupled to the support 30 and movable in the plane defined by the two mutually perpendicular sensing axes 42a and 42b. The optical module 22 also includes an optical monitoring assembly 34 including a light entry interface 35a mounted on the proof mass 32 and a light exit interface 35b. The optical monitoring assembly 34 monitors the movement of the proof mass 32 with an optical beam 26 projected from the light entry interface 35a and including a plurality of dedicated spectral components. In the illustrated embodiment, the optical beam 26 includes four dedicated spectral components $\lambda_1$, $\lambda_2$, $\lambda_3$ and $\lambda_4$ The optical module 22 further includes an optical spectral filter 36 fixed with respect to the support 30 and positioned in a path 38 of the optical beam 26. The optical spectral filter 36 includes a plurality of filtering regions 40a to 40d which, in the illustrated embodiment, are shaped as four squares arranged to form a larger square whose sides are in alignment with the transverse sensing axes 42a and 42b. Again, the filtering regions 40a to 40d may assume, in other embodiments, a variety of shapes other than square without departing from the scope of the invention.

In the embodiment of FIGS. 29 to 31, the proof mass 32 is embodied by a light focusing element such as, for example, a GRIN lens. The light focusing element embodying the proof mass 32 may have an endface that defines the light entry interface 35a for projecting the optical beam 26 onto the fixed optical spectral filter 36 disposed in the path 38 of the optical beam 26. In other words, in the embodiment of FIGS. 29 to 31, the light entry interface 35a projecting the optical beam 26 onto the optical spectral filter 36 is itself mounted onto the proof mass 32 whose motion is being monitored. It is to be noted that this remains consistent with the above definition of the term "proof mass" as any predetermined inertial mass whose displacement serves as a reference for the motion to be measured.

The optical module 22 generally includes at least one resilient element such as springs 44a to 44d mounted between the support 30 and the GRIN lens embodying the proof mass 32 for providing a restoring force to the proof mass 32. For example, in the illustrated embodiment, four springs 44a to 44d arranged in pairs are attached to the proof mass 32. A first pair 44a and 44c extends along the first sensing axis 42a, and a second pair 44b, 44d extends along the second sensing axis 42b.

Still referring to FIGS. 29 to 31, the optical beam 26 projected from the light entry interface 35a mounted on the displaceable proof mass 32 impinges on the filtering regions 40a to 40d of the fixed optical spectral filter 36. The optical spectral filter 36 in FIGS. 29 to 31 is a transmission filter such that the plurality of filtering regions 40a to 40d defines a plurality of transmitting regions, each being associated with a corresponding one of the plurality of dedicated spectral components $\lambda_1$, $\lambda_2$, $\lambda_3$ and $\lambda_4$ of the optical beam 26. As shown in FIG. 10, each filtering region 40a to 40d has a spectral profile 58a to 58d that includes a distinct dedicated filtering band encompassing the corresponding dedicated spectral component $\lambda_1$, $\lambda_2$, $\lambda_3$ or $\lambda_4$.

It will be understood that the displacement of the proof mass 32 along the sensing axes 42a and 42b relative to the fixed optical spectral filter 36 produces, after spectrally-selective transmission of the optical beam 26 through the optical spectral filter 36, a change in the optical power of at least one of the plurality of dedicated spectral components $\lambda_1$, $\lambda_2$, $\lambda_3$ and $\lambda_4$. This change is indicative of the displacement of the proof mass 32 and, thus, of the motion experienced by the support 30, as discussed above in connection with FIGS. 11A to 11H.

Referring back to FIGS. 29 to 31, the optical module 22 may further include a light collecting element 53 for collecting the optical beam 26 after filtering by and transmission through the optical spectral filter 36. In this embodiment, the light collecting element 53 may have an endface defining the light exit interface 35b. The light collecting element 53 can be a GRIN lens or another appropriate optical component such as, for example, an optical fiber, preferably a multimode optical fiber that can support the propagation of each dedicated spectral components $\lambda_1$, $\lambda_2$, $\lambda_3$ and $\lambda_4$ of the optical beam 26 filtered by the optical spectral filter 36

Sixth Exemplary Embodiment of the Optical Module

The embodiments of the optical module described thus far allow for sensing the displacement of a proof mass along one or two sensing axes. An exemplary embodiment of the invention where displacements can be monitored along three mutually orthogonal sensing axes will now be described.

Figure 13:
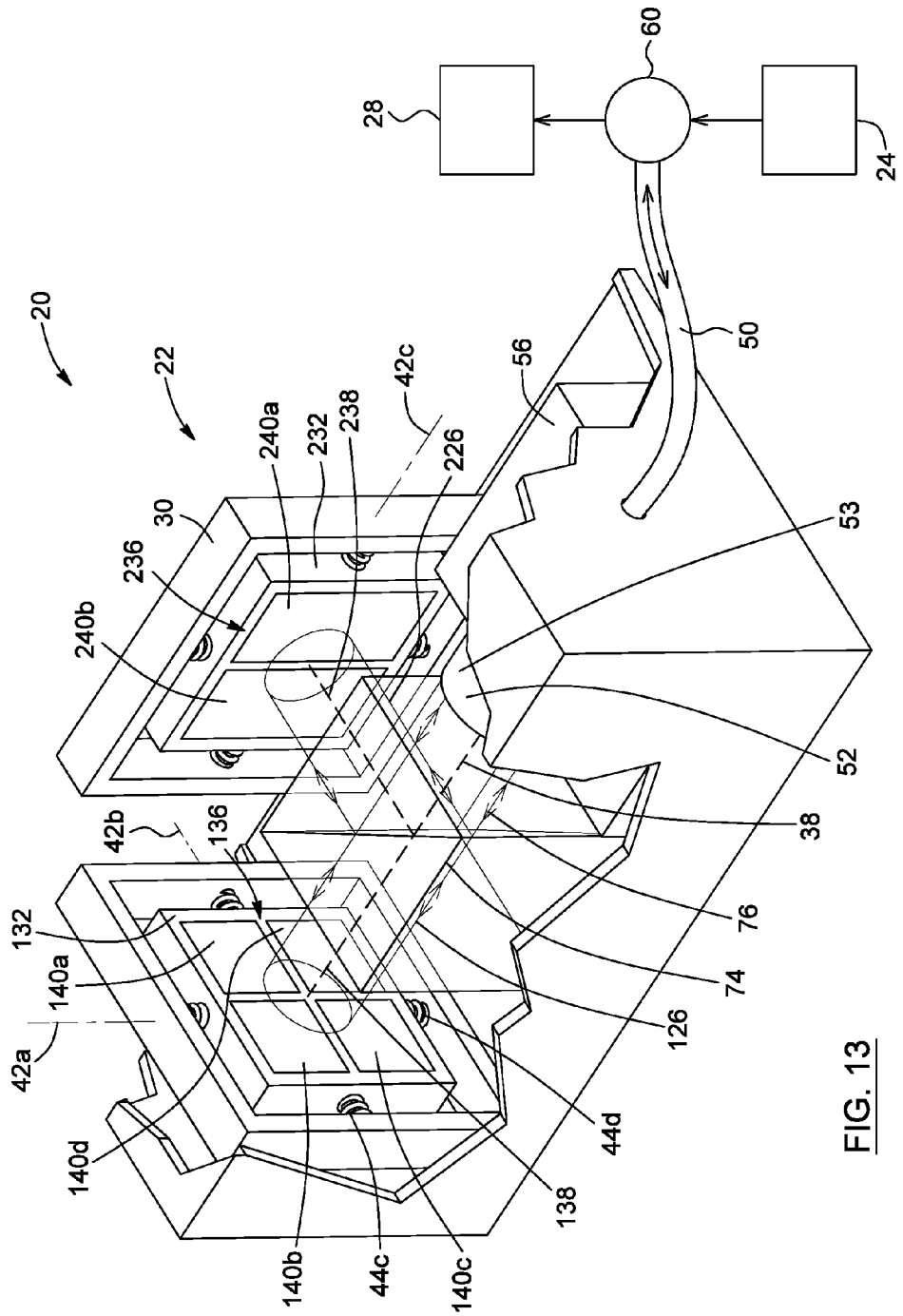
FIG. 13 is a schematic perspective and partially cutaway side view of an optical motion responsive system according to another embodiment of the invention.
Figure 14:
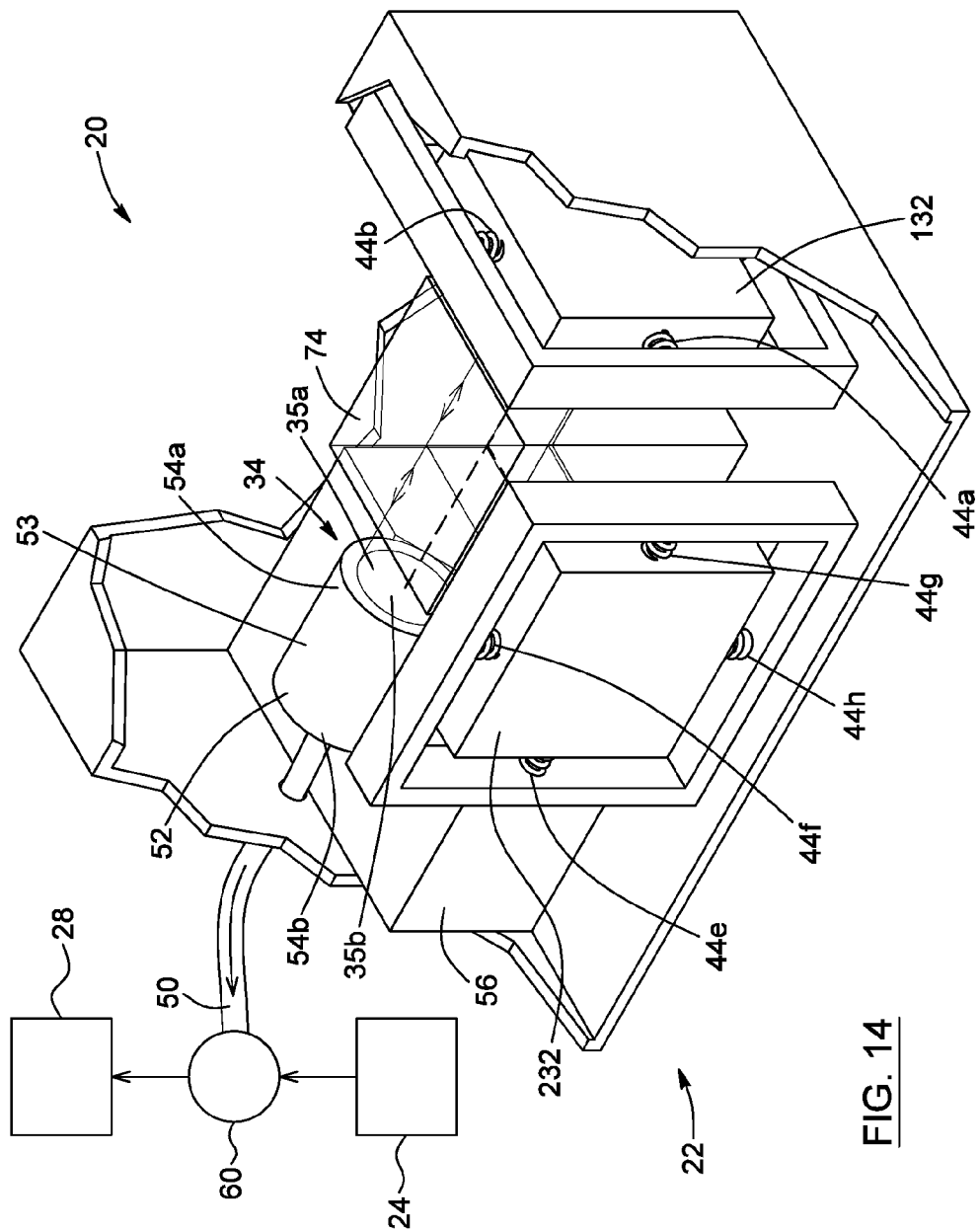
FIG. 14 is another schematic perspective and partially cutaway side view of the optical motion responsive system of FIG. 13.
Figure 15:
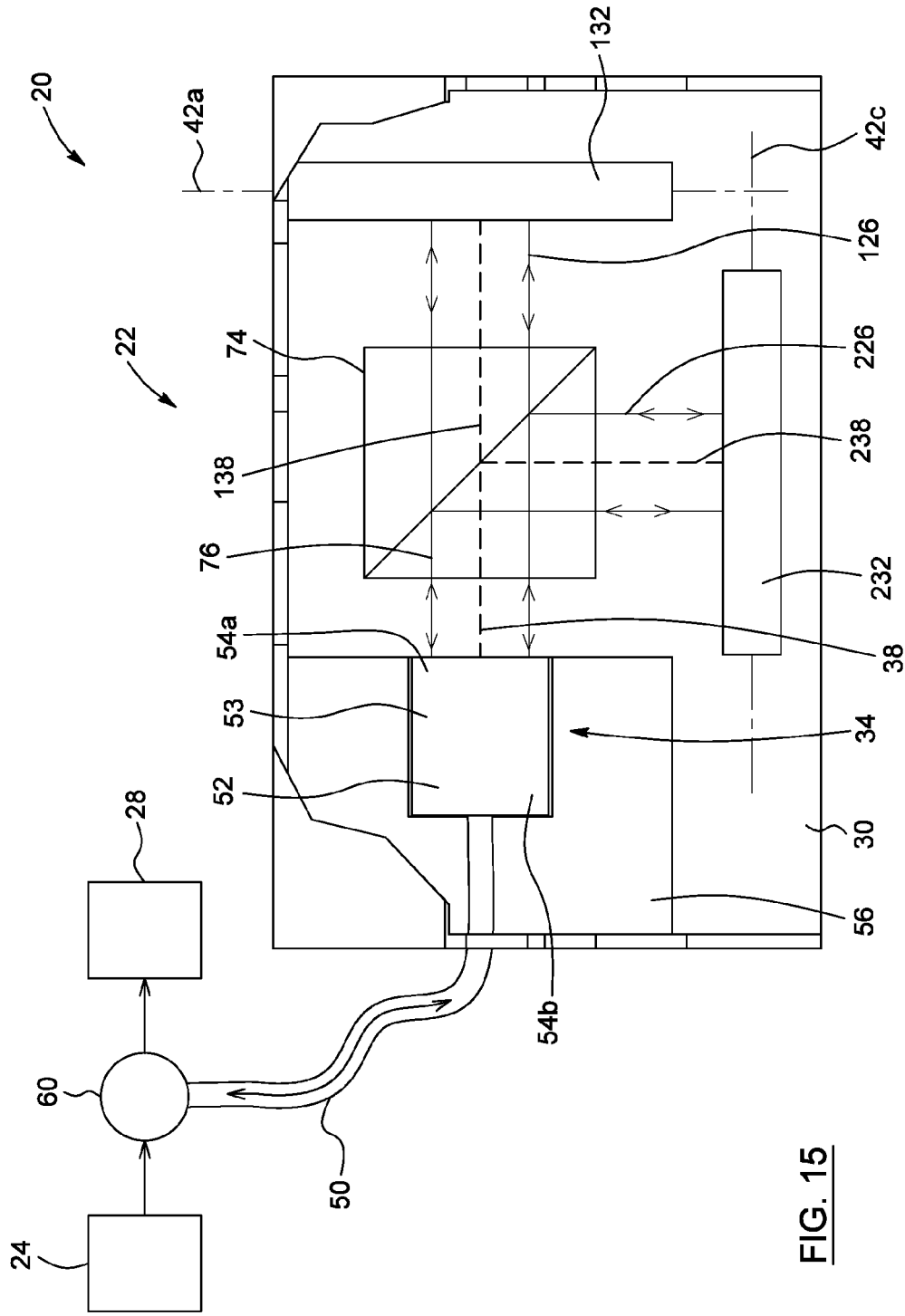
FIG. 15 is a top view of the optical motion responsive system of FIG. 13.

Referring to FIGS. 13 to 15, another embodiment of the optical module 22 is shown. Again, this embodiment is similar to the embodiment described above and illustrated in FIGS. 1 to 3. As mentioned above, it will be understood that while in the illustrated embodiment the optical module 22 is shown and described as forming part of the optical motion responsive system 20, in other embodiments, the optical module 22 may be fabricated and sold as a distinct and separate integrated unit for use with existing optical components including but not limited to light source assemblies and optical detector assemblies.

The optical module 22 includes a support 30, a first proof mass 132 and a second proof mass 232. The first and second proof masses 132 and 232 may, but need not, be identical. The first proof mass 132 is mechanically coupled and displaceable relative to the support 30 along two mutually orthogonal first and second sensing axes 42a and 42b in response to a motion experienced by the support 30. The second proof mass 232 is mechanically coupled and displaceable relative to the support 30 along a third sensing axis 42c in response to the motion experienced by the support 30. The third sensing axis 42c is orthogonal to both the first and second sensing axes 42a and 42b. The optical module 22 generally includes resilient elements such as springs 44a to 44h mounted between the support 30 and each of the first and second proof masses 132 and 232 for providing restoring forces to the proof masses 132 and 232. In such a case, the displacement of each proof mass 132 and 232 can be described as that of a damped mass-spring oscillator acted upon by an external driving force.

Of course, the number, position, stiffness constant and arrangement of the spring or springs connecting each proof mass to the support can be varied in other embodiments. Furthermore, in order to fulfill the requirements of a given application, design parameters such as the resonant frequency and the bandwidth of the damped mass-spring oscillator defined by each proof mass can be varied by appropriately selecting the mass of the corresponding proof mass, the stiffness constant of the springs, and the damping coefficient of the oscillator.

The optical module 22 also includes an optical monitoring assembly 34 fixed relative to the support 30. In the embodiment of FIGS. 13 to 15, the monitoring assembly 34 includes a light entry interface 35a and a light exit interface 35b which both coincide with the endface of the proximal end 54a of a light focusing element 52, for example a GRIN lens. The optical monitoring assembly 34 is configured for monitoring the first and the second proof masses 132 and 232 with corresponding first and second optical beams 126 and 226 as the proof masses 132 and 232 are displaced along the three sensing axes 42a, 42b and 42c. The first optical beam 126 includes four dedicated spectral components $\lambda_1$, $\lambda_2$, $\lambda_3$ and $\lambda_4$, while the second optical beam 226 includes two dedicated spectral components $\lambda_5$, $\lambda_6$.

In some embodiments, the first and second optical beams 126 and 226 may be obtained by splitting a primary optical beam 76 made up of the six dedicated spectral components of wavelengths $\lambda_1$ to $\lambda_6$. In such a case, the optical module 22 may include a beam splitter 74 positioned in a path 38 of the primary optical beam 76 and configured for separating the same into the first and second optical beams 126 and 226. The beam splitter 74 directs the first optical beam 126 toward the first proof mass 132 for reflection thereon, and the second optical beam 226 toward the second proof mass 232 for reflection thereon.

It will be understood that the beam splitter 74 can be embodied by any optical element or combination of optical elements that allow selective transmission (or reflection) of electromagnetic radiation lying within a given spectral range, while reflecting (or transmitting) electromagnetic radiation lying outside the given spectral range. For example, the beam splitter 74 may be embodied by a cube beam splitter, a dichroic mirror or a spectral filter.

The optical module 22 further includes a first and a second optical spectral filter 136 and 236. In the embodiment shown in FIGS. 13 to 15, the first and second optical spectral filters 136 and 236 are reflection filters respectively mounted on the first and second proof masses 132 and 232. However, in other embodiments, one or both of the first and second optical spectral filters 136 and 236 may be transmission filters without departing from the scope of the invention. For example, referring to FIGS. 23 to 25, there is shown an embodiment of the optical module 22 where the first and second optical spectral filters 136 and 236 are transmission filters.

Referring back to FIG. 13, the first optical spectral filter 136 is positioned in a path 138 of the first optical beam 126 and includes four filtering regions 140a to 140d. In the illustrated embodiment, the four filtering regions 140a to 140d are shaped as four squares arranged to form a larger square whose sides are in alignment with the first and second sensing axes 42a and 42b, but other shapes could be used without departing from the scope of the invention.

Each filtering region 140a to 140d is associated with a corresponding one of the four dedicated spectral components $\lambda_1$, $\lambda_2$, $\lambda_3$ and $\lambda_4$ of the first optical beam 126 and has a spectral profile including a distinct dedicated filtering band encompassing the corresponding dedicated spectral component $\lambda_1$, $\lambda_2$, $\lambda_3$ or $\lambda_4$. As a result, a displacement of the first proof mass 132 along the first and second sensing axes 42a and 42b produces, after filtering of the first optical beam 126 by the first optical spectral filter 136, a change in the optical power of at least one of the four dedicated spectral components $\lambda_1$, $\lambda_2$, $\lambda_3$ and $\lambda_4$ of the first optical beam 126, the change being indicative of the motion experienced by the support 30 along the first and second axes 42a and 42b.

Once the first optical beam 126 has been reflected by the first optical spectral filter 136 mounted on the first proof mass 132, it travels back successively through the beam splitter 74 and the light exit interface 35b of the optical monitoring assembly 34 to be detected by the optical detector assembly 28.

Figure 23:
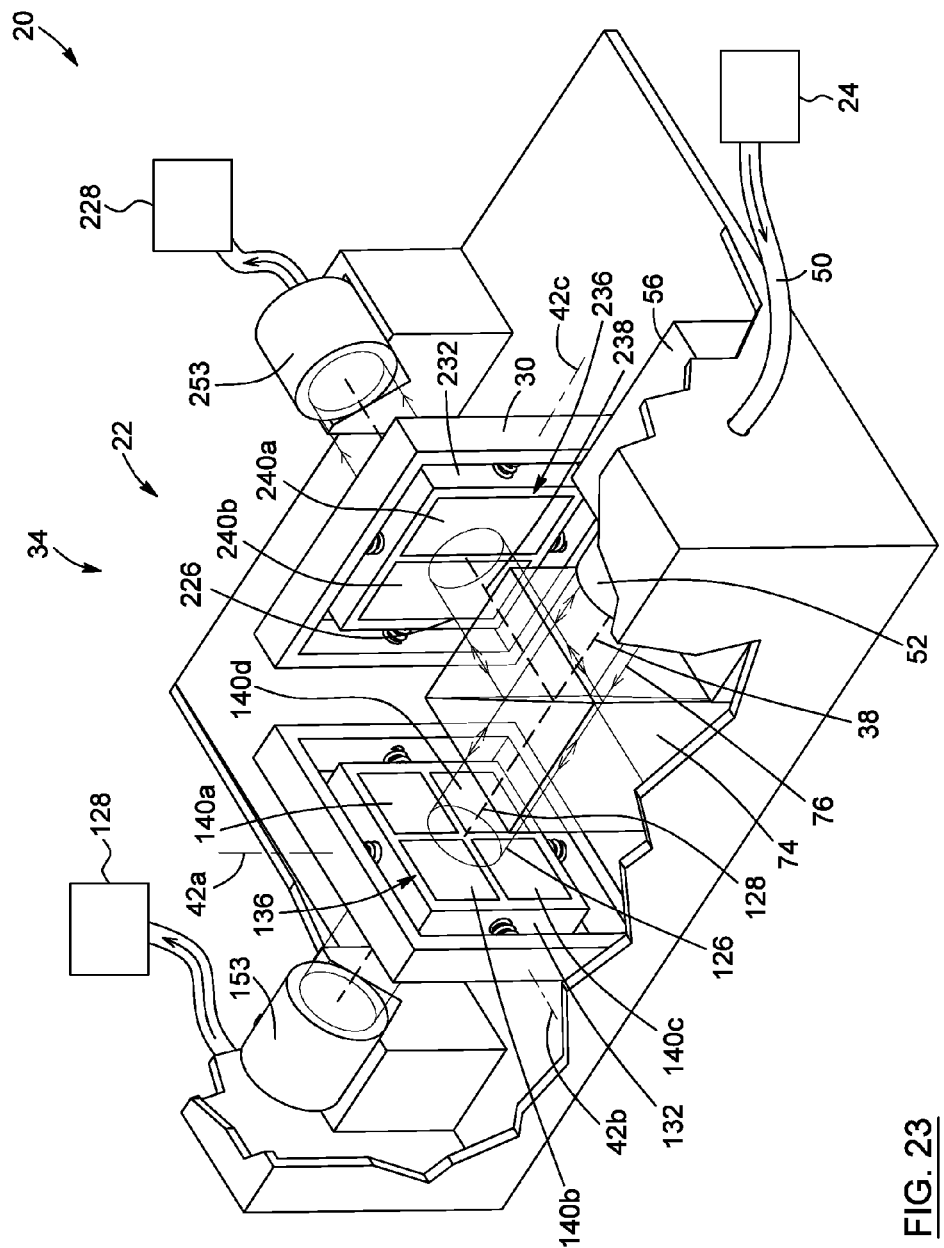
FIG. 23 is a schematic perspective and partially cutaway side view of an optical motion responsive system according to another embodiment of the invention.
Figure 24:
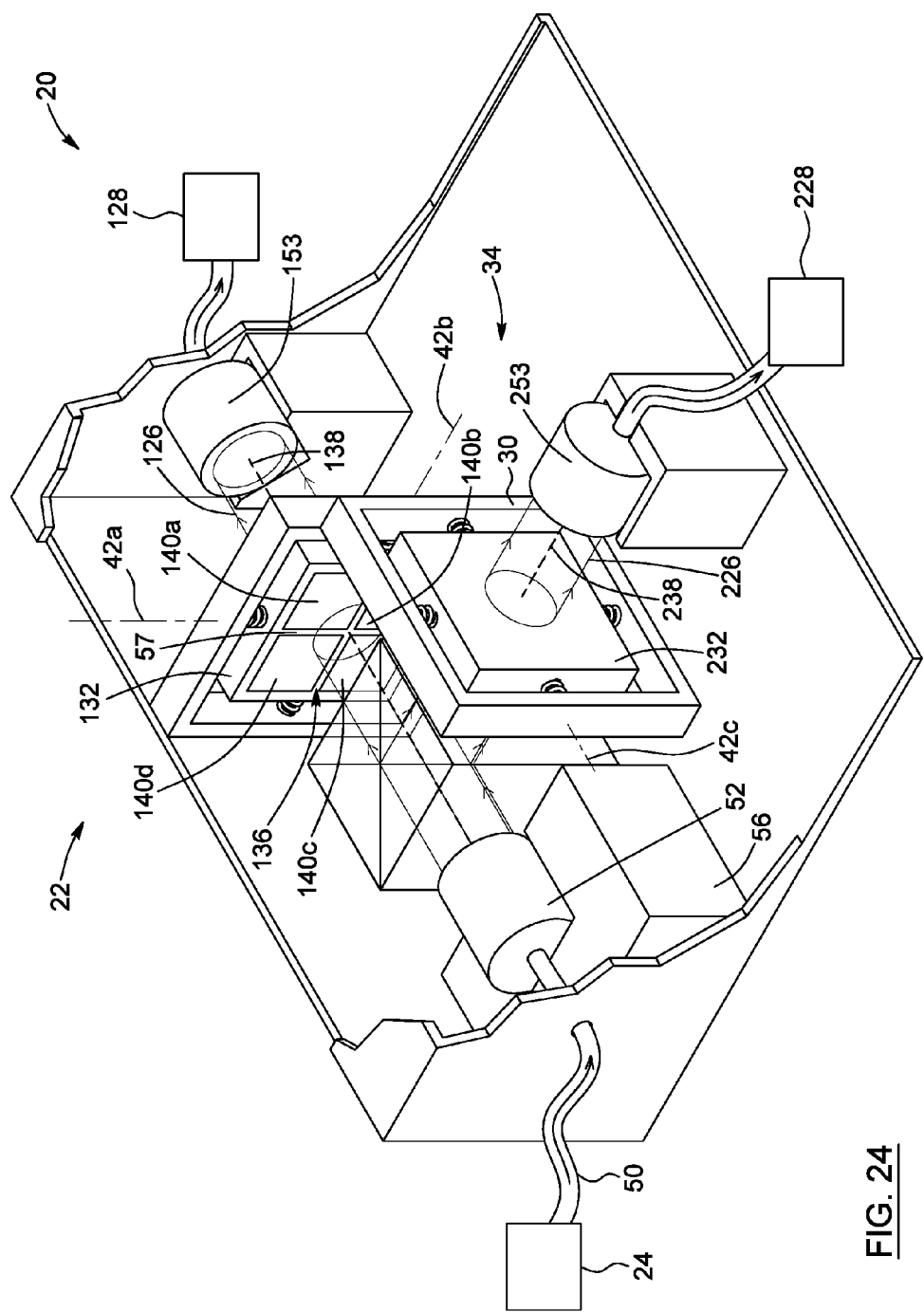
FIG. 24 is another schematic perspective and partially cutaway side view of the optical motion responsive system of FIG. 23.
Figure 25:
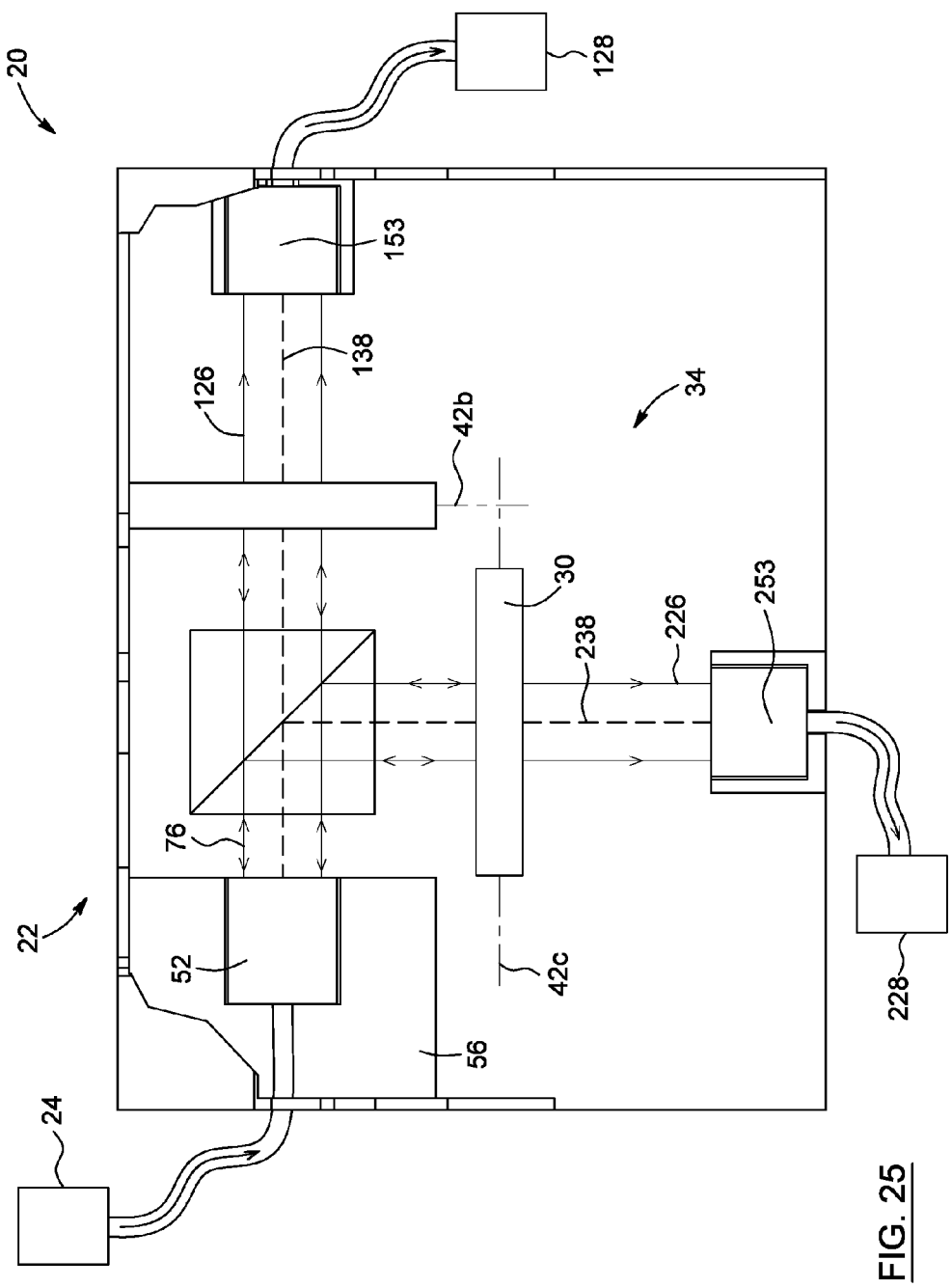
FIG. 25 is a top view of the optical motion responsive system of FIG. 23.

In embodiments where the first optical spectral filter 136 is a transmission filter mounted on the first proof mass 132, such as in FIGS. 23 to 25, the optical motion responsive system 20 may include a first light collecting element 153. The first light collecting element 153 is configured for collecting the first optical beam 126 after filtering by the first optical spectral filter 136 and transmission through the proof mass 132 and for directing the filtered first optical beam 126 toward the first optical detector assembly 128. The first light collecting element 153 in FIGS. 23 to 25 is embodied by a GRIN lens. Of course, other optical elements could be used as the first light collecting element 153 including, but not limited to, an optical fiber, preferably a multimode optical fiber that can support the propagation of each dedicated spectral components $\lambda_1$, $\lambda_2$, $\lambda_3$ and $\lambda_4$ of the first optical beam 126 filtered by the first optical spectral filter 136. The first light collecting element 253 is connected to the first optical detection assembly 128 via an optical fiber or by another appropriate optical component.

Referring back to FIG. 13, the second optical spectral filter 236 is positioned in a path 238 of the second optical beam 226 and includes two filtering regions 240a and 240b.

In the illustrated embodiment, the two filtering regions 240a and 240b are shaped as two rectangles whose respective adjacent sides are perpendicular to the third sensing axis 42c. It will be understood, however, that in other embodiments the filtering regions 240a and 240b may assume other shapes without departing from the scope of the invention.

In embodiments where the second optical spectral filter 236 is a transmission filter mounted on the second proof mass 232, such as in FIGS. 23 to 25, the optical motion responsive system 20 may include a second light collecting element 253. As for the first light collecting element 153 described above, the second light collecting element 253 is configured for collecting the second optical beam 226 after filtering by the second optical spectral filter 236 and transmission through the second proof mass 232 and for directing the filtered second optical beam 226 toward the second optical detector assembly 228. It is to be noted that in this embodiment, a distinct optical detector assembly is provided for each of the first and second optical beam, but a single optical detector assembly could be provided in other embodiments. The second light collecting element 253 may be embodied by a GRIN lens. The second light collecting element 253 may be connected to the second optical detection assembly 228 via an optical fiber, preferably a multimode optical fiber, or by another appropriate optical component.

Referring back to FIG. 13, each filtering region 240a and 240b of the second optical spectral filter 236 is associated with a corresponding one of the two dedicated spectral components $\lambda_5$ and $\lambda_6$ of the second optical beam 226 and has a spectral profile including a distinct dedicated filtering band encompassing the corresponding dedicated spectral component $\lambda_5$ and $\lambda_6$. As a result, a displacement of the second proof mass 232 along the third sensing axis 42c produces, after filtering of the second optical beam 226 by the second optical spectral filter 236, a change in the optical power of at least one of the two dedicated spectral components $\lambda_5$ and $\lambda_6$ of the second optical beam 226, the change being indicative of the motion experienced by the support 30 along the third sensing axis 42c.

Once the second optical beam 226 has been reflected by the second optical spectral filter 236 mounted on the second proof mass 232, it travels back successively through the beam splitter 74 and the light exit interface 35b of the optical monitoring assembly 34 to be detected by the optical detector assembly 28.

Seventh Exemplary Embodiment of the Optical Module

Figure 26:
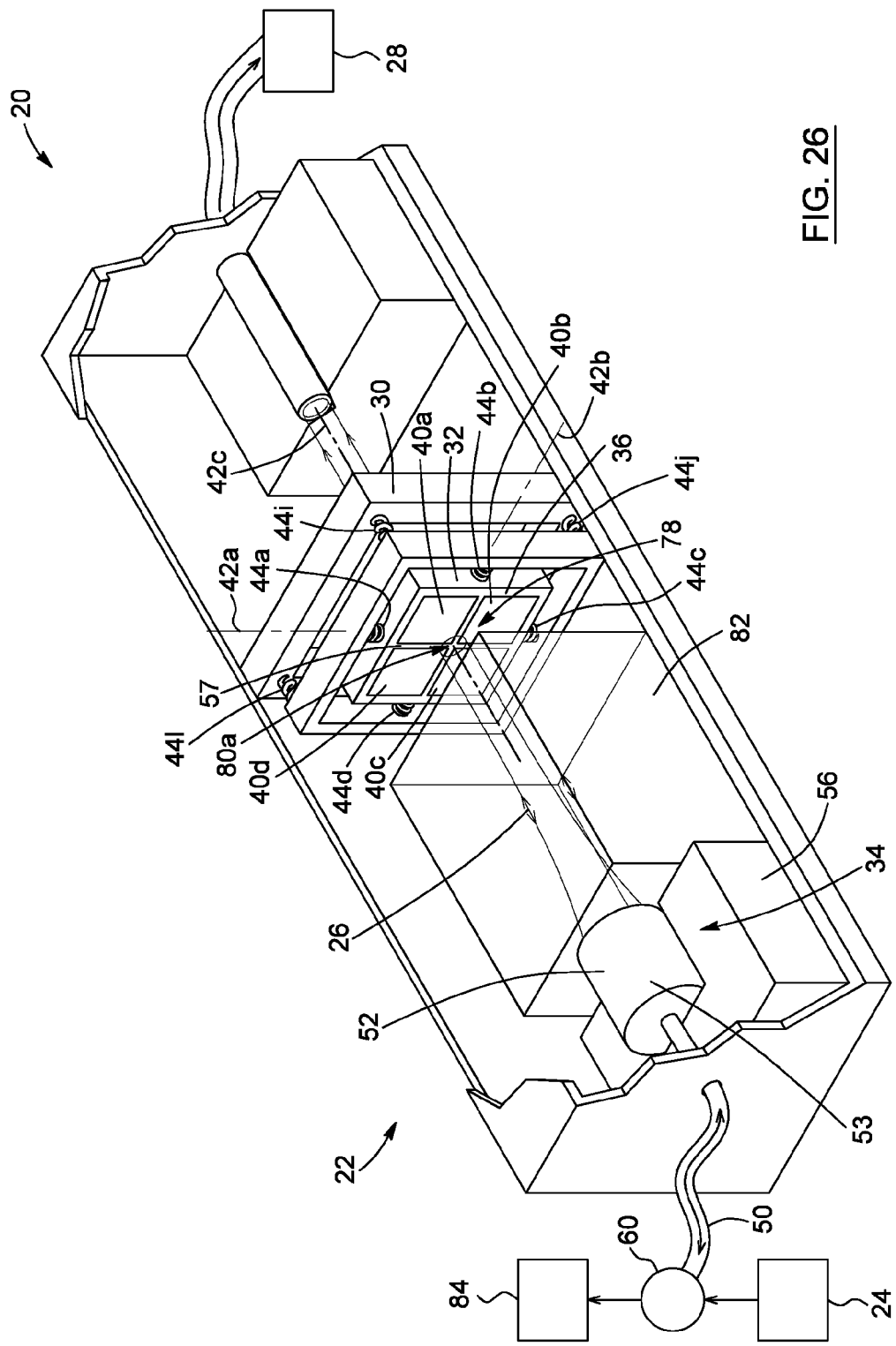
FIG. 26 is a schematic perspective and partially cutaway side view of an optical motion responsive system according to another embodiment of the invention.
Figure 27:
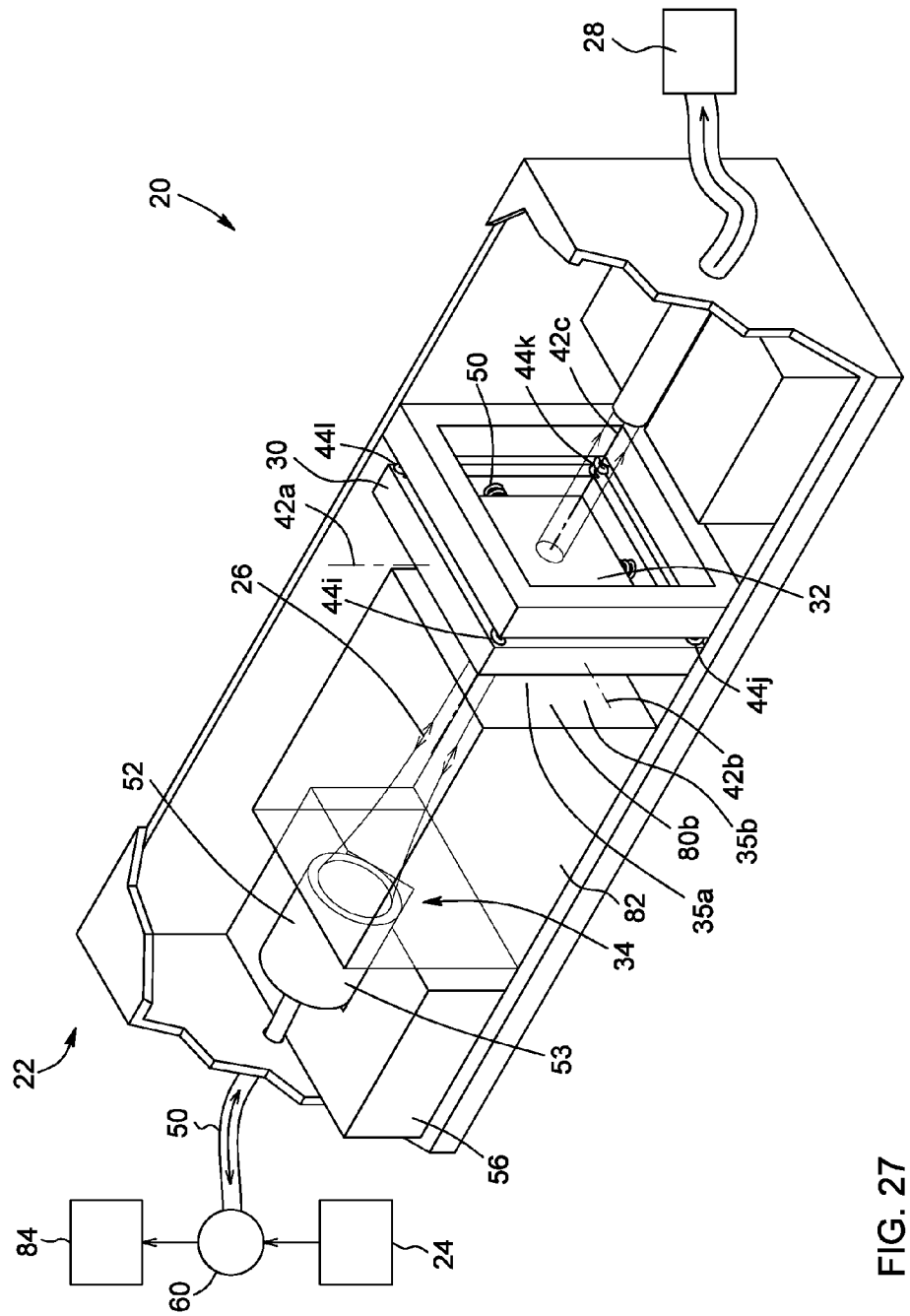
FIG. 27 is another schematic perspective and partially cutaway side view of the optical motion responsive system of FIG. 26.
Figure 28:
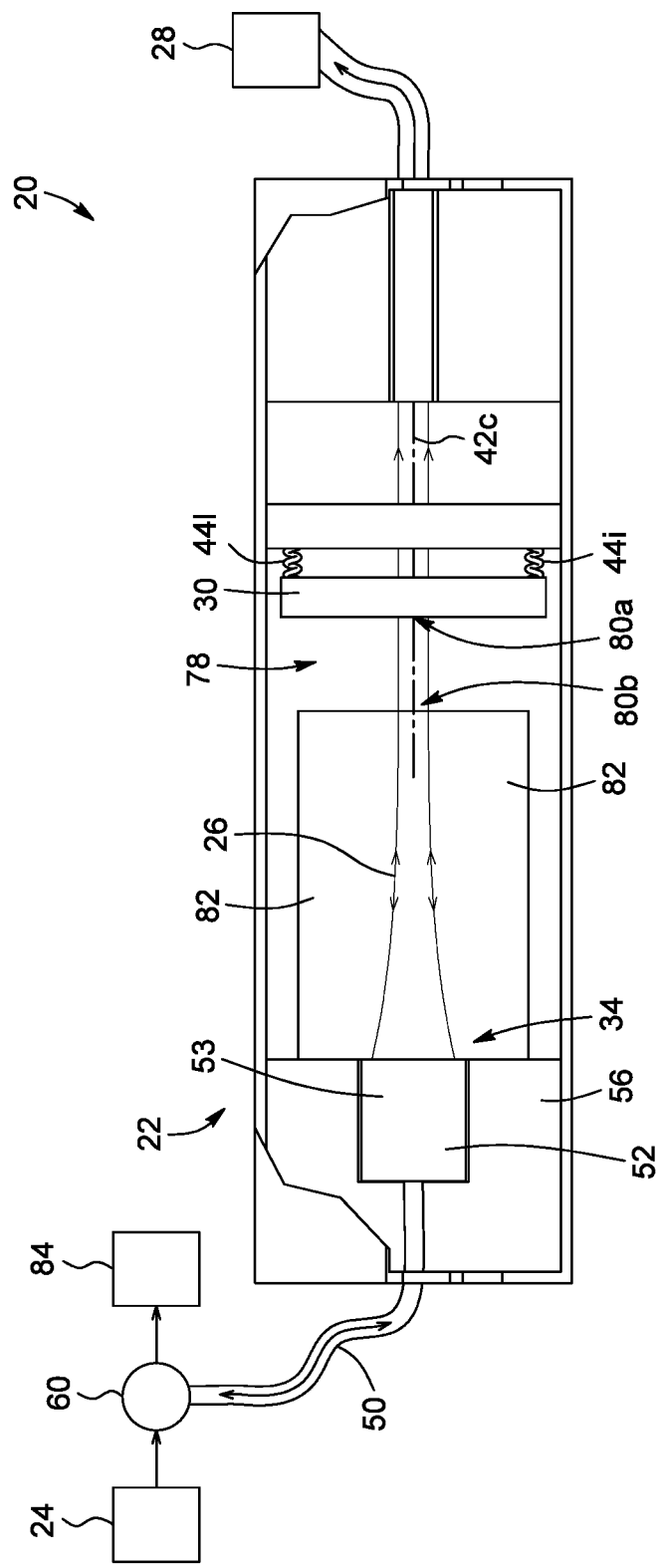
FIG. 28 is a top view of the optical motion responsive system of FIG. 26.

Referring now to FIGS. 26 to 28, there is shown another embodiment of the optical module 22 adapted for sensing the displacement of the proof mass 32 along a longitudinal sensing axis 42c parallel to the path of the optical beam incident on the proof mass 32. In other words, the longitudinal sensing axis 42c is perpendicular to both transverse sensing axes 42a and 42b. In particular, the embodiment shown in FIGS. 26 to 28 involves forming a Fabry-Perot optical resonant cavity 78 inside the optical module 22. Moreover, four additional springs 44i, 44j, 44k and 44l may be provided to allow for a longitudinal displacement of the proof mass 32 relative to the support 30 in response to a corresponding longitudinal motion of the support 30.

The embodiment illustrated in FIGS. 26 to 28 is similar to the embodiments described above, in that it generally includes a support 30 and a proof mass 32 mechanically coupled and displaceable relative to the support 30, an optical monitoring assembly 34 for monitoring the proof mass 32 with an optical beam 26 including a plurality of dedicated spectral components $\lambda_1$, $\lambda_2$, $\lambda_3$ and $\lambda_4$, and an optical spectral filter 36 positioned in the path of the optical beam 26 and including a plurality of filtering regions 40a to 40d. As discussed above, each filtering region 40a to 40d is associated with a corresponding one of the plurality of dedicated spectral components $\lambda_1$, $\lambda_2$, $\lambda_3$ and $\lambda_4$, such that a displacement of the proof mass 32 along one of the transverse sensing axes 42a and 42b produces, after filtering of the optical beam 26 by the optical spectral filter 36, a change in the optical power of at least one of the plurality of dedicated spectral components $\lambda_1$, $\lambda_2$, $\lambda_3$ and $\lambda_4$, the change being indicative of the motion experienced by the support 30 along at least one of the first and second sensing axes 42a and 42b. In the illustrated embodiment, the optical spectral filter 36 is a transmission filter, but a reflection filter could be used in another embodiment.

In contrast to the embodiments described above, the optical beam 26 in the embodiment of FIGS. 26 to 28 includes an additional spectral component having a main wavelength $\lambda_5$ that differs from those of the dedicated spectral components $\lambda_1$, $\lambda_2$, $\lambda_3$ and $\lambda_4$. The optical module 22 in FIGS. 26 to 28 further includes a pair of substantially parallel surfaces 80a and 80b that face each other while reflecting at least partially the additional spectral component $\lambda_5$ of the optical beam 26 to form a Fabry-Perot resonant cavity 78 having a cavity length. One surface 80a corresponds to a surface of the proof mass 32, namely the surface on which is mounted the optical spectral filter 36 and onto which is incident the optical beam 26. In the illustrated embodiment, the other surface 80b is fixed relative to the support 30 and corresponds to the light entry interface 35a of the optical monitoring assembly 34.

The optical module 22 may include a glass spacer 82 such as, for example, a no-core optical fiber, having two endfaces, one endface defining the light entry interface 35a and the other endface being connected to a light focusing element 52, embodied by a GRIN lens in FIGS. 26 to 28.

It will be understood that in the illustrated embodiment, a displacement of the proof mass 32 along the longitudinal sensing axis 42c will modify the spacing between the pair of opposite surface 80a and 80b which will modify the cavity length of the Fabry-Perot resonant cavity 78. In turn, this change in cavity length will change the reflectivity of the Fabry-Perot resonant cavity 78 at any given wavelength. Therefore, by selecting the wavelength of the additional spectral component $\lambda_5$ to ensure multiple reflections of the same between the two opposite surfaces 80a and 80b of the Fabry-Perot resonant cavity 78, a displacement of the proof mass 32 along the longitudinal sensing axis 42c will produce a corresponding change in the optical power of the additional spectral component $\lambda_5$, the change being indicative of the motion experienced by the support 30 along the longitudinal sensing axis 42c.

The provision of a glass spacer 82 such as a no-core optical fiber in front of the light focusing element 52 (e.g. a GRIN lens) allows reducing the spacing between the pair of opposite surfaces 80a and 80b defining the Fabry-Perot cavity 78 without substantially affecting the measurement of the proof mass displacement along the two transverse sensing axis 42a and 42b. The no-core optical fiber 82 may be made of a transparent glass material, for example, silica glass.

The detection of a displacement $\Delta d$ of the proof mass 32 along the longitudinal sensing axis 42c may be implemented according to various methods known in the art. For example, the Fabry-Perot resonant frequency $f_{FP}$ may be measured. A displacement $\Delta d$ of the proof mass 32 along the longitudinal sensing axis 42c parallel to the path of the optical beam would cause a variation $\Delta f_{FP}$ in the Fabry-Perot resonant frequency $f_{FP}$ given by $\Delta f_{FP} = -f_{FP}(\Delta d/d)$, where d is the separation between the opposite surfaces 80a and 80b when the proof mass 32 is at rest. The measurement of the Fabry-Perot resonant frequency $f_{FP}$ may be performed using another optical detector assembly 84, separated from the optical detector assembly 28 operating on the plurality of dedicated spectral components $\lambda_1, \lambda_2, \lambda_3$ and $\lambda_4$, and specifically designed for that purpose. Many options for the design of the other detector assembly 84 are known in the art.

In order to unambiguously identify the resonant frequency $f_{FP}$, it may be desirable to properly select the separation $f_{adj}$ between adjacent Fabry-Perot resonant frequencies, also known as the free spectral range, which is defined by $f_{adj} = c/2d$, where c is the speed of light in vacuum. In some embodiments, the provision of a no-core optical fiber 82 allows for a control of the spacing between the pair of surfaces 80a and 80b defining the Fabry-Perot cavity 78 without compromising the performance of the light focusing element 52 to which it is adjoined, thus providing an additional degree of freedom in the design of the cavity.

The frequency of the additional spectral component $\lambda_5$ is preferably related to the Fabry-Perot resonant frequency $f_{FP}$ in a manner that depends on how the Fabry-Perot cavity is interrogated. For example, in one embodiment the main wavelength $\lambda_5$ of this additional spectral component and the Fabry-Perot resonant frequency could be selected so that the following relation is fulfilled at a known reference position:

$$\lambda_{5c} = \frac{c}{f_{FP}}. \quad (3)$$

Then, variations of the cavity length will be transduced into variations of light intensity of the spectral component $\lambda_5$ reflected by the Fabry Perot cavity. It will be understood that various other Fabry-Perot interrogation methods could be used in other embodiments.

It will also be understood that the dedicated spectral components $\lambda_1, \lambda_2, \lambda_3$ and $\lambda_4$ are preferably not affected by the presence of the Fabry-Perot resonant cavity 78. This may be achieved by minimizing the reflection of the dedicated spectral components $\lambda_1, \lambda_2, \lambda_3$ and $\lambda_4$ at the surface 80b. In addition, the wavelength $\lambda_5$ is preferably selected to differ from any of $\lambda_1, \lambda_2, \lambda_3$ and $\lambda_4$, which may be achieved from a careful design of the optical spectral filter 36 and the Fabry-Perot cavity 78.

Light Source Assembly

Figure 4:
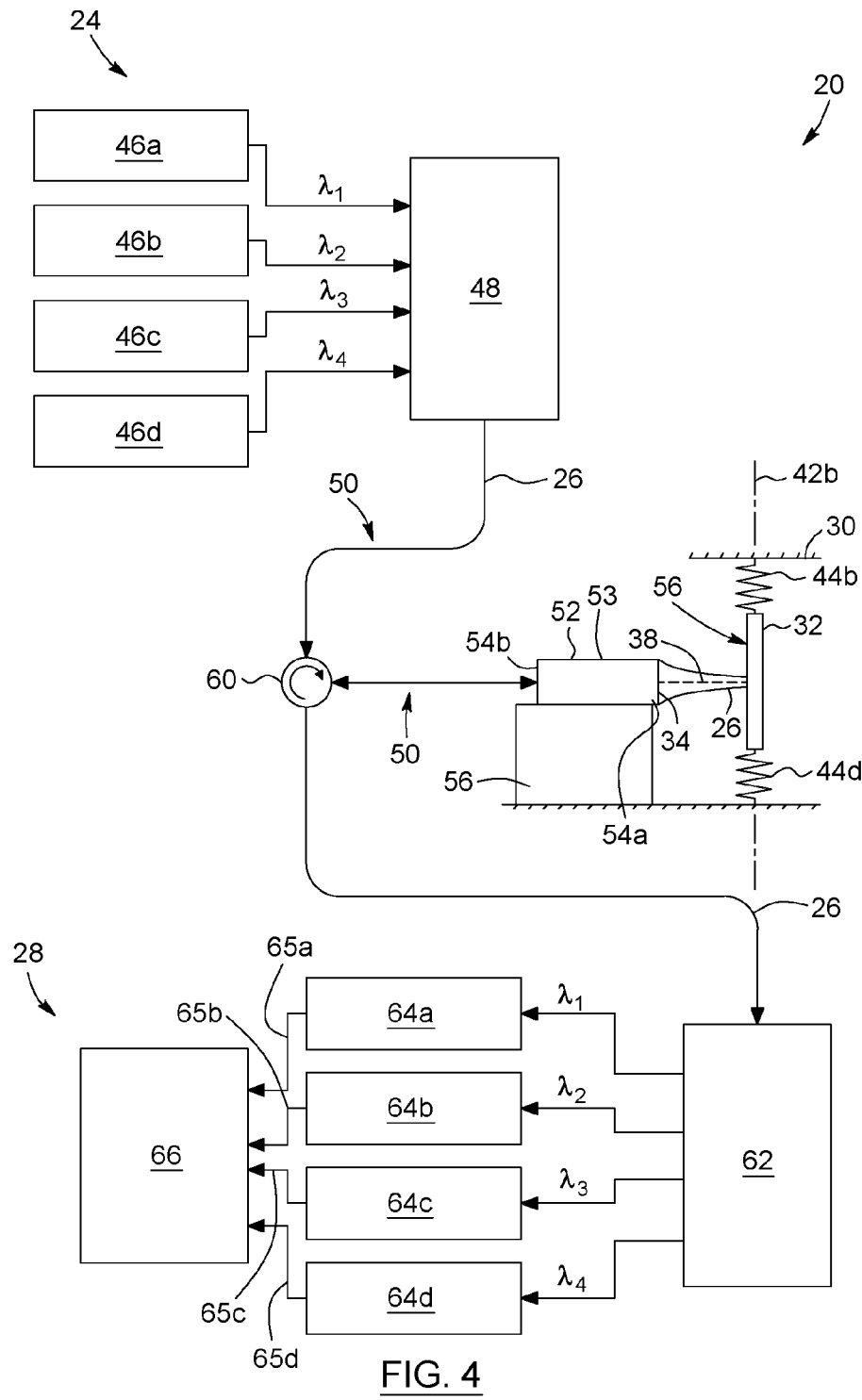
FIG. 4 is a schematic representation of the optical motion responsive system of FIG. 1, showing in more detail the light source assembly and the optical detector assembly.

Referring now to FIG. 4, the optical motion responsive system 20 also includes a light source assembly 24 optically coupled to the optical monitoring assembly 34. The light source assembly 24 is configured for generating the optical beam 26 and projecting the same onto the proof mass 32 via the light entry interface 35a. The optical beam 26 generated by the light source assembly 24 includes a plurality of dedicated spectral components. For example, when the light source assembly 24 is used with any of the embodiments shown in FIGS. 1 to 3, 6 to 8, 17 to 22 and 29 to 31, the optical beam 26 includes four dedicated spectral components, while it includes two dedicated spectral components when the light source assembly 24 is used with the embodiment shown in FIG. 5.

The light source assembly may include a plurality of light sources 46a to 46d, each light source 46a to 46d being configured to generate a corresponding one of the plurality of the dedicated spectral components $\lambda_1, \lambda_2, \lambda_3$ and $\lambda_4$. The light sources 46a to 46d can be embodied by any appropriate device or combination of devices able to generate the dedicated spectral components $\lambda_1, \lambda_2, \lambda_3$ and $\lambda_4$ of the optical beam 26 for incidence onto the proof mass 32 in the context of the present system 20. In some embodiments, the light sources 46a to 46d may be narrow linewidth and low-noise single-frequency laser sources. Such laser sources can be embodied, for example, by a gas laser, an electrically-pumped semiconductor laser, an optically-pumped solid-state laser, an optical fiber laser, a distributed-feedback laser, a solid-state amplification system, or a combination thereof. The laser sources may be operated in continuous wave or in pulsed regime, and may, but need not, be modulated.

The light sources 46a to 46d preferably have a linewidth sufficiently narrow so that each of the dedicated spectral components $\lambda_1, \lambda_2, \lambda_3$ and $\lambda_4$ of the optical beam is filtered only by the corresponding filtering regions 40a to 40d of the optical spectral filter 36, as described above. For example, with reference to FIG. 9, commercially available laser sources can emit the dedicated spectral component $\lambda_1, \lambda_2, \lambda_3$ or $\lambda_4$ at wavelengths ranging from 1200 nm to 1600 nm with linewidths of less than 1 nm. Moreover, the sensitivity of the optical motion responsive system according to embodiments of the invention will generally be limited by the intensity noise of the light sources, which manifests itself as electrical noise at the output of the optical motion responsive system. Indeed, any change in the measured optical power of one or more of the dedicated spectral components after filtering of the optical beam by the optical spectral filter will be interpreted as a displacement of the proof mass relative to the support.

Still referring to FIG. 4, the light source assembly 24 may also include an optical coupler 48 for receiving the plurality of dedicated spectral components $\lambda_1, \lambda_2, \lambda_3$ and $\lambda_4$ emitted from the plurality of light sources 46a to 46d and for coupling the same to form the optical beam 26. The optical coupler 48 can be embodied by any appropriate device or combination of devices able to combine the plurality of dedicated spectral components $\lambda_1, \lambda_2, \lambda_3$ and $\lambda_4$ into the optical beam and to output the optical beam. For example, in one embodiment, the optical coupler 48 can be a wavelength division multiplexing (WDM) coupler or an add-drop filter coupler. As known in the art, optical fibers can be used to transmit to the optical coupler 48 the dedicated spectral components $\lambda_1, \lambda_2, \lambda_3$ and $\lambda_4$ generated by the plurality of light sources 46a to 46d. Alternatively, in other embodiments, free space optics can be employed to link the light sources 46a to 46d to the optical coupler 48.

Optical Detector Assembly

Referring to FIGS. 1 to 3, it will be understood that once the optical beam 26 has been filtered by the optical spectral filter 36, the information concerning the displacement of the proof mass 32 relative to the support 30 is contained in the optical powers of the dedicated spectral components $\lambda_1, \lambda_2, \lambda_3$ and $\lambda_4$ of the filtered optical beam 26. In other words, a displacement of the proof mass 32 along the at least one sensing axis 42a and 42b produces, after filtering of the optical beam 26 by the optical spectral filter 34, a change in the optical power of at least one of the plurality of dedicated spectral components $\lambda_1, \lambda_2, \lambda_3$ and $\lambda_4$ indicative of the motion experienced by the support 30 and, in turn, of the motion experienced by the object or structure on which the support 30 is mounted. It is thus desirable that any change in the optical power of the dedicated spectral components $\lambda_1$, $\lambda_2$, $\lambda_3$ and $\lambda_4$ as a function of the displacement of the proof mass 32 be measured.

For this purpose, the optical motion responsive system 20 according to embodiments of the invention further includes an optical detector assembly 28. The optical detector assembly 28 is configured for measuring an optical power of each dedicated spectral component $\lambda_1$, $\lambda_2$, $\lambda_3$ or $\lambda_4$ of the optical beam 26 after incidence of the optical beam 26 on the proof mass 32 and collection of the same via the light exit interface 35b of the optical monitoring assembly 34. It will be understood that the optical detector assembly 28 can be embodied by any appropriate device or combination of devices able to measure the optical power of the dedicated spectral components $\lambda_1$, $\lambda_2$, $\lambda_3$ and $\lambda_4$ of the optical beam 26 in the context of the present system 20.

Referring to FIGS. 1 to 4, the optical beam 26 reflected by the optical spectral filter 36 mounted on the proof mass 32 is directed toward the light exit interface 35b of the optical monitoring assembly 34. As mentioned above, in this embodiment, the light exit interface 35b coincides with the light entry interface 35a and is defined by the endface of the proximal end 54a of the light focusing element 52, which is embodied herein by a GRIN lens. The reflected optical beam 26 then travels inside the optical fiber 50 coupled to the distal end 54b of the light focusing element 52. It will be understood that the light focusing element 52 and the optical fiber 50 connected thereto are preferably capable of supporting the propagation of two counter-propagating optical beams thereinside. As shown in FIG. 4, a light separating element 60 such as, for example, an optical circulator, a multi-channel optical add-drop multiplexer or another appropriate optical element, may be provided at a point of the optical fiber 50 to separate the optical beam outputted by the light source assembly 24 and the optical beam reflected by the proof mass 32 and filtered by the optical spectral filter 36.

Still referring to FIG. 4, the optical detector assembly 28 may include a spectral splitter or separator 62 for receiving the reflected optical beam 26 and outputting each of the plurality of dedicated spectral components $\lambda_1$, $\lambda_2$, $\lambda_3$ and $\lambda_4$ to a different output port. In the illustrated embodiment, the spectral splitter 62 is embodied by a wavelength division demultiplexer (WDD), but other functionally equivalent devices or combination of devices may be employed in other embodiments. Each dedicated spectral component $\lambda_1$, $\lambda_2$, $\lambda_3$ or $\lambda_4$ may subsequently be received by a respective optical detector sub-assembly 64a to 64d. It will be understood that the optical detector sub-assemblies 64a to 64d can be embodied by any device or combination of devices capable of measuring the optical power of the dedicated spectral components at their respective wavelengths $\lambda_1$, $\lambda_2$, $\lambda_3$ and $\lambda_4$. For example, the optical detector sub-assemblies 64a to 64d may include photomultiplier tubes, photodiodes such as Si or InGaAs photodiodes, avalanches devices, and the like. Preferably, each of the optical detector sub-assemblies 64a to 64d records the optical power of the corresponding dedicated spectral components $\lambda_1$, $\lambda_2$, $\lambda_3$ and $\lambda_4$, and the recorded data is converted into an electrical signal 65a to 65d. The outputted electrical signals 65a to 65d may then be sent to a processing unit 66 where they can be subsequently processed (e.g. amplified, multiplexed, filtered, digitized, and the like) into data indicative of the displacement of the proof mass. This data can be outputted or displayed to a user or be stored for later use or processing.

As mentioned above in connection with FIGS. 12A and 12B, in order to yield reliable displacement measurements, the optical motion responsive system is preferably properly calibrated prior to use. This may be accomplished by displacing the proof mass by a selected distance $\delta_x$ or $\delta_y$ along one of the sensing axes x and y while illuminating it with an optical beam made up of a plurality of dedicated spectral components, and by measuring the resulting optical powers of the spectral components after reflection of the optical beam from the proof mass and filtering of the same by the optical spectral filter. The procedure may be repeated for different values of $\delta_x$ or $\delta_y$ in order to cover a desired displacement range of the proof mass. It will be understood that such a calibration procedure can allow for the establishment of relations such as those set out in Eqs. (1) and (2). As mentioned above, Eqs. (1) and (2) provide a connection between the displacements $\delta_x$ and $\delta_y$ of the proof mass along the sensing axes and the normalized parameters $D_x$ and $D_y$, respectively.

Method for Monitoring a Displacement of a Proof Mas Along a Sensing Axis

Figure 16:
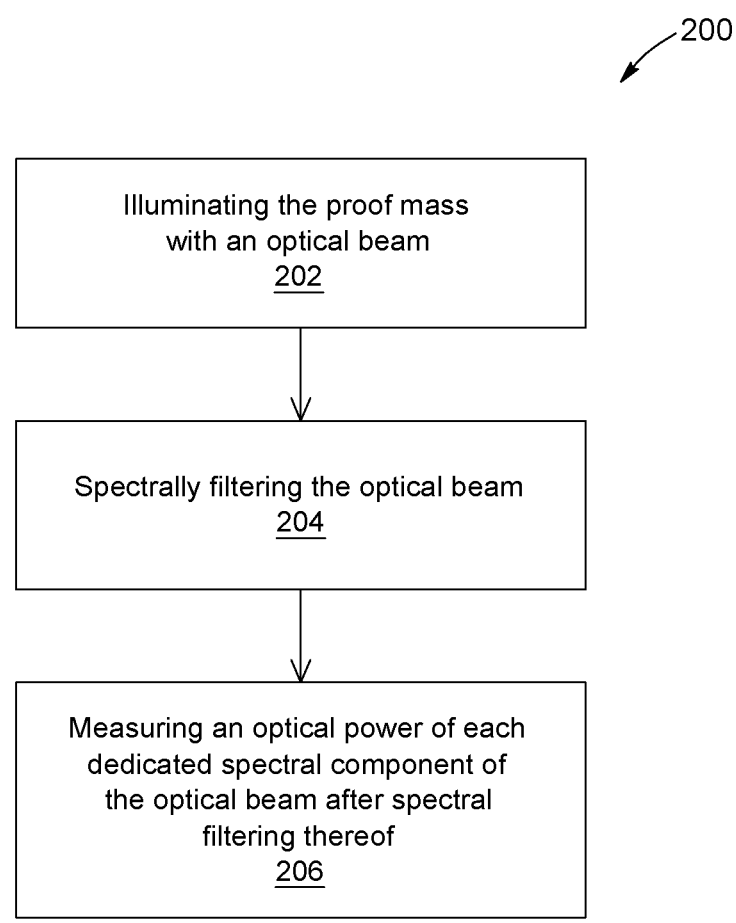
FIG. 16 is flow chart of a method for monitoring a displacement of a proof mass along a sensing axis, in accordance with an embodiment of the invention.

According to another aspect of the invention, there is provided a method for monitoring a displacement of a proof mass along a sensing axis. FIG. 16 shows a flow chart of an embodiment of the method 200, which could, by way of example, be performed with an optical motion responsive system equipped with an optical module, as described above The method 200 according to embodiments of the present invention may be suitable for use in contexts where it is desired to perform an all-optical sensing of the motion of an object. For example, by monitoring the displacement of a proof mass along a sensing axis, embodiments of the method 200 can allow for the determination of the acceleration, the velocity, the displacement or the inclination of an object to which the proof mass is mechanically connected. The method 200 may be employed in various fields including monitoring of vibrating structures, such as marine structures, buildings and bridges, aerospace and military applications, and oil and gas applications such as seismology and leakage monitoring of oil wells.

Referring to FIG. 16, the method 200 first includes a step of illuminating 202 the proof mass with an optical beam, the optical beam including a plurality of dedicated spectral components. Depending on design considerations such as the compactness and the fabrication process of the device used to carry out the method 200, the optical beam incident on the proof mass may be reflected or transmitted by the proof mass.

The method also includes a step of spectrally filtering 204 the optical beam with an optical spectral filter positioned in a path of the optical beam. The optical spectral filter, which may be a reflection or a transmission filter, includes a plurality of filtering regions. Each filtering region of the optical spectral filter is associated with a corresponding one of the plurality of dedicated spectral components of the optical beam. In addition, each filtering region has a spectral profile that includes a distinct dedicated filtering band which encompasses the corresponding dedicated spectral component.

The method further includes a step of measuring 206 an optical power of each dedicated spectral component of the optical beam after the optical beam has been filtered by the optical spectral filter. As a result, any change in the measured optical power of the plurality of dedicated spectral components is indicative of the displacement of the proof mass along the sensing axis.

An exemplary embodiment of the method 200 of FIG. 16 will now be described, in reference with FIGS. 11A to 11H, where the reflection of an optical beam 26 on a proof mass 32 as a function of the displacement of the proof mass 32 relative to the path 38 of the optical beam 26 is considered. The optical beam 26 is made up of four dedicated spectral components with wavelengths $\lambda_1$, $\lambda_2$, $\lambda_3$ and $\lambda_4$. It will be seen that a displacement of the proof mass 32 along the sensing axes 42a and 42b produces, after filtering of the optical beam 26 by the optical spectral filter 36, a change in the optical power of at least one of the plurality of dedicated spectral components $\lambda_1$, $\lambda_2$, $\lambda_3$ and $\lambda_4$, the change being indicative of the displacement of the proof mass and, in turn, of the motion experienced by the support 30.

Referring to FIG. 11A, the proof mass 32 is assumed to be a rest and is illuminated by the optical beam 26, in accordance with the illuminating step 202 of the method 200 of FIG. 16. In FIG. 11A, the optical beam is incident at the center of the optical spectral filter 36 and the surface area of the proof mass 32 illuminated by the optical beam 26 is assumed to be the same for each of the four filtering regions 40a to 40d. Each of the filtering regions 40a to 40d has a spectral profile with a dedicated filtering band configured to reflect a corresponding one of the dedicated spectral components $\lambda_1$, $\lambda_2$, $\lambda_3$ and $\lambda_4$ forming the optical beam 26, in accordance with the spectral filtering step 204 of the method 200 of FIG. 16. Therefore, the optical power $P_{\lambda 1}$, $P_{\lambda 2}$, $P_{\lambda 3}$ and $P_{\lambda 1}$ of each dedicated spectral components $\lambda_1$, $\lambda_2$, $\lambda_3$ and $\lambda_4$ of the optical beam 26 after reflection from the proof mass 32 and filtering by the optical spectral filter 36 will change in accordance with variations in the surface area of the filtering regions 40a to 40d illuminated by the incident optical beam 26. Such variations will occur when the proof mass 32 is displaced along one of the sensing axes 42a and 42b which, for convenience, are labeled as the x and y axes in FIGS. 11A to 11D. By way of example only, it is assumed that when the proof mass is at rest, as in FIG. 11A, the optical power $P_{\lambda 1}$, $P_{\lambda 2}$, $P_{\lambda 3}$ and $P_{\lambda 4}$ of each dedicated spectral components $\lambda_1$, $\lambda_2$, $\lambda_3$ and $\lambda_4$ of the optical beam 26 is the same after reflection from the optical spectral filter 36. This is illustrated in FIG. 11E.

Referring now to FIG. 11B, the proof mass 32 is displaced along the positive x axis such that the respective surface areas of the filtering regions 40a and 40d illuminated by the optical beam 26 become larger than the respective surface areas of the filtering regions 40b and 40c. As a result, in comparison to the configuration of FIGS. 11A and 11E, the optical powers $P_{\lambda 1}$ and $P_{\lambda 4}$ of the dedicated spectral components $\lambda_1$ and $\lambda_4$ of the optical beam 26 after reflection from the optical spectral filter 36 increase while the optical powers $P_{\lambda 2}$ and $P_{\lambda 3}$ of the dedicated spectral components $\lambda_2$ and $\lambda_3$ decrease, as shown in FIG. 11F.

Referring now to FIG. 11C, the proof mass 32 is displaced along the positive y axis such that the respective surface areas of the filtering regions 40a and 40b illuminated by the optical beam 26 become larger than the respective surface areas of the filtering regions 40c and 40d. As a result, in comparison to the configuration of FIGS. 11A and 11E, the optical powers $P_{\lambda 1}$ and $P_{\lambda 2}$ of the dedicated spectral components $\lambda_1$ and $\lambda_2$ of the optical beam 26 after reflection from the optical spectral filter 36 increase while the optical powers $P_{\lambda 3}$ and $P_{\lambda 4}$ of the dedicated spectral components $\lambda_3$ and $\lambda_4$ decrease, as shown in FIG. 11G.

Finally, referring to FIG. 11D, the proof mass 32 is displaced along both the negative x axis and the negative y axis such that the surface area of the filtering region 40c illuminated by the optical beam 26 become larger than the respective surface areas of the filtering regions 40b and 40d, which are themselves larger than the surface area of the filtering region 40a. As a result, after reflection of the optical beam 26 from the optical spectral filter 36, the dedicated spectral components $\lambda_3$ and $\lambda_1$ will have the highest and lowest optical powers $P_{\lambda 3}$ and $P_{\lambda 1}$, respectively, while the optical powers $P_{\lambda 2}$ and $P_{\lambda 4}$ of the dedicated spectral components $\lambda_2$ and $\lambda_4$ will be intermediate between these values, as shown in FIG. 11H.

Once the optical beam has been spectrally filtered at the filtering step 204, the method 200 shown in FIG. 16 involves measuring 206 an optical power of each dedicated spectral component of the optical beam after the optical beam has been filtered by the optical spectral filter. As a result, any change in the measured optical power of the plurality of dedicated spectral components is indicative of the displacement of the proof mass along the sensing axis. In order to link such a change in the measured optical power of the dedicated spectral components with the displacement of the proof mass, the relationship set out in Eqs. (1) and (2) can be used, as exemplified in FIGS. 12A and 12B.

In summary, the embodiments of the present invention provide an all-optical system responsive to motion, a module for use in such a system, and a method for monitoring a displacement of a proof mass along a sensing axis. Because the optical beam reflected or transmitted by the proof mass, and filtered by the optical spectral filter contains all the relevant information regarding the displacement of the proof mass, it is possible to transmit, for example via optical fibers, the filtered optical beam to an optical detector assembly that is located remote from the point of measurement. As a result, the weight and cost of optical motion sensors based on embodiments of the present invention can be reduced, as there is no need to provide electrical connections and wiring directly into the optical module that contains the proof mass, the support and the optical spectral filter. In addition, because embodiments of the present invention need not involve electrical signals at the point of measurement, they are not, or less, affected by external electric, magnetic and electromagnetic fields, and could be used in explosive and flammable environments. Furthermore, embodiments of the present invention can be miniaturized using, for example, MEMS technology.

It will also be understood that embodiments of the present invention can be advantageously suitable for use in various types of motion sensors, including accelerometers, displacement sensors, velocity sensors, vibrometers, inclinometers and gyroscopes. In particular, in contrast to conventional Fabry-Perot-based optical motion sensors where the measured optical signal varies cyclically with the displacement of the proof mass, embodiments of the present invention can allow for an absolute measurement, within a given range, of the position of the proof mass with respect to the support, and thus with respect to the optical beam incident thereonto. Therefore, when embodiments of the optical module or the optical motion responsive system are used as accelerometers they can, in addition, be used as inclinometers because they can allow for the measurement of the inclination with respect to direction of the local gravitational field. Finally, embodiments of the invention allow for measuring the displacement along two or three mutually orthogonal sensing axes using a single proof mass, which is not typically achievable with commercially available optical accelerometers and motion sensors.

Of course, numerous modifications could be made to the embodiments described above without departing from the scope of the present invention.

The invention claimed is:

1. An optical module for use in a motion responsive system, the optical module comprising:

a support;
a proof mass mechanically coupled and displaceable relative to the support along at least one sensing axis in response to a motion experienced by the support;
an optical monitoring assembly fixed relative to the support for monitoring the proof mass with an optical beam impinging on the proof mass, the optical beam comprising a plurality of dedicated spectral components; and
an optical spectral filter positioned in a path of the optical beam, the optical spectral filter comprising a plurality of filtering regions, each filtering region being associated with a corresponding one of the plurality of dedicated spectral components of the optical beam and having a spectral profile comprising a distinct dedicated filtering band encompassing the corresponding dedicated spectral component, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

2. The optical module according to claim 1, wherein:
the optical spectral filter consists of a reflection filter mounted on the proof mass, the plurality of filtering regions defining a plurality of reflecting regions arranged on the proof mass and the dedicated filtering band of each filtering region defining a dedicated reflection band, such that each dedicated spectral component of the optical beam is associated with a corresponding one of the plurality of reflecting regions of the reflection filter and lies within the corresponding dedicated reflection band; and
the optical monitoring assembly comprises a light entry interface for directing the optical beam toward the optical spectral filter for reflection thereon, and a light exit interface for collecting the optical beam reflected from the optical spectral filter.

3. The optical module according to claim 2, further comprising a light focusing element having an endface defining the light entry interface.

4. The optical module according to claim 3, wherein the light focusing element is a graded-index lens.

5. The optical module according to claim 1, wherein:
the optical spectral filter consists of a transmission filter, the plurality of filtering regions defining a plurality of transmitting regions and the dedicated filtering band of each filtering region defining a dedicated transmission band, such that each dedicated spectral component of the optical beam is associated with a corresponding one of the plurality of transmitting regions of the transmission filter and lies within the corresponding dedicated transmission band; and
the optical monitoring assembly comprises a light entry interface for directing the optical beam toward the proof mass, and a light exit interface for collecting the optical beam after impinging on the proof mass.

6. The optical module according to claim 5, wherein the plurality of transmitting regions of the transmission filter are arranged on the proof mass.

7. The optical module according to claim 6, further comprising a light focusing element having an endface defining the light entry interface, and a light collecting element having an endface defining the light exit interface.

8. The optical module according to claim 1, wherein the optical beam comprises an additional spectral component distinct from the plurality of dedicated spectral components, and wherein the at least one sensing axis comprises a longitudinal sensing axis parallel to the path of the optical beam incident on the proof mass, the optical module further comprising:
a pair of substantially parallel surfaces facing each other and reflecting at least partially the additional spectral component of the optical beam to form a Fabry-Perot resonant cavity having a cavity length, one of the substantially parallel surfaces being a surface of the proof mass, such that a displacement of the proof mass along the longitudinal sensing axis modifies the cavity length and produces a corresponding change in the optical power of the additional spectral component, the change being indicative of the motion experienced by the support along the longitudinal sensing axis.

9. An optical module for use in a motion responsive system, the optical module comprising:
a support;
a proof mass mechanically coupled and displaceable relative to the support along at least one sensing axis in response to a motion experienced by the support;
an optical monitoring assembly comprising a light entry interface mounted on the proof mass and a light exit interface, the optical monitoring assembly monitoring the proof mass with an optical beam projected from the light entry interface and comprising a plurality of dedicated spectral components, and
an optical spectral filter fixed with respect to the support and positioned in a path of the optical beam, the optical spectral filter comprising a plurality of filtering regions, each filtering region being associated with a corresponding one of the plurality of dedicated spectral components of the optical beam and having a spectral profile comprising a distinct dedicated filtering band encompassing the corresponding dedicated spectral component, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

10. An optical module for use in a motion responsive system, the optical module comprising:
a support;
a first proof mass mechanically coupled and displaceable relative to the support along two mutually orthogonal first and second sensing axes in response to a motion experienced by the support;
a second proof mass mechanically coupled and displaceable relative to the support along a third sensing axis in response to the motion experienced by the support, the third sensing axis being orthogonal to both the first and second sensing axes;
an optical monitoring assembly fixed relative to the support for monitoring the first and the second proof masses with corresponding first and second optical beams impinging respectively on the first and the second proof masses, the first and second optical beams comprising respectively four and two dedicated spectral components;
a first optical spectral filter positioned in a path of the first optical beam, the first optical spectral filter comprising four filtering regions, each filtering region being associated with a corresponding one of the four dedicated spectral components of the first optical beam and having a spectral profile comprising a distinct dedicated filtering band encompassing the corresponding dedicated spectral component, such that a displacement of the first proof mass along the first and second sensing axes produces, after filtering of the first optical beam by the first optical spectral filter, a change in the optical power of at least one of the four dedicated spectral components of the first optical beam, the change being indicative of the motion experienced by the support along at least one of the first and second sensing axes; and a second optical spectral filter positioned in a path of the second optical beam, the second optical spectral filter comprising two filtering regions, each filtering region being associated with a corresponding one of the two dedicated spectral components of the second optical beam and having a spectral profile comprising a distinct dedicated filtering band encompassing the corresponding dedicated spectral component, such that a displacement of the second proof mass along the third sensing axis produces, after filtering of the second optical beam by the second optical spectral filter, a change in the optical power of at least one of the two dedicated spectral components of the second optical beam, the change being indicative of the motion experienced by the support along the third sensing axis.

11. An optical motion responsive system comprising:
a support;
a proof mass mechanically coupled and displaceable relative to the support along at least one sensing axis in response to a motion experienced by the support;
an optical monitoring assembly comprising a light entry interface and a light exit interface, the optical monitoring assembly being fixed relative to the support for monitoring the proof mass with an optical beam impinging on the proof mass, the optical beam comprising a plurality of dedicated spectral components;
a light source assembly optically coupled to the optical monitoring assembly, the light source assembly generating the optical beam and projecting the same onto the proof mass via the light entry interface;
an optical spectral filter positioned in a path of the optical beam, the optical spectral filter comprising a plurality of filtering regions, each filtering region being associated with a corresponding one of the plurality of dedicated spectral components of the optical beam and having a spectral profile comprising a distinct dedicated filtering band encompassing the corresponding dedicated spectral component; and
an optical detector assembly for measuring an optical power of each dedicated spectral component of the optical beam after incidence of the optical beam onto the proof mass and collection of the same via the light exit interface, such that a displacement of the proof mass along the at least one sensing axis produces, after filtering of the optical beam by the optical spectral filter, a change in the optical power of at least one of the plurality of dedicated spectral components, the change being indicative of the motion experienced by the support.

12. The optical motion responsive system according to claim 11, wherein the optical spectral filter consists of a reflection filter mounted on the proof mass, the plurality of filtering regions defining a plurality of reflecting regions arranged on the proof mass and the dedicated filtering band of each filtering region defines a dedicated reflection band, such that each dedicated spectral component of the optical beam is associated with a corresponding one of the plurality of reflecting regions of the reflection filter and lies within the corresponding dedicated reflection band.

13. The optical motion responsive system according to claim 12, further comprising a light focusing element for receiving the optical beam from the light source assembly and for focusing the same onto the proof mass, the light focusing element having a proximal end and a distal end, the proximal end having an endface defining the light entry interface.

14. The optical motion responsive system according to claim 13, wherein the light focusing element is a graded-index lens.

15. The optical motion responsive system according to claim 13, further comprising at least one optical fiber optically coupling the light focusing element and the light source assembly.

16. The optical motion responsive system according to claim 11, wherein the optical spectral filter consists of a transmission filter, the plurality of filtering regions defining a plurality of transmitting regions and the dedicated filtering band of each filtering region defining a dedicated transmission band, such that each dedicated spectral component of the optical beam is associated with a corresponding one of the plurality of transmitting regions of the transmission filter and lies within the corresponding dedicated transmission band.

17. The optical motion responsive system according to claim 16, wherein the plurality of transmitting regions of the transmission filter are arranged on the proof mass.

18. The optical motion responsive system according to claim 17, further comprising:
a light focusing element for receiving the optical beam from the light source assembly and for focusing the same onto the proof mass, the light focusing element having a proximal end and a distal end, the proximal end having an endface defining the light entry interface; and
a light collecting element for collecting the optical beam after transmission through the proof mass and for directing the same toward the optical detector assembly, the light collecting element having a proximal end and a distal end, the proximal end having an endface defining the light exit interface.

19. The optical motion responsive system according to claim 18, wherein the light focusing element is a graded-index lens and the light collecting element is an optical fiber.

20. The optical motion responsive system according to claim 11, wherein the light source assembly comprises:
a plurality of light sources, each light source generating a corresponding one of the plurality of dedicated spectral components; and
an optical coupler for coupling together the dedicated spectral components from the plurality of light sources to form the optical beam.

\* \* \* \* \*